US008396946B1

(12) United States Patent
Brandwine et al.

(10) Patent No.: US 8,396,946 B1
(45) Date of Patent: Mar. 12, 2013

(54) MANAGING INTEGRATION OF EXTERNAL NODES INTO PROVIDED COMPUTER NETWORKS

(75) Inventors: Eric Jason Brandwine, Haymarket, VA (US); Kevin Christopher Miller, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 535 days.

(21) Appl. No.: 12/752,036

(22) Filed: Mar. 31, 2010

(51) Int. Cl.
*G06F 15/177* (2006.01)
(52) U.S. Cl. .................. 709/220; 709/223; 709/224
(58) Field of Classification Search .................. 709/220
See application file for complete search history.

(56) References Cited

U.S. PATENT DOCUMENTS

| 6,411,967 | B1 | 6/2002 | Van Renesse | 707/201 |
|---|---|---|---|---|
| 6,529,953 | B1 | 3/2003 | Van Renesse | 709/223 |
| 6,724,770 | B1 | 4/2004 | Van Renesse | 370/432 |
| 7,068,666 | B2 | 6/2006 | Foster et al. | 370/397 |
| 7,068,667 | B2 | 6/2006 | Foster et al. | 370/398 |
| 7,124,289 | B1 | 10/2006 | Suorsa | 713/1 |
| 7,131,123 | B2 | 10/2006 | Suorsa et al. | 717/177 |
| 7,152,109 | B2 | 12/2006 | Suorsa et al. | 709/226 |
| 7,802,000 | B1* | 9/2010 | Huang et al. | 709/228 |
| 7,991,859 | B1* | 8/2011 | Miller et al. | 709/220 |
| 8,230,050 | B1* | 7/2012 | Brandwine et al. | 709/220 |
| 8,296,434 | B1* | 10/2012 | Miller et al. | 709/226 |
| 2005/0114507 | A1 | 5/2005 | Tarui et al. | 709/224 |
| 2005/0120160 | A1 | 6/2005 | Plouffe et al. | 711/1 |
| 2006/0184936 | A1 | 8/2006 | Abels et al. | 718/1 |
| 2007/0233825 | A1* | 10/2007 | Brownell et al. | 709/220 |
| 2007/0280243 | A1* | 12/2007 | Wray et al. | 370/392 |
| 2008/0132185 | A1* | 6/2008 | Elliott et al. | 455/115.4 |
| 2008/0225875 | A1* | 9/2008 | Wray et al. | 370/419 |
| 2008/0298367 | A1* | 12/2008 | Furukawa | 370/392 |
| 2009/0031404 | A1* | 1/2009 | Bazzinotti et al. | 726/6 |
| 2009/0129385 | A1* | 5/2009 | Wray et al. | 370/392 |
| 2009/0199177 | A1* | 8/2009 | Edwards et al. | 718/1 |
| 2010/0107162 | A1* | 4/2010 | Edwards et al. | 718/1 |

(Continued)

OTHER PUBLICATIONS

"Chapter: Configuring Layer 2 Services Over MPLS," JUNOSe Internet Software for E-series Routing Platforms: Routing Protocols Configuration Guide, vol. 2, Mar. 2004, retrieved Jan. 26, 2007, from http://www.juniper.net/techpubs/software/erx/junose52/swconfig-routing-vol2/html/title-swconfig . . . , pp. 357-382, 31 pages.

(Continued)

*Primary Examiner* — David Lazaro
*Assistant Examiner* — Waseem Ashraf
(74) *Attorney, Agent, or Firm* — Seed IP Law Group PLLC

(57) ABSTRACT

Techniques are described for managing communications for a managed virtual computer network overlaid on a distinct substrate computer network, including for communications between computing nodes of the managed virtual computer network connected to the substrate network and other network nodes external to the substrate network. The managed virtual computer network may have multiple associated virtual network addresses, with each of the computing nodes being associated with at least one of the virtual network addresses, and with one or more external network nodes being integrated into the managed virtual computer network based at least in part by associating one or more other of the virtual network addresses with the external network nodes. The managing of the communications may further include using one or more translation manager modules that interconnect the substrate network with one or more external networks or other external connections via which the external network nodes are accessible.

29 Claims, 14 Drawing Sheets

U.S. PATENT DOCUMENTS

2011/0022694 A1* 1/2011 Dalal et al. .................... 709/222
2011/0110377 A1* 5/2011 Alkhatib et al. ......... 370/395.53

OTHER PUBLICATIONS

Cisco IP Solution Center MPLS VPN Management 4.2, Cisco Systems, Inc., retrieved Jan. 24, 2007, from http://www.cisco.com/en/US/products/sw/netmgtsw/ps5332/products_data_sheet_09186a008017d7 . . . , 5 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"MPLS-enabled VPN Services," Data Connection, retrieved Jan. 26, 2007, from http://www.dataconnection.com/solutions/vpn_vlan.htm, 1 page.
"Recent Advances Boost System Virtualization," eWeek.com, retrieved May 3, 2006, from http://www.eweek.com/article2/0,1895,1772626,00.asp, 5 pages.
"Scalable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Reverse Firewall™: Defeating DDoS Attacks Emerging from Local Area Networks," Cs3, Inc., retrieved Nov. 11, 2005, from http://www.cs3-inc.com/rfw.html, 4 pages.
"The Softricity Desktop," Softricity, retrieved May 3, 2006, from http://www.softricity.com/products/, 3 pages.
Bellovin, S., "Distributed Firewalls," Nov. 1999, issue of ;login:, pp. 37-39, retrieved Nov. 11, 2005, from http://www.cs.columbia.edu/~smb/papers/distfw.html, 10 pages.
Blaze, M., "Using the KeyNote Trust Management System," Mar. 1, 2001, retrieved May 17, 2006, from http://www.crypto.com/trustmgt/kn.html, 4 pages.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Chown, T., "Use of VLANs for IPv4-IPv6 Coexistence in Enterprise Networks: draft-ietf-v6ops-vlan-usage-01," IPv6 Operations, University of Southampton, Mar. 6, 2006, retrieved Jun. 15, 2007, from http://tools.ietf.org/html/draft-ietf-v6ops-vlan-usage-01, 13 pages.
Coulson, D., "Network Security Iptables," Apr. 2003, Linuxpro, Part 2, retrieved from http://davidcoulson.net/writing/lxf/39/iptables.pdf, 4 pages.
Coulson, D., "Network Security Iptables," Mar. 2003, Linuxpro, Part 1, retrieved from http://davidcoulson.net/writing/lxf/38/iptables.pdf, 4 pages.
Demers, A., "Epidemic Algorithms for Replicated Database Maintenance," 1987, Proceedings of the sixth annual ACM Symposium on Principles of distributed computing, Vancouver, British Columbia, Canada, Aug. 10-12, 1987, 12 pages.
Gruener, J., "A vision of togetherness," May 24, 2004, NetworkWorld, retrieved May 3, 2006, from, http://www.networkworld.com/supp/2004/ndc3/0524virt.html, 9 pages.
Ioannidis, S., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.
Kenshi, P., "Help File Library: Iptables Basics," Justlinux, retrieved Dec. 1, 2005, from http://www.justlinux.com/nhf/Security/Iptables_Basics.html, 4 pages.
Shankland, S., "Sun to buy start-up to bolster N1," Jul. 30, 2003, CNet News.com, retrieved May 3, 2006, http://news.zdnet.com/2100-35213_22-5057752.html, 8 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Townsley, M., et al., "Encapsulation of MPLS over Layer 2 Tunneling Protocol Version 3: draft-ietf-mpls-over-12tpv3-03.txt," Network Working Group, Nov. 2006, retrieved Jun. 15, 2007, from http://tools.ietf.org/html/draft-ietf-mpls-over-12tpv3-03, 12 pages.
Van Renesse, R., "Astrolabe: a Robust and Scalable Technology for Distributed System Monitoring, Management, and Data Mining," May 2003, ACM Transactions on Computer Systems (TOCS), 21(2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.
Virtual Iron Software Home, Virtualiron®, retrieved May 3, 2006, from http://www.virtualiron.com/, 1 page.
Waldspurger, C.A., "Spawn: A Distributed Computational Economy," Feb. 1992, IEEE Transactions on Software Engineering, 18(2):103-117, 15 pages.
"Anycast," retrieved on Mar. 16, 2009, from http://en.wikipedia.org/wiki/Anycast, 4 pages.
"Load Balancing (Computing)," retrieved on Mar. 16, 2009, from http://en.wikipedia.org/wiki/Load_balancing_(computing), 5 pages.
"Mobile IP," retrieved on Dec. 19, 2008, from http://en.wikipedia.org/wiki/Mobile_ip, 3 pages.
"Round Robin DNS," retrieved on Dec. 17, 2008, from http://en.wikipedia.org/wiki/Round_robin_DNS, 2 pages.
"Virtual IP Address," retrieved on Dec. 17, 2008, from http://www.answers.com/topic/virtual-ip-address-1, 2 pages.
"VMware VMotion," retrieved on Mar. 16, 2009, from http://www.vmware.com/products/vi/vc/vmotion.html. 2 pages.
"VMWare Storage VMotion," retrieved on Mar. 16, 2009, from http://www.vmware.com/products/vi/storage_vmotion.html. 2 pages.
Clark, C., et al. "Live Migration of Virtual Machines," retrieved on Mar. 16, 2009, from http://www.cl.cam.ac.uk/research/srg/netos/papers/2005-migration-nsdi-pre.pdf, 14 pages.
"EZchip Technologies—Technologies," retrieved on Mar. 31, 2010, from http://www.ezchip.com/technologies.htm, 2 pages.
"Link Aggregation," retrieved on Mar. 31, 2010, from http://en.wikipedia.org/wiki/802.3ad, 6 pages.
"Network Processor," retrieved on Mar. 31, 2010, from http://en.wikipedia.org/wiki/Network_processor, 3 pages.
"TippingPoint_Core_Controller," retrieved on Mar. 31, 2010, from http://www.tippingpoint.com/pdf/resources/datasheets/401054-005_TippingPointCoreController.pdf, 3 pages.
"TippingPoint Technologies," retrieved on Mar. 31, 2010, from http://www.tippingpoint.com/products_core_controller.html, 2 pages.
"VMware VMsafe Security Technology," retrieved on Mar. 31, 2010, from http://www.vmware.com/technical-resources/security/vmsafe/faq.html, 3 pages.
"New VMware VMsafe Technology Allows the Virtual Datacenter to Be More Secure Than Physical Environments," Feb. 27, 2008, retrieved on Mar. 31, 2010, from http://www.vmware.com/company/news/releases/vmsafe_vmworld.html, 5 pages.
"VMware VMsafe Security Technology," retrieved on Mar. 31, 2010, from http://www.vmware.com/technical-resources/security/vmsafe.html?rls=com.microsoft;en-u . . . , 3 pages.

* cited by examiner

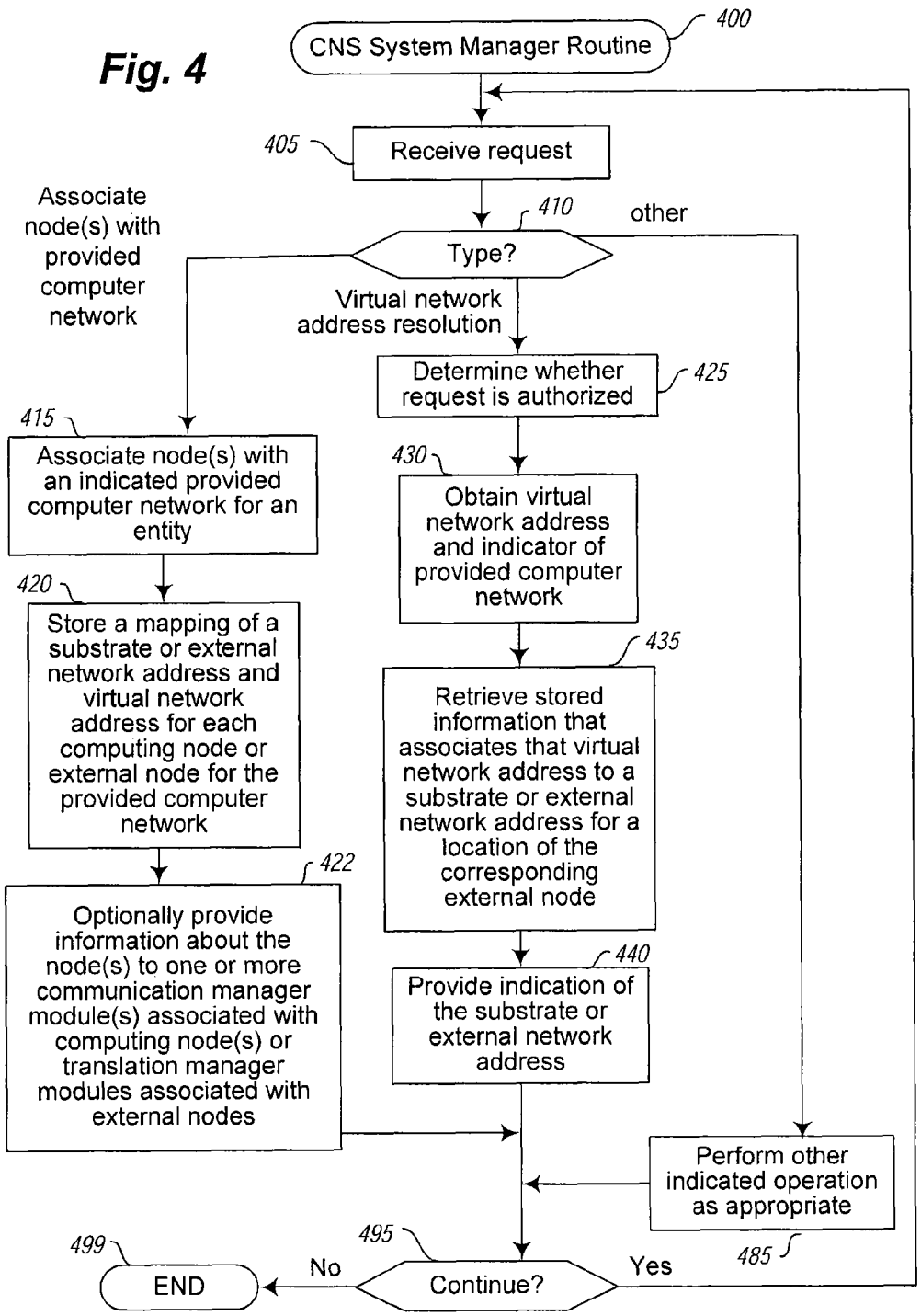

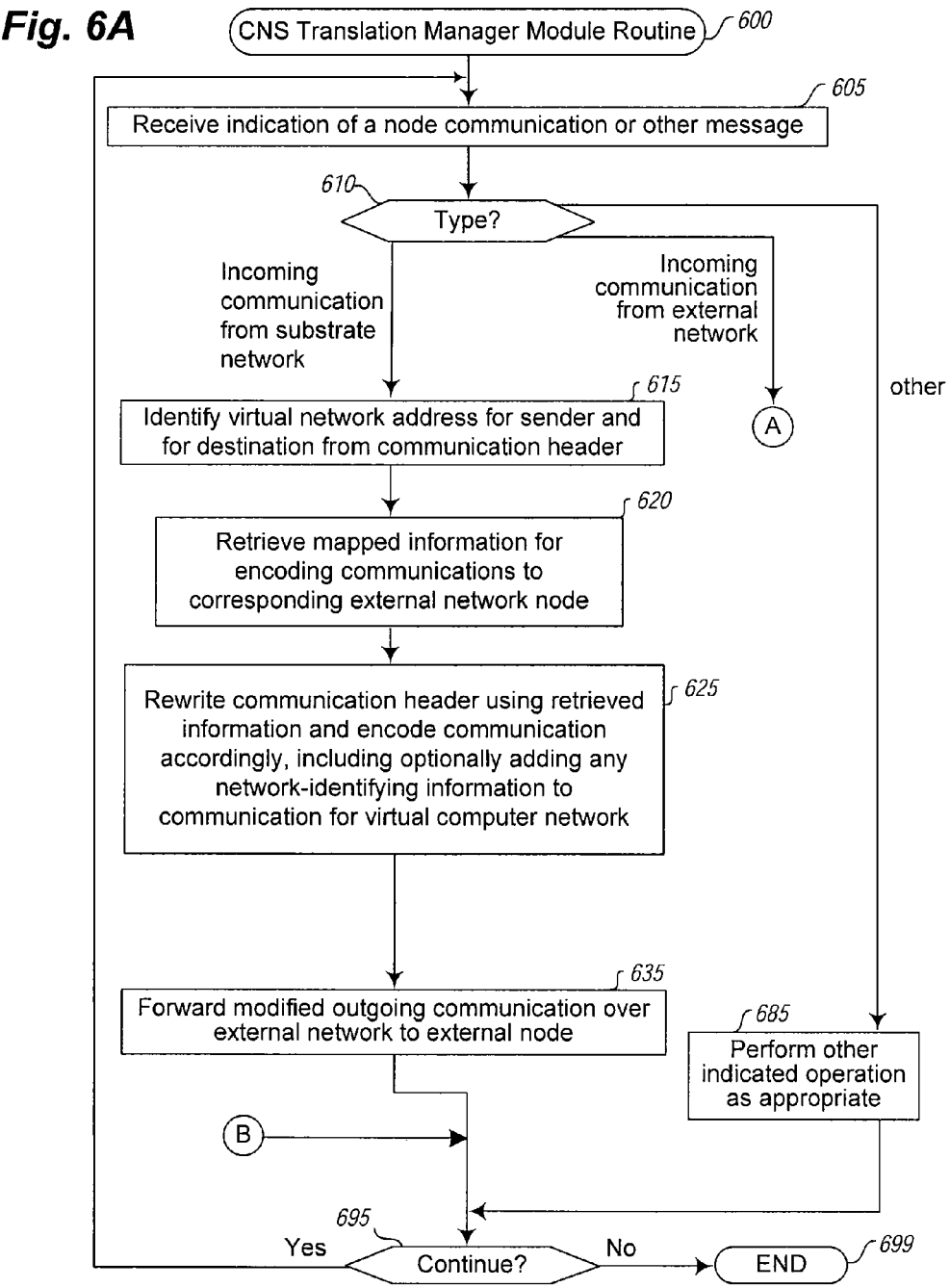

MANAGING INTEGRATION OF EXTERNAL NODES INTO PROVIDED COMPUTER NETWORKS

BACKGROUND

Many companies and other organizations operate computer networks that interconnect numerous computing systems to support their operations, with the computing systems alternatively co-located (e.g., as part of a private local area network, or "LAN") or instead located in multiple distinct geographical locations (e.g., connected via one or more other private or shared intermediate networks). For example, data centers housing significant numbers of interconnected co-located computing systems have become commonplace, such as private data centers that are operated by and on behalf of a single organization, as well as public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIG. 4 illustrates a flow diagram of an example embodiment of a CNS System Manager routine.

FIGS. 6A-6B illustrate a flow diagram of an example embodiment of a Translation Manager Module routine.

DETAILED DESCRIPTION

Figure 1A:
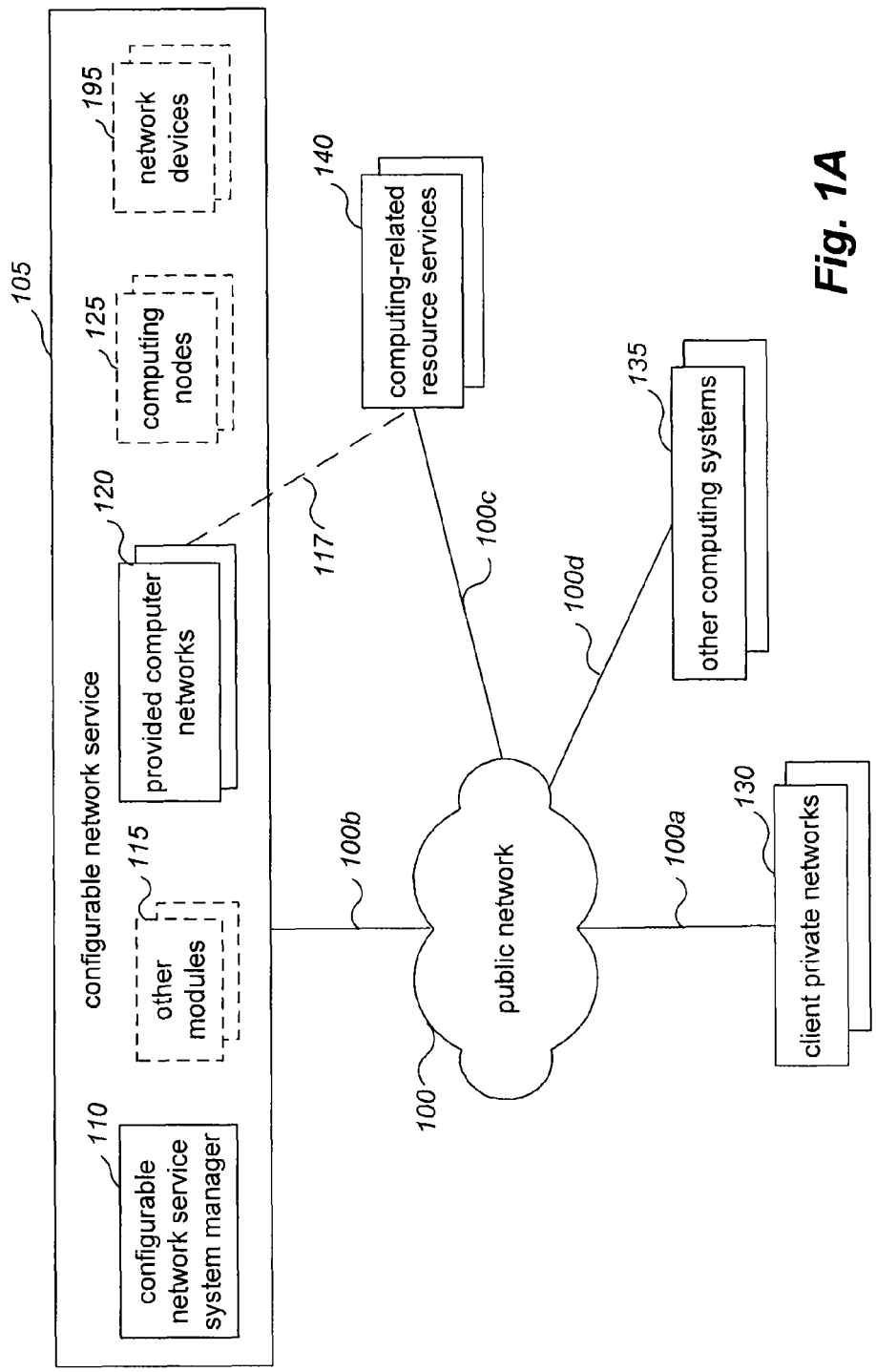
FIGS. 1A and 1B are network diagrams illustrating example embodiments of managing communications for computing nodes belonging to a managed computer network.

Techniques are described for providing managed computer networks, such as for managed computer networks that are each implemented as a virtual computer network overlaid on one or more other computer networks. The managed computer networks may in some embodiments be provided by a configurable network service to users or other entities who are customers (e.g., for a fee) or otherwise clients of the configurable network service, such as to remote clients that access the configurable network service and/or the provided managed computer networks from remote locations over one or more intervening networks (e.g., over the Internet). In at least some embodiments, the techniques include managing communications for various computing nodes of a managed virtual computer network overlaid on a substrate network, including in situations in which one or more network nodes that are external to the substrate network are integrated into and used as part of the managed virtual computer network. As one example, the computing nodes of a managed computer network may be co-located at a particular data center, and a configurable network service that is providing the managed computer network for a client may use one or more edge devices at the data center in order to manage communications between a substrate network at the data center and other external network nodes that are not connected to the substrate network, such as external network nodes that are located in one or more separate geographical locations (e.g., at remote premises of the client) or that are part of a co-location facility for the data center. In at least some embodiments, some or all of the described techniques are automatically performed by embodiments of a system manager module, one or more communication manager modules, and/or one or more translation manager modules, such as modules that are part of a network-accessible configurable network service.

Thus, the managing of communications for a managed virtual computer network overlaid on a substrate network may in at least some embodiments include managing communications between one or more computing nodes of the managed computer network that are connected to the substrate network and one or more network nodes external to the substrate network. For example, the computing nodes of the managed virtual computer network may in some embodiments each have an associated communication manager module that manages communications to and/or from the computing node, and the communication manager module associated with a source computing node that is sending a communication to one or more indicated final destinations may in at least some situations facilitate the sending of that communication. Similarly, any external network nodes integrated into the managed virtual computer network overlaid on a substrate network may in some embodiments each have an associated translation manager module that manages communications to and/or from the external network node, such as by managing communications that pass between the substrate network and one or more external networks or other external connections. Furthermore, the managed virtual computer network may have multiple associated virtual network addresses (e.g., a range of contiguous virtual network addresses, such as a CIDR ("Classless Inter-Domain Routing") block), with each of the computing nodes of the managed virtual computer network being associated with at least one of the virtual network addresses for the managed virtual computer network, and with one or more external network nodes being integrated into the managed virtual computer network based at least in part by associating one or more other of the virtual network addresses for the managed virtual computer network with the external network nodes and by managing use of the various virtual network addresses accordingly. For example, in some embodiments and situations, a group of multiple of the virtual network addresses associated with a managed virtual computer network (e.g., a sub-range or other subset of a range of contiguous virtual network addresses for the managed virtual computer network) may be associated with a group of multiple external nodes that are co-located at an external location outside of the substrate network, as discussed in greater detail below.

When a source computing node of the managed virtual computer network initiates an outgoing communication to a destination external network node that is integrated into the managed virtual computer network (e.g., by sending the communication to a destination virtual network address that is associated with the destination external network node), the communication manager module associated with the source computing node may identify a particular translation manager module that is associated with the external network node, encode the communication in a manner specific to the substrate network (e.g., by including various information in the encoded communication to enable the communication to be properly forwarded over the substrate network, such as in a header of the communication), and then forward the encoded communication over the substrate network to the identified associated translation manager module for the destination external network node. When the associated translation manager module receives the communication, the translation manager module decodes the communication so that it is no longer specific to the substrate network (e.g., by removing any information previously included in the encoded communication to enable the communication to be properly forwarded over the substrate network), modifies the decoded communication so that it is directed to an external location associated with the external network node and to optionally add network-identifying information for the managed virtual computer network to the modified communication, and forwards the modified communication to the external network node over one or more external networks or other external connections. When multiple virtual network addresses are associated with an external location outside of the substrate network (e.g., with one or more external network nodes at that external location), one or more translation manager modules connected to the substrate network may similarly be configured to forward any communications from the substrate network that are directed to any of those multiple virtual network addresses to that external location, including in situations in which the translation manager module is not aware of the particular external network node that will ultimately receive the communication (e.g., if a device at the external location is responsible for receiving and further handling communications sent to those multiple virtual network addresses), and optionally in which no actual external network node is currently associated with a particular one or more of the multiple virtual network addresses (e.g., such that a device at the external location will cache the communication until a corresponding external network node is available, or may instead drop the communication or otherwise handle the communication in other manners). In addition, as described in greater detail below, the external connection via which a translation manager module forwards a communication to an external network node may have various forms in various embodiments and situations, and the translation manager module may further encode or otherwise format communications in a manner specific to a particular type of external connection that will be used in various manners—as non-exclusive examples, the types of external connections may include the following: a link that is configured to support VLAN ("virtual LAN") identifiers, such as in accordance with the IEEE 802.1Q standard (e.g., with the translation manager module optionally adding an appropriate VLAN identifier corresponding to a particular managed virtual computer network to a communication being sent over that external connection); a link that is configured to support MPLS ("Multi Protocol Label Switching") labels or tags (e.g., with the translation manager module optionally adding an appropriate MPLS label corresponding to a particular managed virtual computer network to a communication being sent over that external connection); one or more external networks that use publicly routable external network addresses (e.g., with the translation manager module optionally tracking a publicly routable external network address for one or more particular external network nodes, and forwarding communications to those external network nodes to that external network address); a link that is connected to a VPN ("Virtual Private Network") connection endpoint (e.g., with the translation manager module optionally adding an external network address or other information that the VPN connection endpoint will use in further encoding the communication before it is forwarded to the external network node); etc. Communications being sent from an external network node to a computing node of a managed virtual computer network may be handled in a similar manner but in the opposite direction, as discussed in greater detail below. In some embodiments, the source computing node may be one of multiple virtual machines hosted on a physical computer system, the associated communication manager module for the source computing node may be provided by a virtual machine hypervisor monitor executing on the physical computing system to manage those hosted virtual machines, and the translation manager module may be provided as part of an edge device or other module that interconnects the substrate network and one or more external networks via which the external network node is accessible.

In addition, the translation manager modules may further optionally provide various additional types of functionality in various embodiments for at least some communications that they manage. Such optional additional functionality may include, for example, one or more of the following: firewall functionality; network address translation ("NAT") functionality; port address translation ("PAT") functionality; intrusion detection functionality; intrusion prevention functionality; content analysis functionality; virtual private network ("VPN") connection endpoint functionality or other functionality involving modifying the format or encoding of a communication (e.g., to encapsulate a communication in another communication, to separate a single communication into multiple communications or to combine multiple communications into a single communication, etc.); wide area network ("WAN") acceleration or other network acceleration; etc. Similar functionality may also be provided in at least some embodiments by external network nodes that operate as intermediate destinations for some or all communications, such as to manage communications passing between two or more groups of computing nodes of a managed computer network. One or more translation manager modules and/or other modules (e.g., the system manager module) may also perform various other management tasks related to the tracking and managing of operations in at least some embodiments. For example, the translation manager modules or other modules may perform metering of a quantity of communications handled by the translation manager modules that are destined for and/or forwarded to external nodes, may perform filtering of particular communications to prevent unauthorized communications from being further forwarded by the translation manager modules (e.g., for communications received from external network nodes that are intended for a computing node accessible via the substrate network), etc. In some embodiments and situations, the forwarding or other handling of a communication by a translation manager module and/or an intermediate destination external network node may also include otherwise modifying the communication before it is further forwarded or blocking the communication from being further forwarded (e.g., as part of filtering particular communications that are not authorized), as discussed in greater detail elsewhere. In addition, the external network nodes may have various forms and provide various types of functionality in various embodiments. For example, in some embodiments and situations, a particular external network node may be integrated into a managed virtual computer network overlaid on a substrate network in order to provide one or more specified types of functionality that are not available from any other computing nodes of the managed virtual computer network and/or that are not available from any modules or devices that are accessible via the substrate network (e.g., any modules or devices available from by a configurable network service that provides the managed virtual computer network to a client)—as non-exclusive examples, the external network node may be developed internally by a client for whom the managed virtual computer network is provided (e.g., a legacy system of the client), may be a specialized hardware device and/or software from a third-party vendor that is not available via the substrate network, etc. Such external network nodes may in some embodiments and situations be particular specialized hardware devices and/or may be general-purpose computing devices that are configured via software to perform particular functionality. In addition, in some embodiments and situations, a particular external network node may be a final destination for a communication directed to the external network node (e.g., may receive and store information in the communication without responding, may optionally initiate subsequent response communications to the sender, etc.), while in other embodiments and situations, a particular external network node may be an intermediate destination for a communication that is sent by a computing node of a managed virtual computer network, such as to perform one or more specified types of processing on the communication before optionally forwarding the communication to another computing node of that same managed virtual computer network or instead to another final destination. Additional details related to various techniques for managing communications between computing nodes of a managed virtual computer network and external network nodes integrated into the managed virtual computer network are included below.

Furthermore, in at least some embodiments and situations, the substrate network may have multiple translation manager modules that may alternatively be used to manage communications between the computing nodes of a managed virtual computer network and one or more external network nodes integrated into the managed virtual computer network. The selection of a particular one of multiple alternative translation manager modules for use with a communication may be performed in various manners in various embodiments. For example, in some embodiments, each of the multiple alternative translation manager modules may be assigned a distinct substrate network address, such as from a CIDR block of contiguous network addresses, or instead from another group of multiple network addresses. If so, a particular one of the multiple alternative translation manager modules may in some embodiments be selected based on its associated network address, such as by first selecting one of the multiple network addresses associated with the multiple alternative translation manager modules, and then using the particular translation manager module associated with the selected network address. As one example, a hashing function may be used in some embodiments to deterministically select a particular translation manager module using particular information from a communication to be sent (e.g., by a communication manager module that manages a sending computing node who sends the communication and/or by a system manager module), such as based at least in part on a destination network address and/or source network address in the communication, or instead on any other one or more other attributes of the communication (e.g., one or more types of information associated with sending of the communication, such as a networking protocol used to encode the communication, a TCP ("Transmission Control Protocol") port number or other port identifier, etc.; one or more types of information stored in one or more header fields of the communication, such as a protocol identifier, a port number, an indication of content type, etc.; one or more other attributes of the communication, such as a size; etc.). It will be appreciated that various hashing functions may be used in various embodiments, and that a particular translation manager module may be selected in manners other than via a hashing function (e.g., randomly; based at least in part on factors associated with the alternative translation manager modules, such as load; etc.). In addition, if the hashing function or other selection of a particular translation manager module is deterministically based on a combination of a communication's destination network address and source network address, then subsequent communications from that same source network address to that same destination network address may in some embodiments be directed to the same particular translation manager module (e.g., by dynamically selecting the same translation manager module for each of the communications, based on each of the communications having the same associated information that is used for the dynamic selecting), thus providing advantages related to communication flow continuity in at least some situations.

Alternatively, in other embodiments, after a particular translation manager module is selected for a particular communication from a source computing node to a final destination, the described techniques may include performing additional operations to ensure that at least some subsequent communications from that same source computing node to that same final destination are directed to the same particular translation manager module, such as by tracking particular translation manager modules used for particular source/final destination pairs (e.g., to maintain use of a particular translation manager module for subsequent communications that occur during a particular communication session, or that otherwise satisfy one or more indicated criteria, such as being sent during a specified period of time). In addition, in some embodiments the substrate network may optionally include one or more networking devices or other components (e.g., a networking router device, a load balancer, etc.) that are associated with the multiple alternative translation manager modules and that operate to direct certain communications to particular translation manager modules. For example, a router device may be located near two or more edge devices in the substrate computer network that are used as translation manager modules, and may provide functionality that includes selecting between those two or more alternative edge devices for particular communications (e.g., a router device that treats two or more of the edge devices as alternatives for a specified anycast address, that provides equal-cost multi-path routing to two or more of the alternative edge devices, etc.), and that optionally provides flow hashing functionality to maintain use of a particular translation manager module for a flow of multiple communications between a particular source/final destination pair. Alternatively, a load balancer device may be configured to receive communications directed to a particular network address that is associated with a pool of multiple alternative translation manager modules, and to select a particular translation manager module to use for each of the communications based on various criteria (e.g., current load of the various possible translation manager modules). If such networking devices or other components are used in a particular embodiment, communication manager modules in that embodiment may be configured to support such networking devices or other components in various manners, as discussed in greater detail below.

As noted above, in at least some embodiments, the described techniques include managing communications for a managed computer network being provided, including in embodiments in which the managed computer network is a virtual computer network that is overlaid on one or more underlying substrate computer networks. In such embodiments, communications may be encoded in various manners before being sent over an underlying substrate network (e.g., to use substrate network addresses for the communication source and/or final destination in the encoded communication that are distinct from virtual network addresses used for the communication source and/or final destination in the original pre-encoded communication), and the described techniques may be used in conjunction with such encoded communications, as discussed in greater detail below. Before discussing some additional details of managing such communications in particular manners, however, some aspects of such managed computer networks in at least some embodiments are introduced.

In particular, a managed computer network between multiple computing nodes may be provided in various ways in various embodiments, such as in the form of a virtual computer network that is created as an overlay network using one or more intermediate physical networks that separate the multiple computing nodes. In such embodiments, the intermediate physical network(s) may be used as a substrate network on which the overlay virtual computer network is provided, with messages between computing nodes of the overlay virtual computer network being passed over the intermediate physical network(s), but with the existence and use of the intermediate physical network(s) being transparent to the computing nodes (e.g., with the computing nodes being unaware of and/or being unable to detect the intermediate physical networks) in at least some such embodiments. For example, the multiple computing nodes may each have a distinct physical substrate network address that corresponds to a location of the computing node within the intermediate physical network(s), such as a substrate IP ("Internet Protocol") network address (e.g., an IP network address that is specified in accordance with IPv4, or "Internet Protocol version 4," or in accordance with IPv6, or "Internet Protocol version 6," such as to reflect the networking protocol used by the intermediate physical networks). In other embodiments, a substrate network on which a virtual computer network is overlaid may itself include or be composed of one or more other virtual computer networks, such as other virtual computer networks implemented by one or more third parties (e.g., by an operator or provider of Internet or telecom infrastructure).

When computing nodes are selected to participate in a managed computer network that is being provided on behalf of a user or other entity and that is a virtual computer network overlaid on a substrate network, each computing node may be assigned one or more virtual network addresses for the provided virtual computer network that are unrelated to those computing nodes' substrate network addresses, such as from a range of virtual network addresses used for the provided virtual computer network—in at least some embodiments and situations, the virtual computer network being provided may further use a networking protocol that is different from the networking protocol used by the substrate network (e.g., with the virtual computer network using the IPv4 networking protocol, and the substrate computer network using the IPv6 networking protocol). The computing nodes of the virtual computer network inter-communicate using the virtual network addresses (e.g., by sending a communication to another destination computing node by specifying that destination computing node's virtual network address as the destination network address for the communication), but the substrate network may be configured to route or otherwise forward communications based on substrate network addresses (e.g., by physical network router devices and other physical networking devices of the substrate network). If so, the overlay virtual computer network may be implemented from the logical edge of the intermediate physical network(s), by modifying the communications that enter the intermediate physical network(s) to encode the communications for the intermediate physical networks (e.g., to use substrate network addresses that are based on the networking protocol of the substrate network), and by modifying the communications that leave the intermediate physical network(s) to decode the communications (e.g., to use virtual network addresses that are based on the networking protocol of the virtual computer network if the decoded communication is to be provided to a computing node of the virtual computer network, to use external public network addresses if the decoded communication is to be forwarded over one or more external public networks, etc.). Additional details related to the provision of such an overlay virtual computer network are included below.

In at least some embodiments, a network-accessible configurable network service ("CNS") is provided by a corresponding CNS system, and the CNS system provides managed overlay virtual computer networks to remote customers (e.g., users and other entities), such as by providing and using numerous computing nodes that are in one or more geographical locations (e.g., in one or more data centers) and that are inter-connected via one or more intermediate physical networks. The CNS system may use various communication manager modules and/or translation manager modules at the edge of the one or more intermediate physical networks to manage communications for the various overlay virtual computer networks as they enter and leave the intermediate physical network(s), and may use one or more system manager modules to coordinate other operations of the CNS system. For example, to enable the communication manager modules and/or translation manager modules to manage communications for the overlay virtual computer networks being provided, the CNS system may track and use various information about the computing nodes and external network nodes of each virtual computer network being managed, such as to map the substrate network address of each such computing node to the one or more overlay virtual network addresses associated with the computing node, and such as to map the external network address of each such external network node to the one or more overlay virtual network addresses associated with the external network node. Such mapping and other information may be stored and propagated in various manners in various embodiments, including centrally or in a distributed manner, as discussed in greater detail below.

Furthermore, in order to provide managed virtual computer networks to users and other entities in a desired manner, the CNS system allows users and other entities to interact with the CNS system in at least some embodiments to configure a variety of types of information for virtual computer networks that are provided by the CNS system on behalf of the users or other entities, and may track and use such configuration information as part of providing those virtual computer networks. The configuration information for a particular managed virtual computer network having multiple computing nodes may include, for example, one or more of the following non-exclusive list: a quantity of the multiple computing nodes to include as part of the virtual computer network; one or more particular computing nodes to include as part of the virtual computer network; one or more external network nodes to associate with the virtual computer network; a range or other group of multiple virtual network addresses to associate with the multiple computing nodes and external network nodes of the virtual computer network; particular virtual network addresses to associate with particular computing nodes, particular groups of related computing nodes, particular external network nodes, or particular groups of related external network nodes; a type of at least some of the multiple computing nodes of the virtual computer network, such as to reflect quantities and/or types of computing resources to be included with or otherwise available to the computing nodes; a geographic location at which some or all of the computing nodes of the virtual computer network are to be located; network topology information for the virtual computer network, such as to specify logical subnets and/or other logical topology of the virtual computer network; etc. In addition, the configuration information for a virtual computer network may be specified by a user or other entity in various manners in various embodiments, such as by an executing program of the user or other entity that interacts with an API ("application programming interface") provided by the CNS system for that purpose and/or by a user that interactively uses a GUI ("graphical user interface") provided by the CNS system for that purpose.

FIG. 1A is a network diagram illustrating an example of a network-accessible service that provides client-configurable managed computer networks to clients. In particular, in this example, at least some of the managed computer networks may be virtual computer networks, such as virtual computer networks that are created and configured as network extensions to existing remote private computer networks of clients, although in other embodiments the managed computer networks may have other forms and/or be provided in other manners. After configuring such a managed computer network being provided by the network-accessible service, a user or other client of the network-accessible service may interact from one or more remote locations with the provided computer network, such as to execute programs on the computing nodes of the provided computer network, to dynamically modify the provided computer network while it is in use, etc.

In particular, in the illustrated example of FIG. 1A, a configurable network service ("CNS") 105 is available that provides functionality to clients (not shown) over one or more public networks 100 (e.g., over the Internet) to enable the clients to access and use managed computer networks provided to the clients by the CNS 105, including to enable the remote clients to dynamically modify and extend the capabilities of their remote existing private computer networks using cloud computing techniques over the public network 100. In the example of FIG. 1A, a number of clients interact over the public network 100 with a system manager module 110 of the CNS 105 to create and configure various managed computer networks 120 being provided by the CNS 105, with at least some of the provided computer networks 120 optionally being private computer network extensions to remote existing client private networks 130, and with at least some such of those provided computer network extensions 120 being configured to enable access from one or more corresponding client private networks 130 over the public network 100 (e.g., private access via VPN connections established over interconnections 100a and 100b, or access via other types of private or non-private interconnections). In this example embodiment, the system manager module 110 assists in providing functionality of the CNS 105 to the remote clients, such as in conjunction with various optional other modules 115 of the CNS 105 (e.g., various communication manager modules), in conjunction with various optional computing nodes 125 and/or networking devices 195 (e.g., substrate network router devices, edge devices, etc.) that are used by the CNS 105 to provide the managed computer networks 120. In at least some embodiments, the CNS system manager module 110 may execute on one or more computing systems (not shown) of the CNS 105, and may provide one or more APIs that enable remote computing systems to programmatically interact with the module 110 to access some or all functionality of the CNS 105 on behalf of clients (e.g., to create, configure, and/or initiate use of managed computer networks 120). In addition, in at least some embodiments, clients may instead manually interact with the module 110 (e.g., via a GUI provided by the module 110) to perform some or all such actions.

The public network 100 in FIG. 1A may be, for example, a publicly accessible network of linked networks, possibly operated by distinct parties, such as the Internet. The remote client private networks 130 may each include one or more existing private networks, such as a corporate or other private network (e.g., home, university, etc.) that is partially or wholly inaccessible to non-privileged users, and that includes computing systems and/or other networked devices (not shown) of a client. In the illustrated example, the provided computer networks 120 each include multiple computing nodes (not shown), at least some of which may be from the plurality of optional computing nodes 125 provided by or otherwise under the control of the CNS 105, while in other embodiments at least some other computing systems 135 may be used to provide some or all computing nodes for one or more of the provided computer networks 120—such other computing systems 135 may, for example, be provided by or under control of the client for whom a computer network 120 that uses those other computing systems 135 is provided, or may be computing systems that are provided by third parties (e.g., for a fee). In addition, one or more of the provided computer networks 120 may each include one or more external network nodes that are integrated into the provided computer network, such as an external network node that is one of the other computing systems 135 (e.g., operated under control of an entity other than a provider or operator of the configurable network service, such as a client to whom the computer network 120 is provided or instead a third-party to the client and the configurable network service provider) or that is located within one of the private networks 130 for the client to whom the computer network 120 is provided (e.g., operated under control of the client). Each of the provided computer networks 120 may be configured in various ways by the clients for whom they are provided, and may each be a private computer network that is accessible only by the client that creates it, although in other embodiments at least some computer networks provided by the CNS 105 for clients may be publicly accessible. Similarly, while at least some of the provided computer networks 120 in the example may be extensions to remote client computer networks 130 that are private networks, in other embodiments the provided computer networks 120 may be standalone computer networks that are not extensions to other existing computer networks 130 and/or may be extensions to other client computer networks 130 that are not private networks.

Private access between a remote client private computer network 130 and a corresponding private computer network extension 120 provided for a client may be enabled in various ways, such as by establishing a VPN connection or other private connection between them that allows intercommunication over the public network 100 in a private manner. For example, the CNS 105 may automatically perform appropriate configuration on its computing nodes and other networking devices to enable VPN access to a particular private network extension 120 of a client, such as by automatically configuring one or more VPN mechanisms hosted by the CNS 105 (e.g., software and/or hardware VPN mechanisms), and/or may automatically provide appropriate configuration information to the client (e.g., credentials, access points, and/or other parameters) to allow a VPN mechanism hosted on the remote client private network 130 (e.g., a software VPN endpoint that is provided by one of the multiple computing nodes of the provided network extension 120) to establish the VPN access. After VPN access has been appropriately enabled and/or configured, a VPN connection may be established between the remote client private network and the provided private network extension, such as initiated by the client using IPsec ("Internet Protocol Security"), or instead a VPN connection or other private connection may be established to or between networks that use MPLS ("Multi Protocol Label Switching") for data transmission or other appropriate communication technologies. In addition, in the illustrated example, various network-accessible remote resource services 140 may optionally be available to remote computing systems over the public network 100, including to computing nodes on the remote client private networks 130. The resource services 140 may provide various functionality to the remote computing nodes, such as for at least some of the resource services 140 to provide remote computing nodes with access to various types of network-accessible computing-related resources (e.g., long-term storage capabilities, such as block storage that is mountable by particular computing nodes of the provided computer networks 120, or storage that is otherwise accessible from particular computing nodes of the provided computer networks 120 using API calls). Furthermore, at least some of the computer networks 120 that are provided by the CNS 105 may be configured to provide access to at least some of the remote resource services 140, with that provided access optionally appearing to computing nodes of the provided computer networks 120 as being locally provided via virtual connections 117 that are part of the provided computer networks 120, although the actual communications with the remote resource services 140 may occur over the public networks 100 (e.g., via interconnections 100*b* and 100*c*). In addition, in at least some embodiments, multiple distinct provided computer networks 120 may be configured to enable inter-access with each other.

The provided computer networks 120 may each be configured by clients in various manners. For example, in at least some embodiments, the CNS 105 provides various computing nodes 125 that are available for use with computer networks provided to clients, such that each provided computer network 120 may include a client-configured quantity of multiple such computing nodes that are dedicated for use as part of that provided computer network. In particular, a client may interact with the module 110 to configure a quantity of computing nodes to initially be included in a computer network provided for the client (e.g., via one or more programmatic interactions with an API provided by the CNS 105). In addition, the CNS 105 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client. In addition, in at least some embodiments, a client may interact with the module 110 to configure network addresses for a computer network provided for the client (e.g., via one or more programmatic interactions with an API provided by the CNS 105), and network addresses may later be dynamically added, removed or modified for a provided computer network of a client in at least some such embodiments, such as after the provided computer network has already been in use by the client. Furthermore, in at least some embodiments, a client may interact with the module 110 to configure network topology information for a computer network provided for the client (e.g., via one or more programmatic interactions with an API provided by the CNS 105), including to specify one or more external network nodes for the provided computer network, and such network topology information may later be dynamically modified for a provided computer network in at least some such embodiments, such as after the provided computer network has already been in use by the client. Moreover, in at least some embodiments, a client may interact with the module 110 to configure various network access constraint information for a computer network provided for the client (e.g., via one or more programmatic interactions with an API provided by the CNS 105), and such network access constraint information may later be dynamically modified for a provided computer network in at least some such embodiments, such as after the provided computer network has already been in use by the client.

Network addresses may be configured for a provided computer network in various manners in various embodiments. For example, the client may specify one or more address ranges (e.g., a Classless Inter-Domain Routing ("CIDR") address block) or other groups of network addresses for the provided computer network, such that at least some of the specified network addresses are used for the computing nodes of the provided computer network, and with those specified network addresses optionally being a subset of network addresses used by an existing remote client computer network if the provided computer network is configured to be an extension to the remote client computer network. Such configured network addresses may in some situations be virtual or private network addresses that are not directly addressable from computing systems on the public network 100 (e.g., if the existing remote client computer network and the corresponding provided network extension use network address translation techniques and/or virtual networking techniques for the client computer network and its provided network extension), while in other situations at least some of the configured network addresses may be external public network addresses that are directly addressable from computing systems on the public network 100 (e.g., a public network address that is a static Internet-routable IP address or other non-changing network address). In other embodiments, the CNS 105 may automatically select network addresses to be assigned to at least some computing nodes of at least some provided computer networks and/or at least some external network nodes of at least some provided computer networks, such as based on network addresses that are available for use by the CNS 105, based on selecting network addresses that are related to network addresses used by remote existing computer networks corresponding to the provided computer networks, etc. Furthermore, if two or more of the computer networks provided by the CNS 105 are configured to enable inter-communications between the provided computer networks (e.g., for two or more computer networks provided to a single customer, such as for different departments or groups within a single organization; for two or more computer networks provided to two or more distinct customers; etc.), the CNS 105 may in some embodiments automatically select network addresses to be used for at least some computing nodes of those provided computer networks to facilitate the inter-communications, such as by using different network addresses for the various provided computer networks. In addition, in at least some embodiments in which the CNS 105 provides virtual networks to clients, such as by using overlay networks on a substrate network, each client may be allowed to specify any network addresses to be used for their provided computer networks, even if multiple clients specify the same or overlapping network addresses for their respective provided computer networks—in such embodiments, the CNS 105 manages the network addresses distinctly for each client, such that a first client may have a first computing node associated with a particular specified network address for the first client's provided computer network, while a distinct second client may have a distinct second computing node associated with the same particular specified network address for the second client's provided computer network. Once network addresses are configured or otherwise determined for a provided computer network, the CNS 105 may assign the network addresses to various of the computing nodes selected for the provided computer network, such as in a random manner, by using DHCP ("Dynamic Host Configuration Protocol") or other techniques for dynamic assignment of network addresses, etc.

Network topology information may be configured for a provided computer network in various manners in various embodiments. For example, a client may specify particular types of networking devices (e.g., routers, switches, etc.) and/or other network devices or nodes (e.g., load balancers, firewalls, proxies, network storage devices, printers, etc.) to be part of the provided computer network, and may specify interconnectivity information between networking devices and computing nodes. Furthermore, in at least some embodiments, the CNS 105 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CNS 105 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; constraints or other preferences based on the cost of obtaining use of particular computing nodes and/or for particular types of interactions with particular computing nodes, such as costs associated with providing data to and/or from those computing nodes; etc.). As discussed in greater detail elsewhere, in at least some embodiments, the interconnections and intercommunications between computing nodes of a provided computer network are managed using an underlying substrate network (not shown) of the CNS 105, and if so, some or all of the configured network topology information may be simulated or otherwise emulated in at least some such embodiments using the underlying substrate network and corresponding modules of the CNS 105. For example, each of the computing nodes provided by the CNS 105 may be associated with a node communication manager module of the CNS 105 that manages communications to and from its associated computing node(s), and if so, the associated communication manager module for a computing node may take various actions to emulate desired functionality of a network with respect to that computing node, as discussed in greater detail elsewhere. Similarly, one or more external network nodes may be specified for a particular provided virtual computer network, and each of the external network nodes may be associated with a translation manager module of the CNS 105 that manages communications to and from its associated external network node(s), and if so, the associated translation manager module for an external network node may take various actions to emulate desired functionality of a network with respect to that external network node, as discussed in greater detail elsewhere.

Network access constraint information may also be configured for a provided computer network in various manners in various embodiments. For example, a client may specify information about whether and how some or all of the computing nodes of a provided computer network are allowed to communicate with other computing nodes of the provided computer network and/or with other external computing systems, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which access has been established, external to the provided computer network and any corresponding remote client computer network, etc.); types of other computing systems; etc. In a manner similar to that for network topology information, the CNS 105 may enforce network access constraint information for provided computer networks in various manners.

Thus, managed computer networks may be provided for clients in various manners in various embodiments, and may be configured to have various types of functionality in various embodiments.

In addition, in at least some embodiments, the computing nodes of the managed computer networks may be physical computing systems and/or may be virtual machines that are each hosted on one or more physical computing systems, and the communications that are handled for managed computer networks may include transmissions of data (e.g., messages, packets, frames, streams, etc.) in various formats. As previously noted, some or all computing nodes used for a particular provided overlay virtual computer network may in some embodiments be provided by the CNS system for use by users, while in other embodiments some or all such computing nodes may instead be provided by a user who uses those computing nodes. Similarly, external network nodes may have various forms, and be provided by the CNS system or by other entities that are unrelated to the operator of the CNS system in various embodiments. Furthermore, in at least some situations, an embodiment of the CNS system may be part of or otherwise affiliated with a program execution service (or "PES") that executes multiple programs on behalf of multiple customers or other users of the service, such as a program execution service that uses multiple computing systems on multiple physical networks (e.g., multiple physical computing systems and networks within a data center). In at least some such embodiments, virtual computer networks to which computing nodes belong may be selected based on associated users, such as based on the computing nodes executing programs on behalf of a user or other entity.

As previously noted, a virtual computer network may in some embodiments be provided as an overlay network that uses one or more intermediate physical networks as a substrate network, and one or more such overlay virtual computer networks may be implemented over the substrate network in various ways in various embodiments. For example, in at least some embodiments, communications between nodes of an overlay virtual computer network are managed by encoding and sending those communications over the substrate network without encapsulating the communications, such as by embedding virtual network address information for a computing node of the virtual computer network (e.g., the destination computing node's virtual network address) in a larger physical network address space used for a networking protocol of the one or more intermediate physical networks, while in other embodiments the communications are encoded in other manners (e.g., by storing virtual network address information from the pre-encoded communication in one or more header fields of the encoded communication or otherwise in a manner associated with the encoded communications, such as if the overlay virtual computer network and underlying substrate network use the same networking protocol). As one illustrative example, a virtual computer network may be implemented using 32-bit IPv4 network addresses, and those 32-bit virtual network addresses may be embedded as part of 128-bit IPv6 network addresses used by the one or more intermediate physical networks, such as by reheadering communication packets or other data transmissions (e.g., using Stateless IP/ICMP Translation, or SIIT), or otherwise modifying such data transmissions to translate them from a first networking protocol for which they are configured to a distinct second networking protocol. As another illustrative example, both the virtual computer network and substrate computer network may be implemented using the same network addressing protocol (e.g., IPv4 or IPv6), and data transmissions sent via the provided overlay virtual computer network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay computer networks may be implemented using encapsulation of communications. Additional details related to SIIT are available at "Request For Comments 2765—Stateless IP/ICMP Translation Algorithm", February 2000, Internet Engineering Task Force ("IETF"), which is hereby incorporated by reference in its entirety. This document is also available at the time of filing at tools<dot>ietf<dot>org<slash>html<slash>rfc2765 (where <dot> and <slash> are replaced by the corresponding characters with those names, "." and "/", respectively).

Furthermore, in addition to managing configured network topologies for provided virtual computer networks, the CNS system may use the described techniques to provide various other benefits in various situations, such as limiting communications to and/or from computing nodes of a particular virtual computer network to other computing nodes that belong to that virtual computer network. In this manner, computing nodes that belong to multiple virtual computer networks may share parts of one or more intermediate physical networks, while still maintaining network isolation for computing nodes of a particular virtual computer network. In addition, the use of the described techniques also allows computing nodes to easily be added to and/or removed from a virtual computer network, such as to allow a user to dynamically modify the size of a virtual computer network (e.g., to dynamically modify the quantity of computing nodes to reflect an amount of current need for more or less computing resources). Furthermore, the use of the described techniques also supports changes to an underlying substrate network— for example, if the underlying substrate network is expanded to include additional computing nodes at additional geographical locations, existing or new virtual computer networks being provided may seamlessly use those additional computing nodes, since the underlying substrate network will route communications to and from the substrate network addresses for those additional computing nodes in the same manner as for other previously existing substrate network computing nodes. In at least some embodiments, the underlying substrate network may be of any size (e.g., spanning multiple countries or continents), without regard to network latency between computing nodes at different locations.

At least some such benefits may similarly apply for logical sub-networks (or "subnets") that are specified for such a particular provided virtual computer network, with the substrate network functionality used to emulate various functionality corresponding to the specified logical subnets. For example, the use of the underlying substrate network may enable different computing nodes assigned to a particular logical subnet to be located at any position within the substrate network, with the substrate network forwarding communications to destination computing nodes based on those destination computing nodes' substrate network addresses. As such, the substrate network may support specified logical subnets or other configured network topology for a managed computer network, without any configuration for or other use of information about such specified logical subnets, and with the CNS system modules (e.g., communication manager modules) instead managing the corresponding functionality from the logical edges of the substrate network where the CNS system modules connect to the substrate network.

For illustrative purposes, some embodiments are described below in which specific types of computing nodes, networks, communications, network topologies, and configuration operations are performed. These examples are provided for illustrative purposes and are simplified for the sake of brevity, and the inventive techniques may be used in a wide variety of other situations, some of which are discussed below.

Figure 1B:
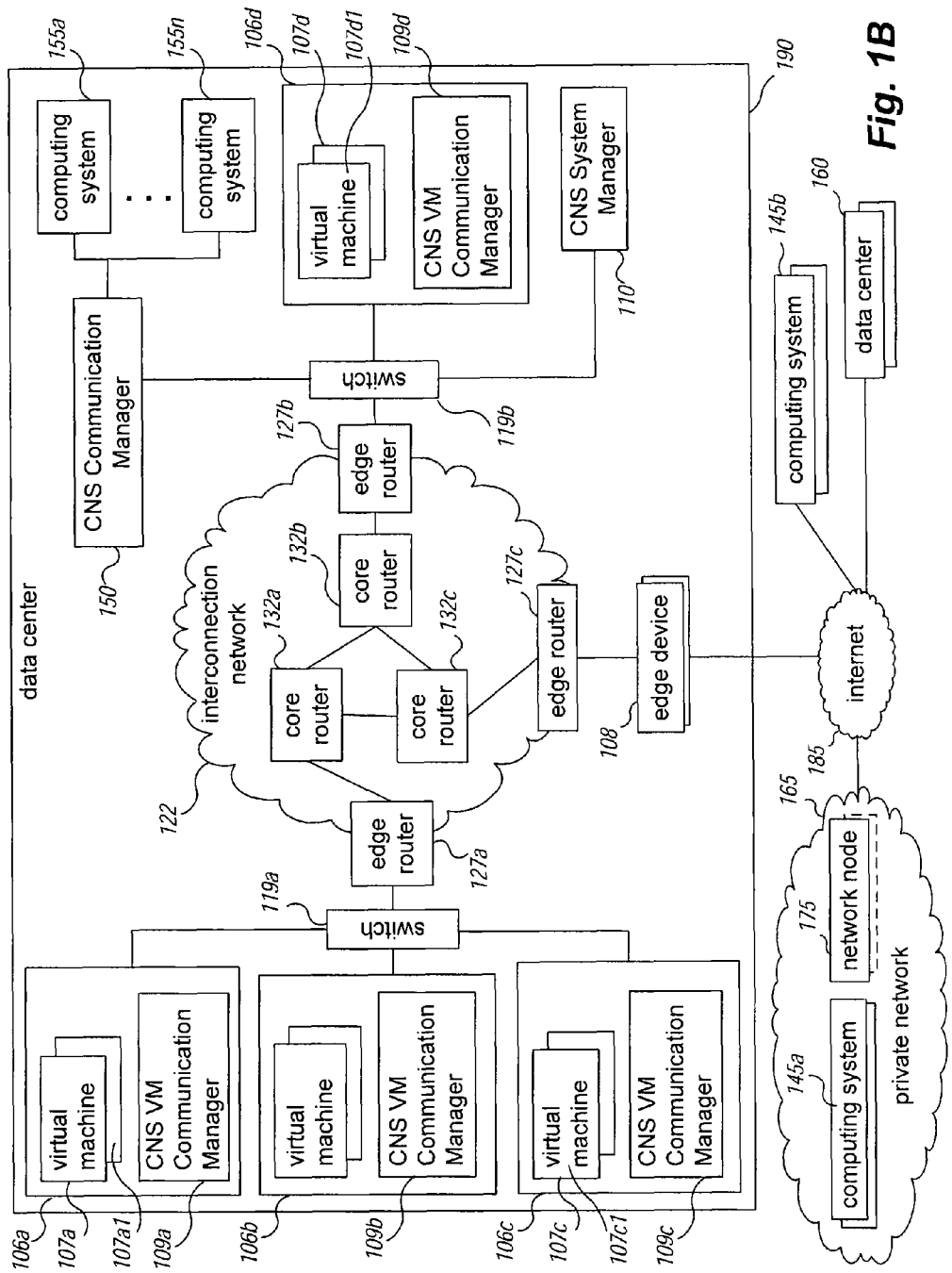

FIG. 1B is a network diagram illustrating an example embodiment of configuring and managing communications between computing nodes belonging to a virtual computer network, by overlaying the virtual computer network and the communications on one or more intermediate physical networks in a manner transparent to the computing nodes of the virtual computer network. In this example, the configuring and managing of the communications is facilitated by a system manager module, multiple communication manager modules, and one or more translation manager modules of an example embodiment of the CNS system. The example CNS system may be used, for example, in conjunction with a publicly accessible program execution service (not shown), or instead may be used in other situations, such as with any use of virtual computer networks on behalf of one or more entities (e.g., to support multiple virtual computer networks for different parts of a business or other organization on a private network of the organization).

The illustrated example includes an example data center 190 with multiple physical computing systems operated on behalf of the CNS system. The example data center 190 is connected via one or more edge devices 108 to an internet 185 external to the data center 190, which provides access to one or more computing systems 145a and possible external network nodes 175 located within private network 165, to one or more other globally accessible data centers 160 that each have multiple computing systems (not shown) and may include possible external network nodes (not shown), and to one or more other computing systems 145b that may be possible external network nodes. Some or all of the edge devices 108 may be configured to operate as or otherwise implement one or more translation manager modules to manage external network nodes. The internet 185 may be, for example, a publicly accessible network of networks (possibly operated by various distinct parties), such as the Internet, and the private network 165 may be, for example, a corporate network that is wholly or partially inaccessible from computing systems external to the private network 165. Computing systems 145b may be, for example, home computing systems or mobile computing devices that each connects directly to the Internet (e.g., via a telephone line, cable modem, a Digital Subscriber Line ("DSL"), cellular network or other wireless connection, etc.).

The example data center 190 includes a number of physical computing systems 106a-106d and 155a-155n, as well as a Communication Manager module 150 that executes on one or more other computing systems or devices (not shown) to manage communications for the associated computing systems 155a-155n, and a System Manager module 110 that executes on one or more computing systems (not shown). In this example, each physical computing system 106a-106d hosts multiple virtual machine computing nodes and includes an associated virtual machine ("VM") communication manager module (e.g., as part of a virtual machine hypervisor monitor for the physical computing system), such as VM Communication Manager module 109a and multiple virtual machines 107a on host computing system 106a, and such as VM Communication Manager module 109d and multiple virtual machines 107d on host computing system 106d. Physical computing systems 155a-155n do not execute any virtual machines in this example, and thus may each act as a computing node that directly executes one or more software programs on behalf of a user. The Communication Manager module 150 that manages communications for the associated computing systems 155a-155n may be implemented as part of various types of devices separate from the physical computing systems 155a-155n, such as, for example, a proxy computing device, a firewall device, or a networking device (e.g., a switch, router, hub, etc.) through which communications to and from the physical computing systems travel. In other embodiments, all or none of the physical computing systems at the data center may host virtual machines.

This example data center 190 further includes multiple physical networking devices, such as switches 119a-119b, edge router devices 127a-127c, and core router devices 132a-132c. Switch 119a is part of a physical sub-network that includes physical computing systems 106a-106c, and is connected to edge router 127a. Switch 119b is part of a distinct physical sub-network that includes physical computing systems 106d and 155a-155n, as well as the computing systems providing the Communication Manager module 150 and the System Manager module 110, and is connected to edge router 127b. The physical sub-networks established by switches 119a-119b, in turn, are connected to each other and other networks (e.g., the internet 185) via an intermediate interconnection network 122, which includes the edge routers 127a-127c and the core routers 132a-132c. The edge routers 127a-127c provide gateways between two or more physical sub-networks or networks. For example, edge router 127a provides a gateway between the physical sub-network established by switch 119a and the interconnection network 122, while edge router 127c provides a gateway between the interconnection network 122 and internet 185 (e.g., via the edge devices 108). The core routers 132a-132c manage communications within the interconnection network 122, such as by routing or otherwise forwarding packets or other data transmissions as appropriate based on characteristics of such data transmissions (e.g., header information including source and/or destination addresses, protocol identifiers, etc.) and/or the characteristics of the interconnection network 122 itself (e.g., routes based on the physical network topology, etc.). In addition, the edge devices 108 may further manage communications between computing nodes at the data center 190 and other external computer systems that are not external network nodes integrated into one or more virtual computer networks overlaid on the interconnection network 122 as a substrate (e.g., external computing systems 145a, external computing systems 145b, computing systems at other external data centers 160, etc.).

The illustrated System Manager module, Communication Manager modules, and edge device Translation Manager modules may perform at least some of the described techniques in order to configure, authorize and otherwise manage communications sent to and from associated computing nodes, including to support providing various virtual networking functionality for one or more virtual computer networks that are provided using various of the computing nodes, and/or to support providing various emulated functionality for one or more virtual networking devices that are configured for one or more such provided virtual computer networks. For example, Communication Manager module 109a manages associated virtual machine computing nodes 107a, Communication Manager module 109d manages associated virtual machine computing nodes 107d, and each of the other Communication Manager modules may similarly manage communications for a group of one or more other associated computing nodes. The illustrated Communication Manager modules may configure communications between computing nodes so as to overlay one or more particular virtual networks over one or more intermediate physical networks that are used as a substrate network, such as over the interconnection network 122. Furthermore, a particular virtual computer network may optionally be extended beyond the data center 190 in some embodiments by using the edge device translation manager modules to assist in integrating one or more external network nodes outside of the data center 190 into the virtual computer network. In other embodiments, a particular virtual computer network may optionally be extended beyond the data center 190 in other manners, such as if one or more other data centers 160 also provide computing nodes that are available for use by the example CNS system, and the particular virtual network includes computing nodes at two or more such data centers at two or more distinct geographical locations. Multiple such data centers or other geographical locations of one or more computing nodes may be inter-connected in various manners, including the following: directly via one or more public networks in a non-private manner, or via a private connection, not shown (e.g., a dedicated physical connection that is not shared with any third parties, such as a leased line; or a VPN or other mechanism that provides the private connection over a public network); etc. In addition, while not illustrated here, other such data centers or other geographical locations may each include one or more other Communication Manager modules that manage communications for computing systems at that data center or other geographical location, as well as over the global internet 135 to the data center 100 and any other such data centers 160.

In addition, a particular virtual computer network may optionally be extended beyond the data center 190 in other manners in other embodiments, such as if one or more other Communication Manager modules at the data center 100 are placed between edge router 127c and the global internet 135 (e.g., if the edge devices 108 each provide at least some of the functionality of a Communication Manager module in encoding and decoding communications for virtual computer networks to use the underlying substrate network 122), or instead based on one or more other Communication Manager modules external to the data center 190 (e.g., if another Communication Manager module, not shown, is made part of private network 165, so as to manage communications for computing systems 145a over the internet 185 and private network 165; etc.). Thus, for example, if an organization operating private network 165 desires to virtually extend its private computer network 165 to one or more of the computing nodes of the data center 190, it may do so by implementing one or more Communication Manager modules as part of the private network 165 (e.g., as part of the interface between the private network 165 and the internet 185)—in this manner, computing systems 145a within the private network 165 may communicate with those data center computing nodes as if those data center computing nodes were part of the private network. In other embodiments, the private computer network 165 may instead be extended to one or more computing nodes of the data center 190 by the module 108 of the data center 190 managing the communications between computing nodes of the private network 165 and particular data center 190 computing nodes.

Thus, as one illustrative example, one of the virtual machine computing nodes 107a on computing system 106a (in this example, virtual machine computing node 107a1) may be part of the same provided virtual computer network as one of the virtual machine computing nodes 107d on computing system 106d (in this example, virtual machine computing node 107d1), and may further both be assigned to a specified logical subnet of that virtual computer network that includes a subset of the computing nodes for that virtual computer network, such as with the IPv4 networking protocol being used to represent the virtual network addresses for the virtual computer network. The virtual machine 107a1 may then direct an outgoing communication (not shown) to the destination virtual machine computing node 107d1, such as by specifying a virtual network address for that destination virtual machine computing node (e.g., a virtual network address that is unique for the local broadcast domain of the specified logical subnet). The Communication Manager module 109a receives the outgoing communication, and in at least some embodiments determines whether to authorize the sending of the outgoing communication, such as based on previously obtained information about the sending virtual machine computing node 107a1 and/or about the destination virtual machine computing node 107d1 (e.g., information about virtual computer networks and/or entities with which the computing nodes are associated, information about any specified logical subnets to which the computing nodes belong, etc.), and/or by dynamically interacting with the System Manager module 110 (e.g., to obtain an authorization determination, to obtain some or all such information, etc.). By not delivering unauthorized communications to computing nodes, network isolation and security of entities' virtual computer networks is enhanced.

Figure 2A:
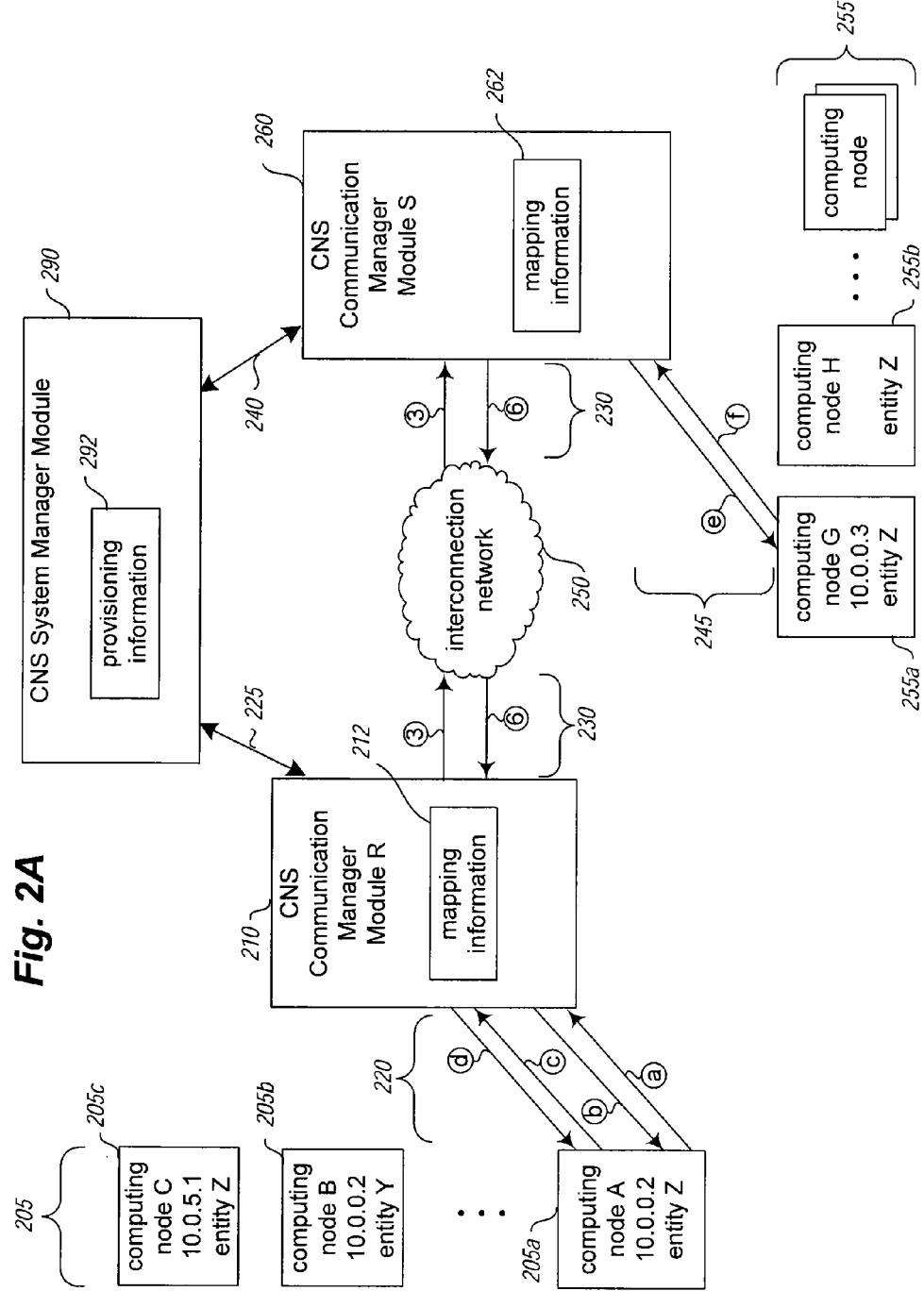
FIGS. 2A-2F illustrate examples of managing communications between computing nodes of a managed virtual overlay computer network.
Figure 2B:
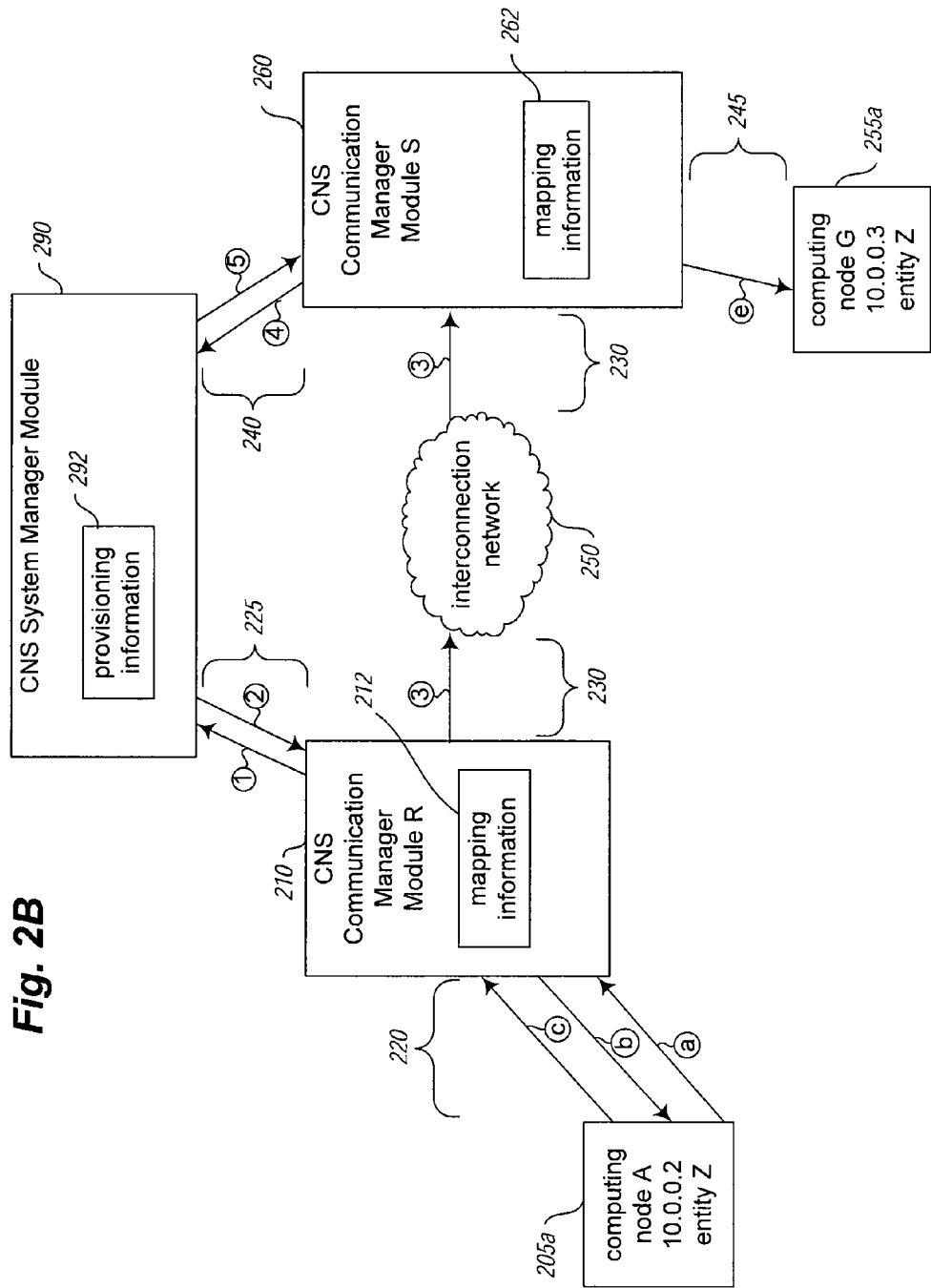

If the Communication Manager module 109a determines that the outgoing communication is authorized (or does not perform such an authorization determination), the module 109a determines the actual physical network location corresponding to the destination virtual network address for the communication. For example, the Communication Manager module 109a may determine the actual destination network address to use for the virtual network address of the destination virtual machine 107d1 by dynamically interacting with the System Manager module 110, or may have previously determined and stored that information (e.g., in response to a request from the sending virtual machine 107a1 for information about that destination virtual network address, such as a request that the virtual machine 107a1 specifies using Address Resolution Protocol, or ARP). The Communication Manager module 109a then re-headers or otherwise modifies the outgoing communication so that it is directed to Communication Manager module 109d using an actual substrate network address, such as if Communication Manager module 109d is associated with a range of multiple such actual substrate network addresses. FIGS. 2A-2B provide examples of doing such communication management in some embodiments.

When Communication Manager module 109d receives the communication via the interconnection network 122 in this example, it obtains the virtual destination network address for the communication (e.g., by extracting the virtual destination network address from the communication), and determines to which of the virtual machine computing nodes 107d managed by the Communication Manager module 109d that the communication is directed. The Communication Manager module 109d next determines whether the communication is authorized for the destination virtual machine computing node 107d1, with examples of such authorization activities discussed in further detail in the examples of FIGS. 2A-2B. If the communication is determined to be authorized (or the Communication Manager module 109d does not perform such an authorization determination), the Communication Manager module 109d then re-headers or otherwise modifies the incoming communication so that it is directed to the destination virtual machine computing node 107d1 using an appropriate virtual network address for the virtual computer network, such as by using the sending virtual machine computing node 107a1's virtual network address as the source network address and by using the destination virtual machine computing node 107d1's virtual network address as the destination network address. The Communication Manager module 109d then forwards or otherwise provides the modified communication to the destination virtual machine computing node 107d1, such as via shared memory (not shown) of the computing system 106d that is used to provide a logical network interface for the destination virtual machine computing node 107d1. In at least some embodiments, before forwarding the incoming communication to the destination virtual machine, the Communication Manager module 109d may also perform additional steps related to security, as discussed in greater detail elsewhere.

In addition, while not illustrated in FIG. 1B, in some embodiments the various Communication Manager modules may take further actions to provide virtual networking functionality corresponding to a specified network topology for the provided virtual computer network (e.g., for one or more virtual networking devices for the provided virtual computer network), such as by managing communications between computing nodes of the provided virtual computer network in specified manners and by responding to other types of requests sent by computing nodes of the virtual computer network. For example, although being separated from computing node 107a1 on physical computing system 106a by the interconnection network 122 in the example embodiment of FIG. 1B, virtual machine computing node 107d1 on physical computing system 106d may be configured to be part of the same logical sub-network of the virtual computer network as computing node 107a1 (e.g., to not be separated by any logical router devices specified for the provided virtual computer network). Conversely, despite the physical proximity of virtual machine computing node 107c1 on physical computing system 106c to virtual machine computing node 107a1 on physical computing system 106a (i.e., being part of the same physical sub-network without any intervening physical substrate router devices) in the example embodiment of FIG. 1B, computing node 107c1 may be configured to be part of a distinct logical sub-network of the virtual computer network from that of computing node 107a1 (e.g., may be configured to be separated by one or more specified router devices of the provided virtual computer network, not shown, which in this example are virtual router devices that are not physically provided for the virtual computer network). If computing nodes 107a1 and 107d1 are configured to be part of the same logical sub-network, the previous example of sending a communication from computing node 107a1 to computing node 107d1 may be performed in the manner previously described, without emulating the actions of any intervening virtual router devices (despite the use of multiple physical router devices in the substrate interconnection network 122 for forwarding the communication), since computing nodes 107a1 and 107d1 are configured to be part of single sub-network in the specified network topology.

However, if computing node 107a1 sends an additional communication to computing node 107c1, the Communication Manager modules 109a and/or 109c on the host computing systems 106a and 106c may perform additional actions that correspond to one or more virtual specified router devices configured in the specified network topology for the provided virtual computer network to separate the computing nodes 107a1 and 107c1. For example, the source computing node 107a1 may send the additional communication in such a manner as to initially direct it to a first of the virtual specified router devices that is configured to be local to computing node 107a1 (e.g., by including a virtual hardware address in the header of the additional communication that corresponds to that first virtual specified router device), with that first virtual specified router device being expected to forward the additional communication on toward the destination computing node 107c1 via the specified logical network topology. If so, the source Communication Manager module 109a may detect that forwarding of the additional communication to the virtual first router device (e.g., based on the virtual hardware address used in the header of the additional communication), or otherwise be aware of the configured network topology for the virtual computer network, and may take actions to emulate functionality of some or all of the virtual specified router devices that are configured in the specified network topology to separate the computing nodes 107a1 and 107c1. For example, each virtual router device that forwards the additional communication may be expected to take actions such as modifying a TTL ("time to live") hop value for the communication, modify a virtual destination hardware address that is specified for the communication to indicate the next intended destination of the additional communication on a route to the destination computing node, and/or otherwise modify the communication header. If so, the source Communication Manager module 109a may perform some or all of those actions before forwarding the additional communication directly to the destination Communication Manager module 109c over the substrate network (in this case, via physical switch device 119a) for provision to destination computing node 107c1. Alternatively, some or all such additional actions to provide the virtual networking functionality for the sent additional communication may instead be performed by the destination Communication Manager module 109c after the additional communication is forwarded to the Communication Manager module 109c by the Communication Manager module 109a.

Furthermore, as part of the prior continuing example, computing node 107a1 may determine to send a third communication to a final destination computer system external to the data center and the interconnection network 122, such as to a particular external network node 175 that is integrated into the computer network to which computing node 107a1 belongs, or such as to a particular computing system 145a (e.g., with the particular computing system 145a not being part of the virtual computer network to which computing node 107a1 belongs). In this situation, the Communication Manager module 109a on the host computing system 106a that is associated with the source computing node 107a1 may further perform additional actions to support the use of an intermediate destination for the communication. If the third communication is being sent to a particular external network node 175, the Communication Manager module 109a determines that the external network node 175 is associated with one of the edge device translation manager modules 108, and encodes the outgoing third communication from the source computing node 107a1 for forwarding over the substrate network 122 from the host computing system 106a to that edge device 108. That edge device translation manager module 108 then receives the encoded third communication, decodes the received communication by removing substrate-specific information and/or formatting, determines a particular external network address of the destination external network node 175 (e.g., based on a mapping of that external network address to a virtual network address assigned to the destination external network node 175), optionally adds network-identifying information to the decoded communication, and forwards the decoded communication over the internet 185 to the destination external network node 175. For example, in order to determine how to forward the third communication to the destination external network node 175, the edge device translation manager module 108 may identify the type of encoding to use for that destination external network node 175 (e.g., a particular publicly routable external network address associated with the destination external network node 175, such as to direct the communication to the edge of the private network 165, and/or various information specific to the private network 165, such as information about a VLAN identifier or MPLS label that the private network 165 uses to represent the managed virtual computer network) and encode the communication accordingly. By providing virtual networking functionality using the described techniques, the CNS system provides various benefits. For example, because the various Communication Manager modules and Translation Manager modules manage the overlay virtual network, specified networking devices and other network topology do not need to be physically implemented for virtual computer networks being provided, and thus corresponding modifications are not needed to the interconnection network 122 to support particular configured network topologies. Nonetheless, if the computing nodes and software programs of a virtual computer network have been configured to expect a particular network topology for the provided virtual computer network, the appearance and functionality of that network topology may nonetheless be transparently provided for those computing nodes by the described techniques. In addition, the use of the described techniques by the CNS system enables external network nodes to be integrated into virtual computer networks and used in specified manners, such as to enable the virtual computer network to obtain access to functionality that may not otherwise be available.

Thus, various aspects of providing managed computer networks are described above, as well as elsewhere in this document, including to support virtual computer networks that are overlaid on an underlying substrate network. In addition, in at least some embodiments, the CNS system may use multiple communication manager modules in additional manners, such as to emulate responses to networking requests made by computing nodes in the manner of a local physical networking device, including to respond to ping requests, SNMP ("Simple Network Management Protocol") queries, etc. Furthermore, as described in greater detail below, in at least some embodiments, multiple modules of the CNS system may operate together in a distributed manner to provide a particular type of functionality (e.g., functionality corresponding to a particular logical networking device), such that no single module or physical device is singly responsible for emulating that particular type of functionality, as well as to provide functionality corresponding to integrating external network nodes into virtual computer networks.

FIGS. 2A-2F illustrate further examples with additional illustrative details related to managing communications between computing nodes that occur via an overlay network over one or more physical networks, such as may be used by the computing nodes and networks of FIGS. 1A and/or 1B, or in other situations. In these examples, FIGS. 2A and 2B illustrate details regarding actions of various modules of an example CNS system in managing communications for computing nodes of a managed computer network that are sent directly to their final destinations, while FIGS. 2C-2F illustrate additional details regarding managing communications that are sent to final destinations via intermediate destination computing nodes.

In particular, FIG. 2A illustrates various example computing nodes 205 and 255 that may communicate with each other by using one or more intermediate interconnection networks 250 as a substrate network. In this example, IPv4 virtual computer networks are overlaid on an underlying substrate interconnection network 250, with the substrate network being, for example, a distinct IPv4 network or an IPv6 substrate network, although in other embodiments the interconnection network 250 and overlay virtual computer networks may use other networking protocols. In addition, in this example embodiment, the computing nodes are operated on behalf of multiple distinct entities to whom managed computer networks are provided, and a System Manager module 290 manages the association of particular computing nodes with particular entities and managed virtual computer networks, and tracks various configuration information specified for the managed virtual computer networks. The example computing nodes of FIG. 2A include four computing nodes that are executed on behalf of an example entity Z and that are part of a corresponding first managed virtual computer network provided for client entity Z, those being computing nodes 205a, 205c, 255a and 255b. In addition, other computing nodes are operated on behalf of other entities and belong to other provided virtual computer networks, such as computing node 205b that is part of a second managed virtual computer network provided for client entity Y, as well as other computing nodes 255.

In this example, the computing nodes 205 are managed by and physically connected to an associated Communication Manager module R 210, and the computing nodes 255 are managed by and physically connected to an associated Communication Manager module S 260. The CNS Communication Manager modules 210 and 260 are physically connected to an interconnection network 250, as is the System Manager module 290, although the physical interconnections between computing nodes, modules and the interconnection network are not illustrated in this example. As one example, computing nodes 205 may each be one of multiple virtual machines hosted by a single physical computing system, and Communication Manager module R may be part of a hypervisor virtual machine monitor for that physical computing system—if so, communications between the computing nodes 205 and the Communication Manager module R may be passed within that physical computing system without using any intervening computer network, such as via memory of the physical computing system, an internal bus of the physical computing system, etc. For example, with reference to FIG. 1B, computing nodes 205 may represent the virtual machines 107a, and computing nodes 255 may represent the virtual machines 107d. If so, Communication Manager module R would correspond to Communication Manager module 109a of FIG. 1B, Communication Manager module S would correspond to Communication Manager module 109d of FIG. 1B, the interconnection network 250 would correspond to interconnection network 122 of FIG. 1B, and the System Manager module 290 would correspond to System Manager module 110 of FIG. 1B. Alternatively, computing nodes 205 or 255 may instead each be a distinct physical computing system, such as to correspond to computing systems 155a-155n of FIG. 1, or to computing nodes at other data centers or geographical locations (e.g., computing systems at another data center 160, computing systems 145a, etc.).

In this example, each of the Communication Manager modules of FIG. 2A is associated with a group of multiple physical substrate network addresses, which the Communication Manager modules manage on behalf of their associated computing nodes, although in other embodiments each Communication Manager module may instead use a single substrate network address that it shares among two or more associated computing nodes. For example, if the interconnection network 250 is an IPv4 network, Communication Manager module R may be associated with the IPv4 CIDR block 200.0.0.0/29, so as to enable at least some of the IPv4 addresses from 200.0.0.0 to 200.0.0.7 to each be treated as a substrate network address associated with one of the computing nodes, and Communication Manager module S may similarly be associated with the 16 IPv4 network addresses in the IPv4 CIDR block 200.0.10.0/28. Alternatively, if the interconnection network 250 is an IPv6 network, Communication Manager module R may, for example, be associated with the IPv6 network address range of "::0A:01/72", which corresponds to the 128-bit addresses (in hexadecimal) from XXXX:XXXX:XXXX:XXXA: 0100:0000:0000:0000 to XXXX:XXXX:XXXX:XXXA: 01FF:FFFF:FFFF:FFFF (representing 2 to the power of 56 unique IPv6 addresses), where each "X" may represent any hexadecimal character that is appropriate for a particular situation—if so, the interconnection network 250 will forward any communication with a destination network address in that range to Communication Manager module R, and with the initial 72 bits of the range specified, the Communication Manager module R may use the remaining available 56 bits to represent the computing nodes that it manages and to determine how to process incoming communications whose destination network addresses are in that range. If the interconnection network 250 is an IPv6 network, the Communication Manager module S may similarly be associated with an IPv6 network address range such as "::0B:02/72".

For purposes of the example shown in FIG. 2A, computing nodes 205a, 205c, 255a, and 255b are part of a single managed virtual computer network provided for entity Z, and computing nodes 205a, 205c and 255a have assigned IPv4 virtual network addresses of "10.0.0.2", "10.0.5.1" and "10.0.0.3", respectively. Because computing node 205b is part of a distinct managed virtual computer network that is provided for entity Y, it can share the same virtual network address as computing node 205a without confusion. In this example, computing node A 205a intends to communicate with computing node G 255a, with the two computing nodes configured in this example to be part of a single common physical local area sub-network (not shown) in a configured network topology for the managed virtual computer network, and the interconnection network 250 and Communication Manager modules are transparent to computing nodes A and G in this example. In particular, despite the physical separation of computing nodes A and G, the Communication Manager modules 210 and 260 operate so as to overlay the managed virtual computer network for entity Z over the physical interconnection network 250 for communications between those computing nodes, including to emulate functionality corresponding to the configured local area sub-network of the managed virtual computer network, so that the lack of an actual local area sub-network is transparent to the computing nodes A and G.

In order to send the communication to computing node G, computing node A exchanges various messages 220 with Communication Manager module R 210, despite in the illustrated embodiment being unaware of the existence of Communication Manager module R (i.e., computing node A may believe that it is transmitting a broadcast message to all other nodes on the local sub-network, such as via a specified switching device that computing node A believes connects the nodes on the local sub-network). In particular, in this example, computing node A first sends an ARP message request 220-a that includes the virtual network address for computing node G (i.e., "10.0.0.3") and that requests the corresponding hardware address for computing node G (e.g., a 48-bit MAC address). Communication Manager module R intercepts the ARP request 220-a, and responds to computing node A with a spoofed ARP response message 220-b that includes a virtual hardware address for computing node G.

To obtain the virtual hardware address for computing node G to use with the response message, the Communication Manager module R first checks a local store 212 of information that maps virtual hardware addresses to corresponding actual physical substrate network addresses, with each of the virtual hardware addresses also corresponding to an IPv4 virtual network address for a particular entity's managed virtual computer network. If the local store 212 does not contain an entry for computing node G (e.g., if none of the computing nodes 205 have previously communicated with computing node G and the System Manager module 290 does not push mapping information to the Communication Manager Module R without request; if a prior entry in local store 212 for computing node G has expired based on an associated expiration time; etc.), the Communication Manager module R interacts 225 with System Manager module 290 to obtain the corresponding actual physical substrate network address for computing node G on behalf of computing node A. In particular, in this example, the System Manager module 290 maintains provisioning information 292 that identifies where each computing node is actually located and to which entity and/or managed virtual computer network the computing node belongs, such as by initiating execution of programs on computing nodes for entities and virtual computer networks or by otherwise obtaining such provisioning information. As discussed in greater detail with respect to FIG. 2B, the System Manager module may determine whether the request from Communication Manager module R on behalf of computing node A for computing node G's actual physical substrate network address is valid, including whether computing node A is authorized to communicate with computing node G (e.g., such as based on being part of the same configured local area sub-network), and if so provides that actual physical substrate network address.

Communication Manager module R receives the actual physical substrate network address for computing node G from the System Manager module 290, and stores this received information as part of an entry for computing node G as part of mapping information 212 for later use (optionally with an expiration time and/or other information). In addition, in this example, Communication Manager module R determines a virtual hardware address to be used for computing node G (e.g., by generating a dummy identifier that is locally unique for the computing nodes managed by Communication Manager module R), stores that virtual hardware address in conjunction with the received actual physical substrate network address as part of the mapping information entry, and provides the virtual hardware address to computing node A as part of response message 220-b. By maintaining such mapping information 212, later communications from computing node A to computing node G may be authorized by Communication Manager module R without further interactions with the System Manager module 290, based on the use of the virtual hardware address previously provided by Communication Manager module R. In some embodiments, the hardware address used by Communication Manager module R for computing node G may not be a dummy address, such as if System Manager module 290 further maintains information about hardware addresses used by the various computing nodes (e.g., virtual hardware addresses assigned to virtual machine computing nodes, actual hardware addresses assigned to computing systems acting as computing nodes, etc.) and provides the hardware address used by computing node G to Communication Manager module R as part of the interactions 225. In such embodiments, the Communication Manager module R may take further actions if computing nodes on different virtual networks use the same virtual hardware address, such as to map each combination of computing node hardware address and managed virtual computer network to a corresponding substrate network address.

In other embodiments, Communication Manager module R may interact with System Manager module 290 to obtain a physical substrate network address for computing node G or otherwise determine such a physical substrate network address at times other than upon receiving an ARP request, such as in response to any received communication that is directed to computing node G using the virtual network address "10.0.0.3" as part of entity Z's virtual computer network, or if the System Manager module provides that information to Communication Manager module R without request (e.g., periodically, upon changes in the information, etc.). Furthermore, in other embodiments, the virtual hardware addresses that are used may differ from this example, such as if the virtual hardware addresses are specified by the System Manager module 290, if the virtual hardware addresses are not random and instead store one or more types of information specific to the corresponding computing nodes, etc. In addition, in this example, if computing node A had not been determined to be authorized to send communications to computing node G, whether by the System Manager module 290 and/or Communication Manager module R, Communication Manager module R would not send the response message 220-b with the virtual hardware address (e.g., instead sends no response or an error message response).

In this example, if the interconnection network 250 is an IPv4 network, the returned actual physical substrate network address corresponding to computing node G in interactions 225 may be, for example, "200.0.10.2", such as if the System Manager module 290 and/or the Communication Manager module S 260 has selected that substrate network address to represent computing node G from the substrate network address range associated with Communication Manager module S 260—thus, a communication sent over the interconnection network 250 to "200.0.10.2" will be routed to Communication Manager module S for handling. Alternatively, if the interconnection network 250 is an IP64 network, the returned IPv6 actual physical substrate network address corresponding to computing node G in interactions 225 may be "::0B:02:<Z-identifier>:10.0.0.3", where "10.0.0.3" is stored in the last 32 bits of the 128-bit IPv6 address, and where "<Z-identifier>" is a 24-bit entity network identifier for computing node G corresponding to the managed virtual computer network for entity Z (e.g., as previously assigned by the System Manager module to that network to reflect a random number or some other number corresponding to the entity). In this example, the initial 72 bits of the IPv6 network address store the "::0B:02" designation, corresponding to the sub-network or other portion of the physical interconnection network with a network address range of "::0B:02/72" to which Communication Manager module S corresponds—thus, a communication sent over the interconnection network 250 to IPv6 destination network address "::0B:02:<Z-identifier>10.0.0.3" will similarly be routed to Communication Manager module S for handling. In other embodiments, the entity network identifier may be other lengths (e.g., 32 bits, if Communication Manager module S has an associated network address range of 64 bits rather than 56 bits) and/or may have other forms (e.g., may be random, may store various types of information, etc.), and the remaining 56 bits used for the network address range after the "::0B:02" designation may store other types of information (e.g., an identifier for a particular entity, a tag or label for the virtual computer network, an identifier for a particular specified VLAN to which computing node G is assigned, etc.). In addition, some or all such information may instead be stored and/or transmitted with a communication to computing node G in other manners in other embodiments, such as by including the information in a header of the communication, including in situations in which the substrate network uses the IPv4 networking protocol.

After receiving the response message 220-b from Communication Manager module R, computing node A creates and initiates the sending of a communication to computing node G, shown in FIG. 2A as communication 220-c. In particular, the header of communication 220-c includes a destination network address for destination computing node G that is "10.0.0.3", a destination hardware address for destination computing node G that is the virtual hardware address provided to computing node A in message 220-b, a source network address for sending computing node A that is "10.0.0.2", and a source hardware address for sending computing node A that is an actual or dummy hardware address that was previously identified to computing node A (e.g., by Communication Manager module R, based on a configuration of computing node A, etc.). Since computing node A believes that computing node G is part of the same local sub-network as itself, computing node A does not need to direct the communication 220-c to any intermediate logical router devices that are configured in a network topology for the managed virtual computer network to separate the computing nodes.

Communication Manager module R intercepts the communication 220-c, modifies the communication as appropriate, and forwards the modified communication over the interconnection network 250 to computing node G. In particular, Communication Manager module R extracts the virtual destination network address and virtual destination hardware address for computing node G from the header, and then retrieves the actual physical substrate network address corresponding to that virtual destination hardware address from mapping information 212. As previously noted, the actual physical substrate network address may be, for example, "200.0.10.2" or "::0B:02:<Z-identifier>:10.0.0.3", and Communication Manager module R creates a new IPv4 or IPv6 header for the encoded new communication (depending on whether the interconnection network is an IPv4 or IPv6 network, respectively) that includes that actual physical substrate network address as the destination address. Similarly, the Communication Manager module R extracts the virtual source network address and virtual source hardware address for computing node A from the header of the received communication, obtains an actual physical substrate network address corresponding to that virtual source hardware address (e.g., from a stored entry in mapping information 212, by interacting with the System Manager module 290 to obtain that information if not previously obtained, etc.), and includes that actual physical substrate network address as the source network address for the new header of the new encoded communication. In this example, the actual physical substrate network address for computing node A may be "200.0.0.1" (if the interconnection network is an IPv4 network) or "::0A:01:<Z-identifier>:10.0.0.2" (if the interconnection network is an IPv6 network), which if used in a reply by Communication Manager module S on behalf of computing node G will be routed to Communication Manager module R for forwarding to computing node A. The Communication Manager module R then creates communication 230-3 by modifying communication 220-c so as to replace the prior IPv4 header with the new header (e.g., in accordance with SIIT), including populating the new header with other information as appropriate for the encoded modified communication (e.g., payload length, traffic class packet priority, etc.). Thus, the communication 230-3 includes the same content or payload as communication 220-c, without encapsulating the communication 220-c within the communication 230-3 in this example. Furthermore, access to the specific information within the payload is not needed for such reheadering, such as to allow Communication Manager module R to handle communications in which the payload is encrypted without needing to decrypt that payload.

In at least some embodiments, before forwarding communication 230-3 to Communication Manager module S, Communication Manager module R may perform one or more actions to determine that communication 220-c is authorized to be forwarded to computing node G as communication 230-3, such as based on the mapping information 212 including a valid entry for the destination virtual hardware address used in communication 220-c (e.g., an entry specific to sending computing node 205a in some embodiments, or instead an entry corresponding to any of the computing nodes 205 in other embodiments). In other embodiments, such an authorization determination may not be performed by Communication Manager module R for each outgoing communication, or instead may be performed in other manners (e.g., based on a determination that the sending node and destination node are part of the same managed virtual computer network, are associated with the same entity, or are otherwise authorized to inter-communicate; based on an interaction with System Manager module 290 to obtain an authorization determination for the communication; etc.).

After Communication Manager module R forwards the modified communication 230-3 to the interconnection network 250, the interconnection network uses the physical destination substrate network address of the encoded communication to route the communication to Communication Manager module S. In doing so, the devices of the interconnection network 250 do not use information about the overlay virtual network addresses for computing nodes A or G or the entity network identifier for their virtual computer network, and thus do not need any special configuration to forward such a communication, nor even awareness that a managed virtual computer network is being overlaid on the physical interconnection network.

When Communication Manager module S receives communication 230-3 via the interconnection network 250, it performs actions similar to those of Communication Manager module R, but in reverse. In particular, in at least some embodiments, the Communication Manager module S verifies that communication 230-3 is legitimate and authorized to be forwarded to computing node G, such as via one or more interactions 240 with the System Manager module. If the communication is determined to be authorized (or if the authorization determination is not performed), the Communication Manager module S then modifies communication 230-3 as appropriate and forwards the modified communication to computing node G. Additional details related to the verification of the communication 230-3 are discussed with respect to FIG. 2B.

In particular, to modify communication 230-3, Communication Manager module S retrieves information from mapping information 262 that corresponds to computing node G, including the virtual hardware address used by computing node G (or generates such a virtual hardware address if not previously available, such as for a new computing node). Communication Manager module S then creates communication 245-e by modifying communication 230-3 so as to replace the prior header of the communication 230-3 encoded for the substrate network with a new IPv4 header for the overlay virtual computer network (e.g., in accordance with SIIT). The new IPv4 header includes the virtual network address and virtual hardware address for computing node G as the destination network address and destination hardware address for the new IPv4 header, the virtual network address and a virtual hardware address for computing node A as the source network address and source hardware address for the new IPv4 header, and includes other information as appropriate for the communication (e.g., total length, header checksum, etc.). The virtual hardware address used by Communication Manager module S for computing node A may be the same as the hardware address used by Communication Manager module R for computing node A, but in other embodiments each Communication Manager module may maintain separate hardware address information that is not related to the information used by the other Communication Manager modules (e.g., if Communication Manager module S generated its own dummy virtual hardware address for computing node A in response to a prior ARP request from one of the computing nodes 255 for computing node A's hardware address). Thus, the communication 245-e includes the same content or payload as communications 220-c and 230-3. Communication Manager module S then provides communication 245-e to computing node G.

After receiving communication 245-e, computing node G determines to send a response communication 245-f to computing node A, using the source virtual network address and source virtual hardware address for computing node A from communication 245-e. Communication Manager module S receives response communication 245-f, and processes it in a manner similar to that previously described with respect to communication 220-c and Communication Manager module R. In particular, Communication Manager module S optionally verifies that computing node G is authorized to send communications to computing node A (e.g., based on being a response to a previous communication, or otherwise based on configuration information for computing nodes A and G as previously described), and then modifies communication 245-f to create communication 230-6 by generating a new substrate network communication header using mapping information 262. After forwarding communication 230-6 to the interconnection network 250, the communication is sent to Communication Manager module R, which processes the incoming communication in a manner similar to that previously described with respect to communication 230-3 and Communication Manager module S. In particular, Communication Manager module R optionally verifies that computing node G is authorized to send communications to computing node A and that communication 230-6 actually was sent from the substrate network location of computing node G, and then modifies communication 230-6 to create response communication 220-d by generating a new IPv4 header for the overlay virtual computer network using mapping information 212. Communication Manager module R then provides response communication 220-d to computing node A. In some embodiments and situations, Communication Manager modules R and/or S may handle response communications differently from initial communications, such as to assume that response communications are authorized in at least some situations, and to not perform some or all authorization activities for response communications in those situations.

In this manner, computing nodes A and G may inter-communicate using a IPv4-based managed virtual computer network, without any special configuration of those computing nodes to handle the actual intervening one or more substrate networks, and substrate interconnection network 250 may forward communications encoded for it without any special configuration of any physical networking devices of the substrate interconnection network, based on the Communication Manager modules overlaying the virtual computer network over the actual physical interconnection network.

In addition, while not illustrated with respect to FIG. 2A, in at least some embodiments the Communication Manager modules may receive and handle other types of requests and communications on behalf of associated computing nodes.

For example, Communication Manager modules may take various actions to support broadcast and multicast capabilities for computing nodes that they manage, including to optionally use various special reserved multicast group virtual network addresses. When a computing node sends a broadcast/multicast communication, any Communication Manager module with an associated computing node that has subscribed to that multicast/broadcast group would be identified (e.g., based on those Communication Manager modules having subscribed to the group, such as in response to prior join communications sent by those associated computing nodes), and the Communication Manager module for the sending computing node would forward the communication to each of the identified Communication Manager modules of the group, for forwarding to their appropriate managed computing nodes. In addition, in some embodiments and situations, at least some broadcast or multicast communications may not be forwarded by Communication Manager modules, such as communications with an IPv4 prefix of 224.0/16 or another designated prefix or other label or identifier. In addition to supporting broadcast and multicast capabilities for managed computing nodes, the Communication Manager modules may receive and handle other types of requests and communications on behalf of associated computing nodes that correspond to configured network topologies for the virtual computer networks to which the computing nodes belong. For example, computing nodes may send various requests that a specified local router device or other specified networking device would be expected to handle (e.g., ping requests, SNMP queries, etc.), and the associated Communication Manager modules may intercept such requests and take various corresponding actions to emulate the functionality that would have been provided by the specified networking device if it was physically implemented.

In addition, it will be appreciated that a Communication Manager module may facilitate communications between multiple of the computing nodes that are associated with that Communication Manager module. For example, with respect to FIG. 2A, computing node 205a may wish to send an additional communication (not shown) to computing node 205c. If so, Communication Manager module R would perform actions similar to those previously described with respect to the handling of outgoing communication 220-c by Communication Manager module R and the handling of incoming communication 230-3 by Communication Manager module S, but without reheadering of the additional communication to use an header for the substrate network since the communication will not travel over the interconnection network. However, if computing nodes 205a and 205c are configured in a network topology for the virtual computer network to be separated by one or more logical networking devices, the Communication Manager module R may take additional actions to emulate the functionality of those logical networking devices.

While not illustrated with respect to FIG. 2A, in at least some embodiments other types of requests and communications may also be handled in various ways. For example, in at least some embodiments, an entity may have one or more computing nodes that are managed by Communication Manager module(s) and that are part of a managed virtual computer network for that entity, and may further have one or more other non-managed computing systems (e.g., computing systems that are directly connected to the interconnection network 250 and/or that natively use the same network addressing protocol as that of the interconnection network) that do not have an associated Communication Manager module that manages their communications. If the entity desires that those non-managed computing systems be part of that virtual computer network or otherwise communicate with the managed computing nodes of the virtual computer network, such communications between managed computing nodes and non-managed computing systems may be handled by the Communication Manager module(s) that manage the one or more computing nodes in at least some such embodiments. For example, in such situations, if such a non-managed computing system is provided with an actual destination substrate network address for such a managed computing node, the non-managed computing system may send communications to the associated Communication Manager module for that managed computing node via interconnection network 250 using that destination substrate network address, and that Communication Manager module would forward those communications to that computing node (e.g., after reheadering the communications in a manner similar to that previously described) if the Communication Manager module is configured to accept communications from that non-managed computing system (or from any non-managed computing system). Furthermore, the Communication Manager module may generate a dummy virtual network address to correspond to such a non-managed computing system, map it to the actual substrate network address for the non-managed computing system, and provide the dummy virtual network address to its managed computing node (e.g., as the source address for the communications forwarded to the computing node from the non-managed computing system), thus allowing the computing node to send communications to the non-managed computing system.

In addition, as previously noted, a communication manager module manages communications for associated computing nodes in various ways, including in some embodiments by assigning virtual network addresses to computing nodes of a provided virtual computer network, and/or by assigning substrate physical network addresses to managed computing nodes from a range of substrate physical network addresses that correspond to the communication manager module. In other embodiments, some such activities may instead be performed by one or more computing nodes of the virtual computer network, such as to allow a DHCP (Dynamic Host Configuration Protocol) server or other device of a virtual computer network to specify virtual network addresses for particular computing nodes of the virtual network. In such embodiments, the communication manager module obtains such configuration information from the virtual computer network device(s), and updates its mapping information accordingly (and in some embodiments may further update one or more system manager modules that maintain information about computing nodes associated with virtual networks). In yet other embodiments, a user or other entity associated with a virtual computer network may directly configure particular computing nodes to use particular virtual network addresses. If so, the communication manager modules and/or system manager module may track which virtual network addresses are used by particular computing nodes, and similarly update stored mapping information accordingly.

FIG. 2B illustrates some of the computing nodes and communications discussed with respect to FIG. 2A, but provides additional details with respect to some actions taken by the Communication Manager modules 210 and 260 and/or the System Manager module 290 to authorize communications between computing nodes. For example, after computing node A sends message 220-a to request a hardware address for computing node G, Communication Manager module R may perform one or more interactions 225 with the System Manager module 290 in order to determine whether to provide that information, such as based on whether computing node A is authorized to communicate with computing node G, as well as to determine a corresponding substrate physical network address for computing node G based on interconnection network 250. If the Communication Manager module R has previously obtained and stored that information and it remains valid (e.g., has not expired), then the interactions 225 may not be performed. In this example, to obtain the desired physical network address corresponding to computing node G, Communication Manager module R sends a message 225-1 to the System Manager module 290 that includes the virtual network addresses for computing nodes A and G, and that includes an entity network identifier for each of the computing nodes, which in this example is an entity network identifier for the managed virtual computer network of entity Z (e.g., a 32-bit or 24-bit unique identifier). In at least some embodiments, Communication Manager module R may send message 225-1 to the System Manager module 290 using an anycast addressing and routing scheme, so that multiple System Manager modules (not shown) may be implemented (e.g., one for each data center that includes Communication Manager modules and associated computing nodes) and an appropriate one of those (e.g., the nearest, the most underutilized, etc.) is selected to receive and handle the message.

After the System Manager module 290 determines that computing node A is authorized to communicate with computing node G (e.g., based on having the same entity network identifier, based on computing node A having an entity network identifier that is authorized to communicate with computing nodes of the entity network identifier for computing node G, based on other information provided by or associated with computing node A indicating that computing node A is authorized to perform such communications, based on information provided by or associated with computing node G indicating that computing node A is authorized to perform such communications, etc.), the System Manager module 290 returns a response message 225-2 that includes the desired actual physical substrate network address corresponding to computing node G. In addition, in at least some embodiments, before sending the desired actual physical network address, the System Manager module 290 may further verify that Communication Manager module R is authorized to send the message 225-1 on behalf of computing node A, such as based on computing node A being determined to be one of the computing nodes to which Communication Manager module R is associated.

In other embodiments, Communication Manager module R may perform some or all of the actions described as being performed by System Manager module 290, such as to maintain provisioning information for the various computing nodes and/or to determine whether computing node A is authorized to send communications to computing node G, or instead no such authorization determination may be performed in some or all situations. Furthermore, in other embodiments, other types of authorization determinations may be performed for a communication between two or more computing nodes, such as based on one or more criteria associated with the communication (e.g., a type of the communication, a size of the communication, a time of the communication, etc.).

As previously noted with respect to FIG. 2A, after Communication Manager module S receives communication 230-3 intended for computing node G via the interconnection network 250, Communication Manager module S may perform one or more interactions 240 with the System Manager module 290 in order to determine whether to authorize that communication. In particular, in this example, to verify that the communication 230-3 is valid and authorized to be forwarded to computing node G, Communication Manager module S first extracts information from the encoded communication 230-3 that indicates the overlay virtual computer network source and destination virtual network addresses for computing nodes A and G and optionally the entity network identifier(s) for those computing nodes (e.g., from header fields in the encoded communication, or by extracting embedded information in the actual destination substrate network address and actual source substrate network address of the encoded communication 230-3). The Communication Manager module S next exchanges messages 240 with System Manager module 290 to obtain the corresponding actual substrate physical network address for the sending computing node A on behalf of computing node G, including a message 240-4 that includes the extracted virtual network addresses for computing nodes A and G in the overlay virtual computer network, as well as the entity network identifier for each of the computing nodes. In at least some embodiments, Communication Manager module S may send message 240-4 to the System Manager module 290 using an anycast addressing and routing scheme as previously described.

The System Manager module 290 receives message 240-4, and returns a response message 240-5 that includes the actual physical substrate network address corresponding to computing node A (e.g., "200.0.0.1" or "::0A:01:<Z-identifier>:10.0.0.2"). As previously discussed with respect to messages 225-1 and 225-2, in some embodiments the System Manager module 290 and/or Communication Manager module S may further perform one or more other types of authorization determination activities, such as to determine that computing node G is authorized to communicate with computing node A, that Communication Manager module S is authorized to send the message 240-4 on behalf of computing node G, etc. Communication Manager module S then verifies that the returned physical substrate network address in response message 240-5 matches the source substrate network address used to send the encoded communication 230-3 over the substrate network, so as to prevent attempts to spoof messages as being from computing node A that are actually sent from other computing nodes in other locations. Communication Manager module S optionally stores this received information from response message 240-5 as part of an entry for computing node A in mapping information 262 for later use, along with computing node A's virtual network address and a virtual hardware address for computing node A.

Figure 2C:
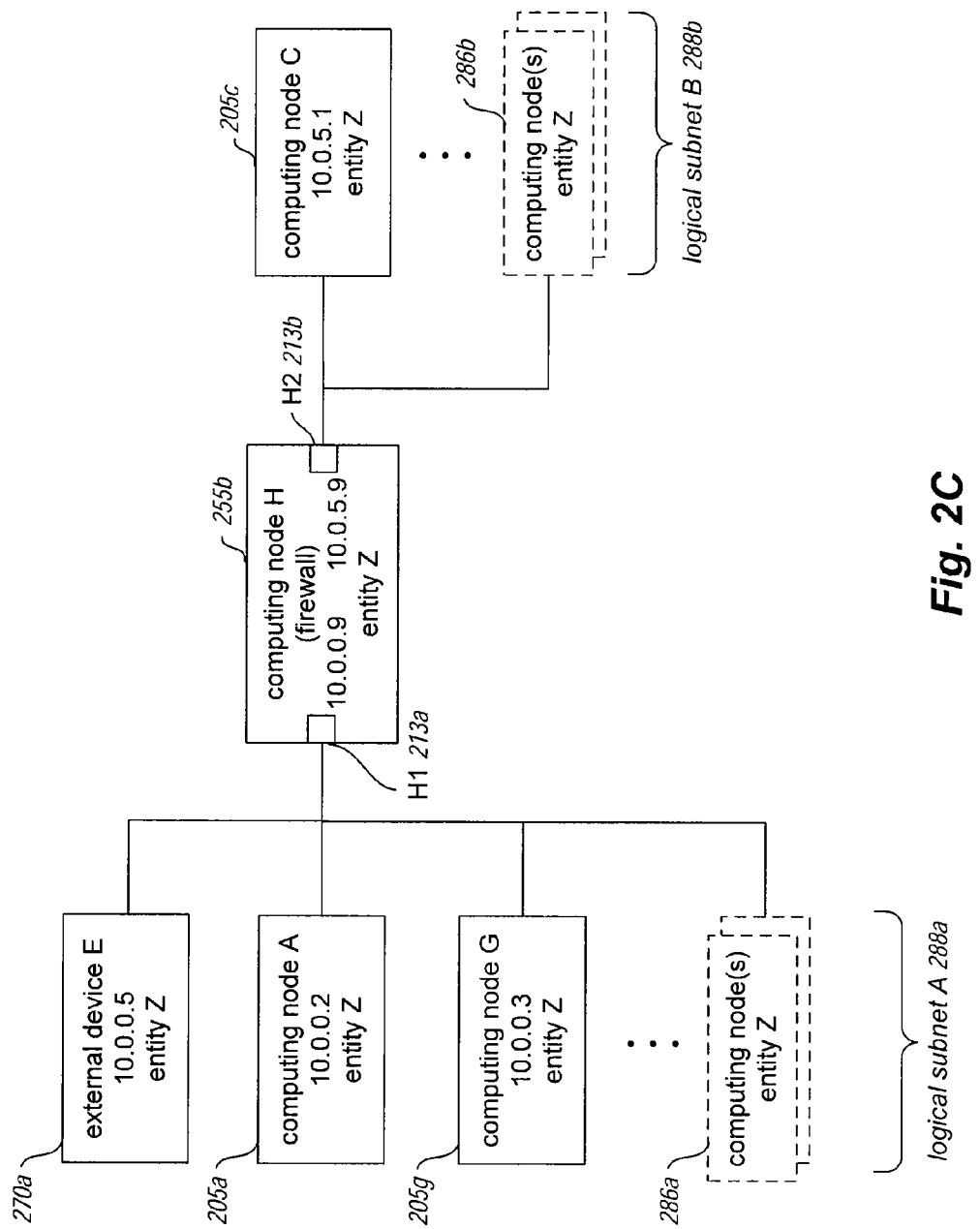

FIG. 2C illustrates a further example of managing ongoing communications for the overlay virtual computer network described with respect to FIGS. 2A and 2B for client entity Z, but with communications being managed to support the use of an external network node of the overlay virtual computer network that is configured to logically be part of a specified subnet of the overlay virtual computer network. In particular, in this example, the overlay virtual computer network includes an external network node E 270a that is external to the substrate network on which the virtual computer network will be overlaid (e.g., interconnection network 250 of FIGS. 2A and 2B). For example, external network node E 270a may be a computing device or other module that is located remote from the substrate network, such as at another geographical location, or a location that is near to the substrate network in geographical and/or network terms (e.g., by being co-located within the same data center, and interconnected to the substrate network via one or more intervening networks or other connections). With respect to FIG. 2C, the provided overlay virtual computer network is illustrated as including two distinct logical subnets, logical subnet A 288a and logical subnet B 288b. Logical subnet A 288a includes computing nodes A, G, external network device E, and optionally other computing nodes 286a of entity Z's virtual computer network that were not illustrated in FIGS. 2A and 2B. Logical subnet B 288b includes computing node C 205c, as well as optionally including other computing nodes 286b of entity Z's virtual computer network that were not illustrated in FIGS. 2A and 2B. In addition, in this example, the logical network topology of the provided overlay virtual computer network includes one of the computing nodes of the virtual computer network (in particular, computing node H) being configured to operate as an intermediate destination between the two logical subnets, and in particular to provide firewall capabilities in this example. Computing node H is configured to have two logical network interfaces 213 in this example, including a first logical network interface H1 213a that corresponds to logical subnet A and has an associated network address of "10.0.0.9", and a second logical network interface H2 213b that corresponds to logical subnet B and has an associated network address of "10.0.5.9". It will be appreciated that configured network topologies may be more complex in other embodiments and situations, including in some situations to have multiple external network nodes at one or more locations in the logical specified network topology (e.g., multiple external network nodes that form a distinct subnet or portion of a subnet), to have a chain of multiple intermediate destination logical network nodes through which at least some communications are forwarded, etc.

Figure 2D:
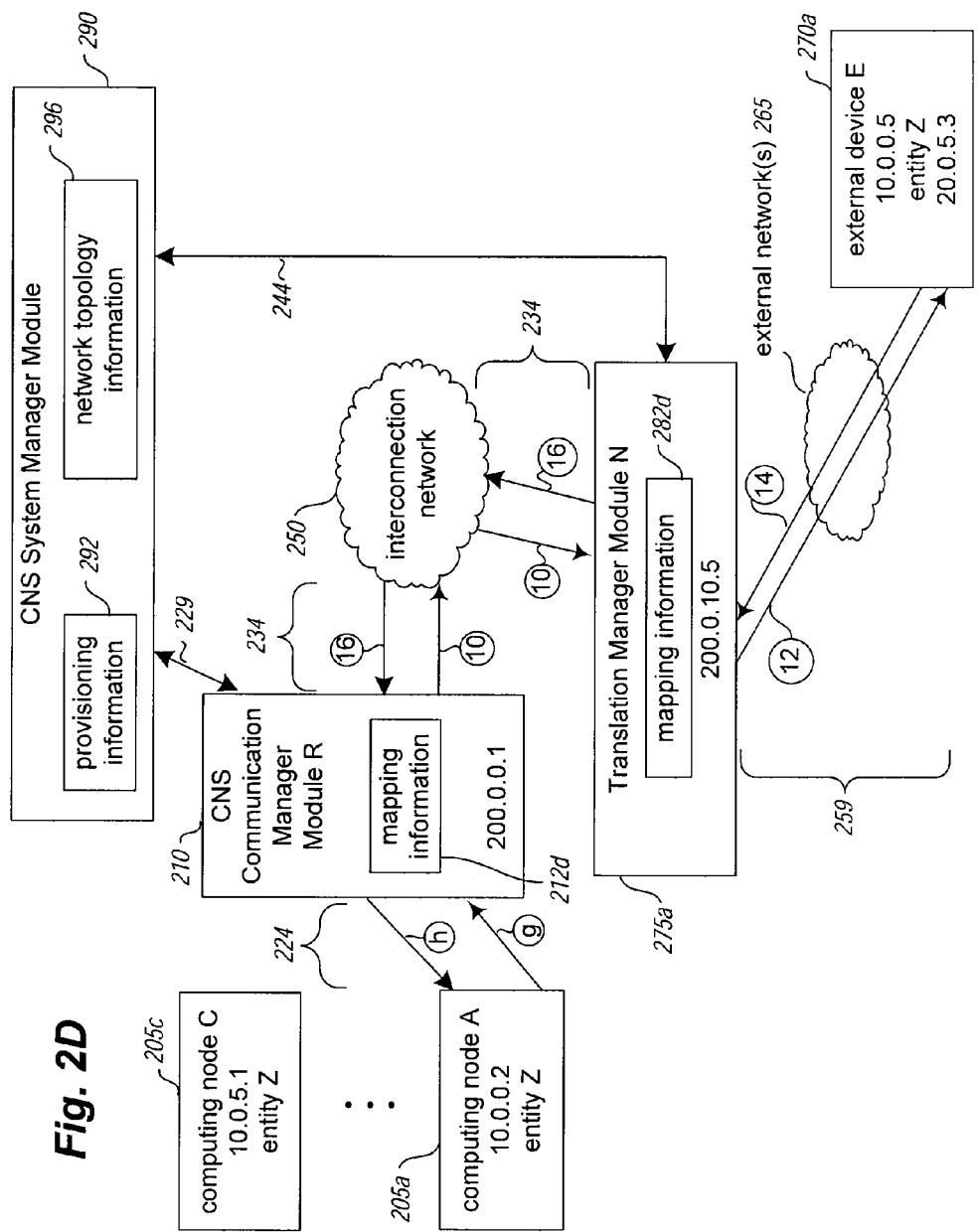

FIG. 2D illustrates a further example of managing ongoing communications for the overlay virtual computer network described with respect to FIGS. 2A, 2B and 2C for client entity Z, but with communications being managed to support the use of one or more network nodes external to the substrate network 250. In particular, FIG. 2D illustrates computing nodes A and C, Communication Manager module R, System Manager module 290, and interconnection network 250 in a manner similar to that shown in FIGS. 2A and 2B. However, FIG. 2D further illustrates additional information regarding external device E 270a located external to the substrate network 250, as well as an associated Translation Manager Module N 275a that manages communications for the virtual computer network between the underlying substrate network and external network(s). The Translation Manager Module N 275a may, for example, be one of multiple translation manager modules that support one or more virtual computer networks overlaid on the interconnection network 250, and may be implemented in various manners (e.g., as part of or in conjunction with one or more edge devices at a data center or other geographical location that includes the substrate network and computing nodes of the one or more virtual computer networks), as discussed in greater detail elsewhere. In addition, the System Manager module 290 maintains and uses additional information 296 in FIG. 2D regarding configured network topology for the one or more virtual computer networks being managed, including information regarding how to integrate external device E into the virtual computer network provided for client entity Z.

In this example, computing nodes A and C, Communication Manager module R, System Manager module 290, interconnection network 250, and Translation Manager Module N 275a are co-located at one or more first locations (e.g., at a single data center), and computing node A has initiated sending one or more communications to external device E 270, which is located external to the substrate network used at the first location(s). For the purposes of this example, the Translation Manager Module N 275a manages communications sent between the first location and external device E 270, including to modify outgoing communications that are encoded for and forwarded over the substrate network to Translation Manager Module N by decoding the communications and removing any substrate-specific information, as well as optionally adding one or more types of information specific to the virtual computer network. The Translation Manager Module N 275a may further provide a variety of types of other functionality in at least some embodiments, as described in greater detail elsewhere. In this example, Translation Manager Module N 275a is associated with the IPv4 substrate network address of 200.0.10.5, to which outgoing communications from the multiple computing nodes of the virtual computer network destined for external device E 270 are initially forwarded over the substrate network.

In particular, in this example, computing node A determines to send a communication to external computing node E 270, and accordingly sends outgoing communication 224-g in a manner similar to that described with respect to FIG. 2A for outgoing communication 220-c. While not illustrated in FIG. 2D, computing node A may optionally have previously exchanged one or more other messages with Communication Manager module R to determine a hardware address to use to represent external device E 270 for the virtual computer network (e.g., in a manner similar to that described with respect to FIG. 2A for communications 220-a and 220b). Thus, in this example, the outgoing communication 224-g sent by source computing node A includes a destination virtual network address of "10.0.0.5" for the intended final destination of external device E 270, a source virtual network address of "10.0.0.2" for computing node A, and source and destination hardware addresses used to represent computing node A and external device E 270, respectively (e.g., a virtual hardware address used to represent external computing node E 270 that was previously provided to computing node A by Communication Manager module R).

The outgoing overlay virtual computer network communication 224-g is intercepted and handled by Communication Manager module R in a manner similar to that described in FIG. 2A for communication 220-c, including to modify the overlay virtual computer network communication to encode it for the substrate network as appropriate, and to forward the modified encoded communication over the interconnection network 250 toward its intended final destination of external device E 270. The Communication Manager module R may store various substrate network address information as part of mapping information 212d, as discussed in greater detail with respect to FIGS. 2A, 2B and 2E, and if so may already have stored substrate network address information for use with communications from computing node A to external device E. If not, however, the Communication Manager module R determines that the intended final destination for the outgoing communication is associated with Translation Manager module R of the substrate network, optionally by performing one or more current or prior interactions 229 with the System Manager module 290. In particular, the Communication Manager module R may have previously performed one or more interactions 229 with the System Manager module 290 to determine a substrate network address to use for that indicated destination virtual network address (e.g., as part of an ARP request for external device E's virtual network address of "10.0.0.5"), or the Communication Manager module R may alternatively perform one or more such interactions 229 with the System Manager module 290 at a time of receiving outgoing communication 224-g if those interactions were not previously performed.

As part of the interactions 229, the System Manager module 290 determines that the indicated virtual network address of "10.0.0.5" for external device E corresponds to a target network node external to the substrate network 250 (e.g., based on use of the provisioning information 292 and/or network topology information 296). Accordingly, the System Manager module 290 determines that a communication to the indicated virtual network address is to be forwarded using the Translation Manager Module N as an intermediate destination, and selects the substrate network address specific to the Translation Manager Module N as being the substrate network address for Communication Manager module R to use for communications from computing node A to external device E. For example, Translation Manager Module N and its substrate network address may be associated with a sub-range or other subset of the virtual network addresses for the managed virtual computer network, as may be reflected in the mapping information 212d based on corresponding information from the network topology information 296—in such a case, any communication destined for a virtual network address within that particular sub-range or other subset will be forwarded over the substrate network to the Translation Manager Module N as an intermediate destination that will handle further forwarding of the communication. In this example, the System Manager module uses the IPv4 substrate network address "200.0.10.5" of Translation Manager Module N for communications from computing node A to external device E. It will be appreciated that there may be one or more associated translation manager modules in the substrate network 250 to manage communications sent between the external device E and multiple computing nodes in other embodiments, and selection of a particular associated translation manager module for a particular communication between particular nodes may be performed in various manners (e.g., based at least in part on the source node's virtual address and/or on the destination node's virtual address). It will also be appreciated that, in other embodiments, some or all of the operations described above as being performed by the System Manager module may instead be performed by the Communication Manager module R.

Once the particular substrate network address of the Translation Manager Module N is selected for use with one or more communications from computing node A to external device E, the Communication Manager module R stores that information as part of mapping information 212d, such as in a manner similar to that described with respect to mapping information 212 in FIG. 2A (e.g., by modifying prior mapping information 212 of FIG. 2A). As discussed in greater detail previously, the Communication Manager module R and/or the System Manager module 290 may further perform various optional authentication activities to verify that communications from computing node A to external device E are authorized. Thus, with respect to intercepted outgoing overlay virtual computer network communication 224-g, Communication Manager module R identifies the physical substrate network address corresponding to Translation Manager Module N that is to be used for the communication, and creates a modified communication 234-10 that is encoded for the substrate network 250. In a manner similar to that described previously, the encoded communication 234-10 has a new substrate network communication header that includes the physical substrate network address for Translation Manager Module N as the destination network address, and that includes computing node A's substrate network address as the source network address. The encoded communication 234-10 is then forwarded over the interconnection network 250 directly to Translation Manager Module N based on the destination network address included in the encoded communication.

When Translation Manager Module N receives communication 234-10 via the interconnection network 250, it performs actions similar to those described in FIG. 2A with respect to Communication Manager module S for communication 230-3. Such actions may include decoding the communication 234-10, such as by using stored mapping information 282d and/or performing communications 244 with the System Manager Module 290 to retrieve information for use in replacing the substrate network header of the communication 234-10 with a new communication header that corresponds to the type of external connection to the external device E. In this example, external device E is accessible via an associated publicly routable external network address via one or more intervening external networks 265, and the new communication header added by Translation Manager Module N indicates the destination external public network address of the intended final destination, which in this example is external network address "20.0.5.3" for external device E. The new communication header may similarly include a source network address that represents source computing node A to external nodes (e.g., a publicly routable network address and/or port associated with Translation Manager Module N that is uses to represent computing node A, such as if the Translation Manager Module N performs NAT/PAT functionality for computing nodes at the first location). The Translation Manager Module N 275a may instead or also optionally add network identifying information for the managed virtual computer network (e.g., an identifier for a particular entity, a tag or label for the virtual computer network, an identifier for a particular specified VLAN to which external device E is assigned, etc.) to the communication before it is forwarded from Translation Manager module N towards external device E. The Translation Manager Module N then forwards the modified communication as communication 259-12 over one or more external networks 265 between the substrate network and the external device E. While not illustrated here, in other embodiments the Translation Manager Module N may further be configured to optionally perform additional interactions with the System Manager module 290 before forwarding the received communication 234-10, such as to determine if the communication is authorized and to block or otherwise filter the communication if so, to update mapping information used by the Translation Manager Module N to determine the network address to use for the final destination, to perform metering of a quantity of communications handled by the Translation Manager Module N destined for and/or forwarded to external device E, to enforce a maximum rate or maximum quantity or other threshold of use of external device E (e.g., based on a capacity of external device E and/or of one or more parts of the intervening networks or other external connection to external device E, and/or based on configuration information specified by entity Z for the managed virtual computer network or by another external entity who controls external device E), etc.

When external device E sends a communication 259-14 to a particular computing node of the virtual network (in the present example, a response to the communication from computing node A 205a), the communication 259-14 is directed over the external network(s) 265 to and handled by the Translation Manager Module N, such as based on Translation Manager Module N being one of one or more edge devices or other modules for the substrate network that are configured to receive communications sent to particular network addresses for the location of the substrate network. In particular, the Translation Manager Module N receives the incoming communication 259-14, optionally verifies that external device E is authorized to send communications to computing node A (e.g., based on being a response to a previous communication, or otherwise based on configuration information for external device E and computing node A), and then modifies communication 259-14 to create communication 234-16. For example, Translation Manager Module N may encode the incoming communication for forwarding over the substrate network by generating a new substrate network communication header using mapping information 282d, such as to specify a destination substrate network address corresponding to computing node A (e.g., the substrate network address "200.0.0.1" corresponding to Communication Manager module R, or one of a range of multiple substrate network addresses associated with Communication Manager module R). After forwarding encoded communication 234-16 to the interconnection network 250, the communication is forwarded to Communication Manager module R, which processes the incoming communication in a manner similar to that previously described with respect to communication 230-6 and Communication Manager module R in FIG. 2A. In particular, Communication Manager module R optionally verifies that external device E is authorized to send communications to computing node A, and then decodes 234-16 to remove information specific to the substrate network and optionally further encodes the communication in a manner specific to the virtual computer network, such as by modifying communication 234-16 to create communication 224-h by generating a new IPv4 header for the overlay virtual computer network using mapping information 212d. Communication Manager module R then provides communication 224-h to computing node A, such as via shared memory, a private link or other connection, etc. In some embodiments and situations, Communication Manager modules R and/or Translation Manager Module N may handle response communications differently from initial communications, such as to assume that response communications are authorized in at least some situations, and to not perform some or all authorization activities for response communications in those situations.

In this manner, the CNS system may provide functionality corresponding to the integration of external devices and other external network nodes into the virtual computer network, without any special configuration of the computing nodes of the managed virtual computer network or of the substrate network physical networking devices or of the external network nodes, based on the Communication Manager modules and Translation Manager module(s) overlaying the virtual computer network on the actual substrate interconnection network in such a manner as to provide the desired functionality. Various other types of actions than those discussed with respect to FIGS. 2A-2D may be performed in other embodiments, including for types of network addressing protocols other than IPv4 and/or IPv6.

Figure 2E:
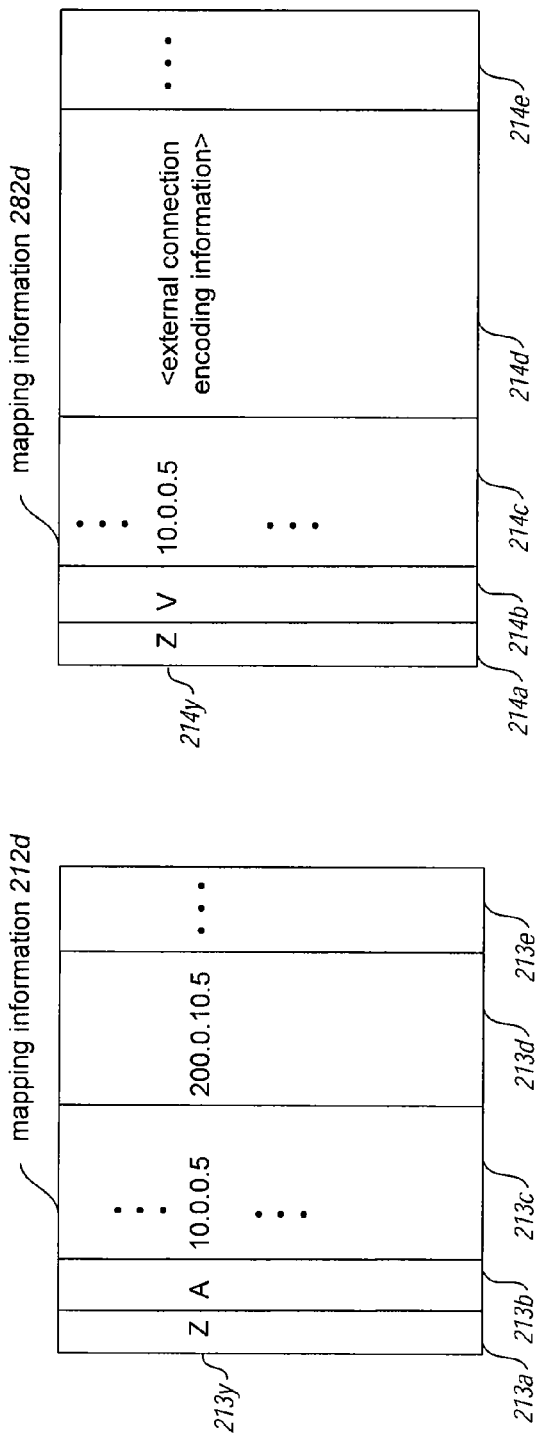

FIG. 2E illustrates examples of portions of the mapping information 212d and 282d that may be used by the Communication Manager module R and Translation Manager Module N of FIG. 2D, respectively, with the example mapping information 212d and 282d of FIG. 2E further corresponding to the example network topology information discussed with respect to FIG. 2C. Each of the groups of mapping information 212d and 282d may include multiple entries (with one example entry shown in FIG. 2E for each group) having information that has some similarities to a routing table entry.

In particular, in this example, mapping information 212d used by the Communication Manager module R includes information for each entry that includes the following: a virtual computer network identifier 213a, which in this example is a network identifier corresponding to the overlay virtual computer network provided for entity Z; a source computing node interface identifier 213b, which in this example includes an "A" to correspond to the single logical network interface for computing node A; a destination virtual network address identifier 213c; an associated destination substrate network address 213d; and optionally various other information 213e. The optional other information may include, for example, a destination hardware address provided to associated computing nodes for use in representing particular destination computing nodes, information about expiration times or other use criteria for particular entries, etc.

Thus, in the example of FIG. 2E, when computing node A initiates the sending of a communication to external device E via the Communication Manager module R, the sent communication includes the destination virtual network address of "10.0.0.5" for external device E. In FIG. 2E, the entry 213y provides a match for the indicated destination virtual network address, with the associated substrate network address for entry 213y in this example being "200.0.10.5" for Translation Manager Module N to which the communication will be initially directed. Thus, entry 213y will be used for communications sent from computing node A to external device E. If a range of multiple virtual network addresses were associated with one or more external network nodes that include external device E, the information in column 213c of entry 213y (or of another entry for those one or more external network nodes) may instead have a form such as "10.0.0.4/30" to correspond to any virtual network addresses from "10.0.0.4" to "10.0.0.7", which may all be mapped to the substrate network address of Translation Manager Module N, or may instead correspond to multiple different translation manager modules (not shown) which may be used to manage such communications.

The example mapping information 282d used by the Translation Manager Module N includes information similar to that displayed for mapping information 212d, and in particular includes information for each of its entries that includes the following: a virtual computer network identifier 214a, which in this example is a network identifier corresponding to the overlay virtual computer network provided for entity Z; a source network interface identifier 214b (e.g., in this example, if Translation Manager Module N is configured with a "U" network interface facing the external network(s) 265 and a "V" network interface facing the substrate interconnection network 250); a destination virtual network address identifier 214c; information 214d related to a type of encoding and corresponding information for an external connection to the external network node (e.g., in the example of FIG. 2D, an associated destination substrate or external network address corresponding to external device E); and optionally various other information 214e. For example, in some embodiments and situations, a particular entry may indicate for a particular external connection to use a particular VLAN identifier or MPLS label. Accordingly, in this example, when the Translation Manager Module N receives the communication from computing node A that is intended for external device E, the received communication includes the destination virtual network address of "10.0.0.5" for external device E. In this example, the entry 214y provides a match for the indicated destination virtual network address, and the information for the entry will indicate to use a publicly routable external network address (in this example, the external network address of "20.0.5.3"), which Translation Manager Module N will use to direct the further forwarded outgoing communication to external device E. Thus, entry 214y will be used for communications sent from computing node A to external device E. As with mapping information 212d, if a range of multiple virtual network addresses were associated with one or more external network nodes that include external device E, the information in column 214c of entry 214y (or of another entry for those one or more external network nodes) may instead have a form such as "10.0.0.4/30" to correspond to any virtual network addresses from "10.0.0.4" to "10.0.0.7", which may all be mapped to a single external location, such as with a single external network address to use, a single VLAN identifier to use, etc.

In this manner, the CNS system may provide functionality that supports the use of one or more translation manager modules within a substrate network, without any special configuration of the other computing nodes of the managed virtual computer network or of the physical networking devices of the substrate network or of the devices external to substrate interconnection network, based on communication manager modules and translation manager modules overlaying the virtual computer network on the actual physical interconnection network in such a manner as to provide the desired functionality, including to support network nodes external to the substrate network as being part of the virtual computer network.

Figure 2F:
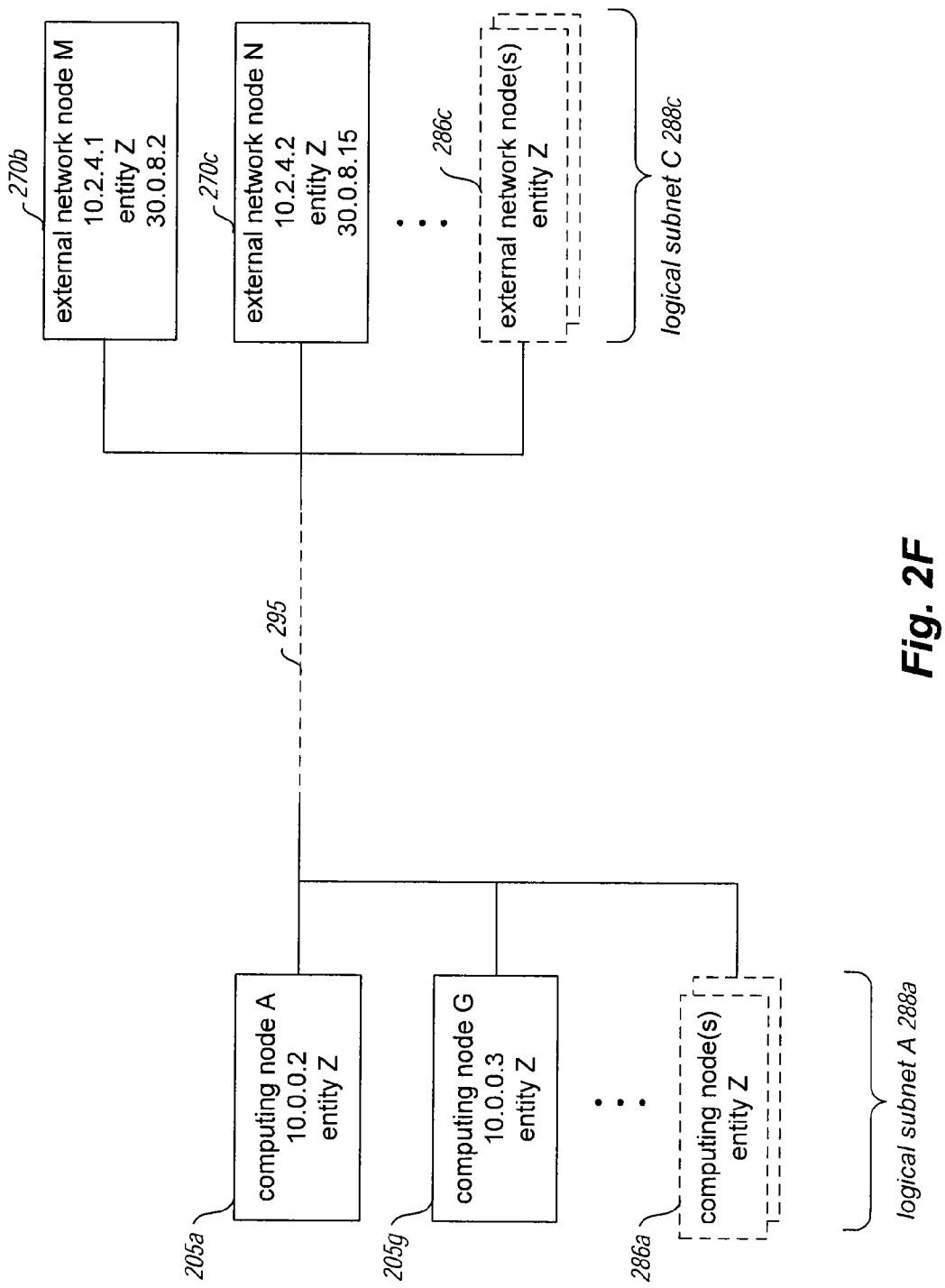

FIG. 2F includes information with some similarities to that of FIG. 2C, but illustrates an example alternative logical network topology of the overlay virtual computer network provided for entity Z. In particular, with respect to FIG. 2F, the provided overlay virtual computer network does not include the example external device E of FIG. 2C, but does include a group of multiple other external network nodes that are part of the virtual computer network in this example. In particular, the logical network topology of the virtual computer network is illustrated in FIG. 2F as including a logical subnet 288a similar to that of FIG. 2C, as well as a new logical subnet C 288c. In this example, the logical subnet C includes external network node M 270b (which has a virtual network address of "10.2.4.1" and an associated actual external public network address of "30.0.8.2"), external network node N 270c (which has a virtual network address of "10.2.4.2" and an associated actual external public network address of "30.0.8.15"), and optionally one or more additional external network devices 286c. In addition, the logical subnets A and C are interconnected in the example logical network topology of the provided overlay virtual computer network in one or more manners whose details are not illustrated in this example (as represented by dashed lined 295), which may optionally include one or more other subnets or intermediate destination nodes.

Thus, if one of the computing nodes in the logical subnet A of the provided overlay virtual computer network sends a communication to one of the external network nodes of logical subnet C, which are at one or more locations external to the substrate network, the sent communication will be directed via the substrate network to one or more Translation Manager modules that facilitate the connection between the substrate network and one or more external connections. If the interconnections 295 in the logical network topology include one or more intermediate network nodes, the communication may first be directed to those intermediate network nodes via the substrate network before the communication is forwarded to the one or more Translation Manager modules, such as to enable the one or more intermediate network nodes to perform one or more of various types of configured handling of such communications (e.g., firewall-related activities, VPN-related activities, etc.). When the communication is received by a Translation Manager module, it will perform activities to forward the communication on to the indicated destination external network node of logical subnet C 288c in a manner similar to that previously described. For example, if computing node A initiates the sending of a communication to external network node M 270b, the sent communication includes the destination virtual network address of "10.2.4.1" for external device M. In this example, there may be an entry in the mapping information 212d of Communication Manager Module R having "10.2.4.0/29" as the destination virtual network address identifier, which may be selected as providing the best match for the indicated destination virtual network address based on the use of longest prefix matching to select the entry that matches the destination network address and has the longest number of matching bits that are specified. If Translation Manager Module N of FIG. 2D is used to managing the communications to the external network nodes of logical subnet C, the associated destination substrate network address for the particular entry would be "200.0.10.5", causing the communication from computing node A to be initially forwarded to Translation Manager Module N, which will further forward the communication on towards its final destination using the associated external network address of "30.0.8.2". Thus, the particular described routing entry in mapping information 212d will be used for communications sent from computing node A to external network node M, and more generally to any external network node of logical subnet C (assuming that the external network nodes of logical subnet C all have virtual network addresses between "10.2.4.0" and "10.2.4.7"). Similarly, the Translation Manager Module N may have an entry in the mapping information 282d with "10.2.4.1" as the destination virtual network address identifier and the associated destination public external network address of "30.0.8.2", which Translation Manager Module N will use for communications sent from any of the multiple computing nodes of the virtual computer network to external network node M.

Various other types of actions than those discussed with respect to FIGS. 2A-2F may be performed in other embodiments, including for types of network addressing protocols other than IPv4 and/or IPv6.

In some embodiments, one or more modules of the configurable network service may further be configured to perform one or more additional types of functionality in at least some situations, such as by the multiple translation manager modules in a distributed manner, optionally in conjunction with multiple communication manager modules and/or the system manager module. As one example, the one or more modules may be configured in at least some embodiments to perform metering or other tracking of the use of one or more external network nodes for a managed virtual computer network, and to provide information about such tracking for various purposes (e.g., to enable fees to be charged to a client associated with the managed virtual computer network if the corresponding tracked activities are fee-based activities; to provide information to a client associated with the managed virtual computer network and/or to another entity regarding an amount of use of one or more intermediate destination computing nodes, such as to enable corresponding monitoring activities; etc.). As another example, the one or more modules may be configured in at least some embodiments to filter at least some communications forwarded to and/or from one or more external network nodes of a managed virtual computer network, including to limit the rate or total quantity of such communications to be below a specified or determined threshold of use—such rate/quantity limiting or other filtering may be configured in various manners, such as based on configuration information received by a client associated with the managed virtual computer network (e.g., to limit use of a fee-based feature of the managed virtual computer network, to correspond to limitations of the one or more external network nodes and/or of other nodes or networking components associated with the external network nodes, etc.), based on a capacity or other aspects of a particular external network node; etc. The one or more modules may further be configured to filter communications received from one or more external network nodes of a managed virtual computer network in at least some embodiments, such as to ensure that the communications are authorized for or otherwise allowed for the managed virtual computer network before those communications are provided to one of the computing nodes of the managed virtual computer network. In addition, the one or more modules may be configured in at least some embodiments to perform signaling activities if the unavailability of a particular external network node is detected (e.g., based on the external network node failing or on an external connection to the external network node being unavailable, and as may be detected based on a lack of response or other information from the external network node for a period of time or to one or more forwarded communications or other messages), such as to notify other computing nodes of the managed virtual computer network of the unavailability to inhibit future communications from being forwarded to the external network node while it is unavailable, as well as to optionally perform other related activities (e.g., to initiate providing a replacement for the unavailable external network node).

In addition, as previously noted, configuration information that is specified for a virtual computer network may include various network topology information, various computing nodes may be selected for the virtual computer network and configured in accordance with the network topology in various manners, and various network nodes external to the substrate network may be integrated into the virtual computer network in accordance with the network topology in various manners.

In addition, in some situations, a communication manager module tracks or otherwise determines the virtual computer networks to which the module's associated computing nodes belong (e.g., based on entities on whose behalf the virtual computer networks operate) as part of managing the communications for the virtual computer networks, and a translation manager module may similarly track or otherwise determines the one or more virtual computer networks to which the module's associated external network nodes belong as part of managing the communications sent to and/or from those external network nodes. The determination by a communication manager module of a corresponding virtual computer network for an associated computing node and/or the determination by a translation manager module of a corresponding virtual computer network for an associated external network node may be performed in various ways in various embodiments, such as by interacting with a system manager module that provides that information, by tracking software modules or other programs executing on such computing nodes, by tracking entities associated with such computing nodes, etc. For example, when a particular computing node begins to execute one or more software programs on behalf of a user, and that user also has other software programs executing on other computing nodes, the new computing node executing the user's program(s) may be selected to be associated with a virtual computer network for the user that includes those other computing nodes. Alternatively, a user or other entity may specify a particular managed computer network to which a computing node belongs, such as if the entity maintains multiple distinct managed computer networks between different groups of computing nodes. In addition, in at least some embodiments, one or more system manager modules of the CNS system may facilitate configuring communications between computing nodes, such as by tracking and/or managing which computing nodes belong to which virtual computer networks (e.g., based on executing programs on behalf of a customer or other entity), by tracking and/or managing which external network nodes operate as logical nodes of which virtual computer networks, and by providing information about actual substrate network addresses or actual public external network addresses that correspond to virtual network addresses used for a particular virtual computer network (e.g., by a particular customer or other entity).

In addition, as previously noted, configuration information that is specified for a virtual computer network may include various network topology information 296, and various computing nodes, devices and other external network nodes in various locations external to the substrate network may be selected for the virtual computer network and configured in accordance with the network topology in various manners. For example, in some embodiments, the selection of a computing node to be used in a managed virtual computer network and/or to be assigned a particular role in a configured network topology may be based at least in part on a geographical and/or network location of the computing node, such as an absolute location, or instead a location relative to one or more other computing resources of interest (e.g., other computing nodes of the same managed virtual computer network, storage resources to be used by the computing node, etc.), such as within a minimum and/or maximum specified geographical distance or other degree of proximity to an indicated other computing resource or other location. In addition, in some embodiments, factors used when selecting a computing node may be not be based on location, such as to include one or more of the following: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes (e.g., database services and storage); constraints related to costs, such as based on fees or operating costs associated with use of particular computing nodes; etc.

As previously noted, in some embodiments, a program execution service executes third-party customers' programs using multiple physical computing systems (e.g., in one or more data centers) that each host multiple virtual machines, with each virtual machine being able to execute one or more programs for a customer. In some such embodiments, customers may provide programs to be executed to the program execution service, and may reserve execution time and other resources on physical or virtual hardware facilities provided by the program execution service. In addition, customers and/or the program execution service may define virtual computer networks that will be used by the program execution service for computing nodes of the customer, so as to transparently provide computing nodes of a virtual computer network (including network nodes located remote from the substrate network) with the appearance of operating on a dedicated physical network.

Figure 3:
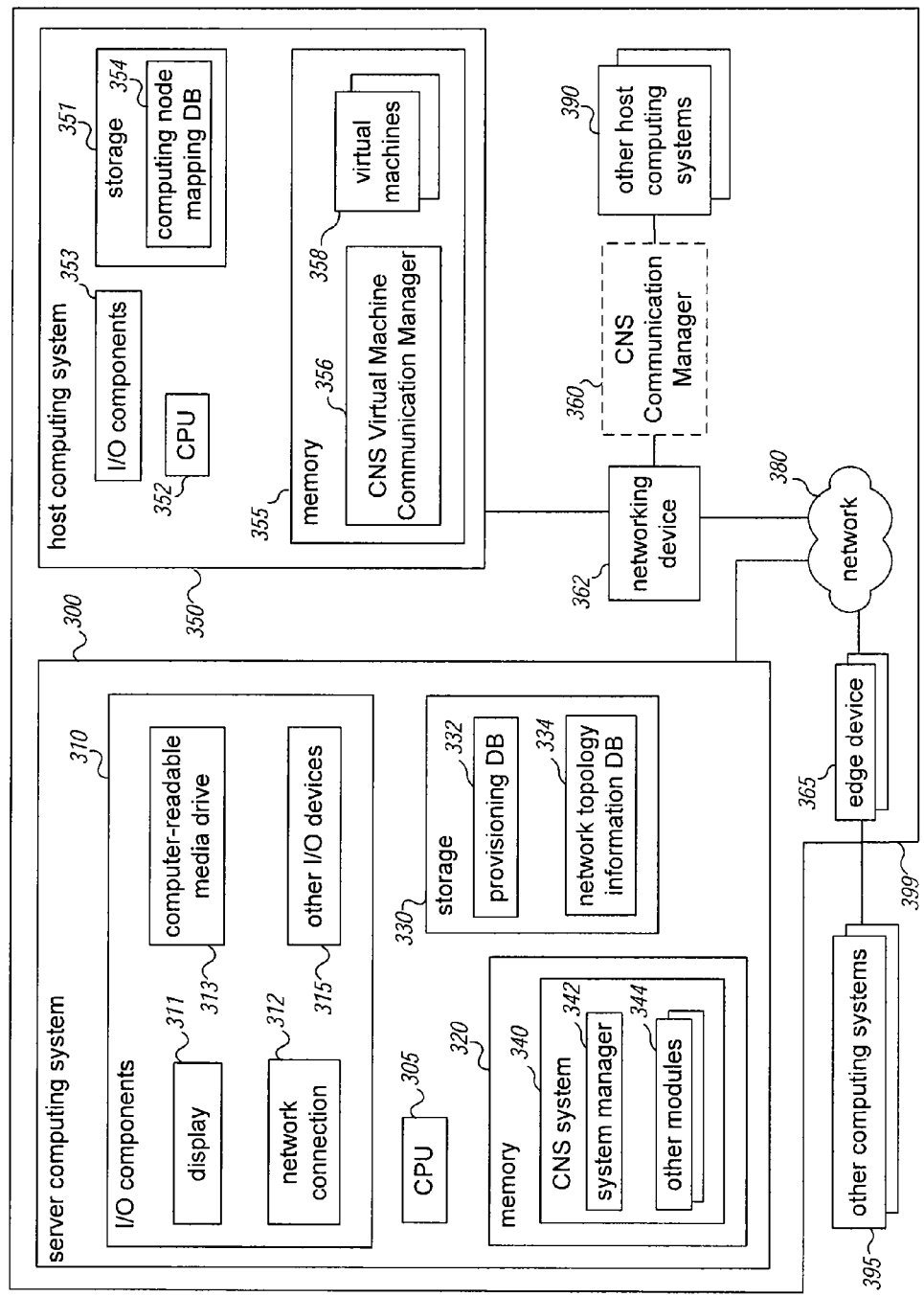
FIG. 3 is a block diagram illustrating example computing systems suitable for executing an embodiment of a system for managing communications between computing nodes.

FIG. 3 is a block diagram illustrating example computing systems suitable for executing an embodiment of a system for managing communications between computing nodes. In particular, FIG. 3 illustrates a group 399 of computing systems and inter-network(s), such as a data center or other group of co-located computing nodes. In some embodiments, some or all of the computing systems of the group 399 may be used by an embodiment of the CNS system to provide managed virtual computer networks to users or other entities. The group 399 includes a server computing system 300, a host computing system 350 capable of executing one or more virtual machines, other host computing systems 390 that are similar to host computing system 350, and an optional Communication Manager module 360 that manages host computing systems 390 and that executes on one of the computing systems 390 or on another computing system (not shown). The server computing system 300 and host computing systems 350 and 390 are connected to one another via an internal network 380, which includes a networking device 362 and other networking devices (not shown). The network 380 may be an interconnection network that joins multiple disparate physical networks (not shown) for the group 399 and possibly provides access to external networks (not shown) and/or systems, such as other computing systems 395. In the illustrated example, the networking device 362 provides a gateway between the network 380 and host computing systems 350 and 390. In some embodiments, networking device 362 may, for example, be a router or a bridge. In addition, in this example, one or more edge devices 365 may operate as or be associated with one or more translation manager modules (not shown) to facilitate integration of external network nodes into the managed virtual computer network, such as one or more of the external computing system 395 or other external network nodes (not shown).

The computing system 300 in this example operates to configure and manage virtual computer networks within the group 399, as well as to provide other functions (e.g., the provisioning, initialization, and execution of programs on computing nodes). The computing system 300 includes a CPU 305, various I/O components 310, storage 330, and memory 320. The I/O components include a display 311, network connection 312, computer-readable media drive 313, and other I/O devices 315 (e.g., a mouse, keyboard, speakers, etc.).

The host computing system 350 operates to host one or more virtual machines, such as for use as computing nodes in managed virtual computer networks (e.g., computing nodes that execute programs on behalf of various users). The host computing system 350 includes a CPU 352, various I/O components 353, storage 351, and memory 355. While not illustrated here, the I/O components 353 may include similar components to those of I/O components 310. A virtual machine Communication Manager module 356 and one or more virtual machines 358 are executing in the memory 355, with the module 356 managing communications for the associated virtual machine computing nodes 358 and in some embodiments including various software instructions that when executed program the CPU 352 to provide the described functionality. The Communication Manager module 356 maintains various mapping information 354 on storage related to the computing nodes 358 and other computing nodes, such as in a manner similar to mapping information 212, 212d and 262 of FIGS. 2A-2D. The structure of the other host computing systems 390 may be similar to that of host computing system 350, or instead some or all of the host computing systems 350 and 390 may act directly as computing nodes by executing programs without using hosted virtual machines. In a typical arrangement, the group 399 may include hundreds or thousands of host computing systems such as those illustrated here, organized into a large number of distinct physical sub-networks and/or networks.

An embodiment of a CNS system 340 is executing in memory 320 of the computing system 300. In some embodiments, the system 340 may receive an indication of multiple computing nodes to be used as part of a managed virtual computer network (e.g., one or more virtual machine computing nodes on host computing system 350 or one or more computing nodes using one of the host computing systems 390), and in some situations may select the particular computing node(s) for the managed virtual computer network. In some cases, information about the structure and/or membership of various managed virtual computer networks may be stored in the provisioning database 332 on storage 330 by the system 340, and provided to the Communication Manager modules at various times. Similarly, in some cases, information about configured network topology to be emulated for one or more managed virtual computer networks, including information about any integrated external network nodes, may be stored in the database 334 on storage 330 by the system 340, such as in a manner similar to information 296 of FIG. 2D, and used to provide corresponding information to the Communication Manager modules at various times. In this example, the system 340 in memory 320 includes a system manager module 342 and optionally other modules 344, with the communication manager modules 356 and 360 being a further part of the distributed CNS system in this example. The system module 342 performs operations to facilitate the use of external network nodes for managed computer networks, as discussed elsewhere. In addition, the CNS system and the modules 342 and 344 may each in some embodiments include various software instructions that when executed program the CPU 305 to provide described functionality.

As discussed in greater detail elsewhere, the Communication Manager modules 356 and 360 (and other Communication Manager modules, not shown, that manage other associated computing nodes, not shown) and the various modules 342 and 344 of the system 340 may interact in various ways to manage communications between computing nodes, including to support the integration of particular external network nodes into particular provided virtual computer networks, and/or to use particular alternative intermediate destinations for particular communications from computing nodes of provided virtual computer networks. Such interactions may, for example, enable the computing nodes 358 and/or other computing nodes to inter-communicate over managed virtual computer networks without any special configuration of the computing nodes, by overlaying the virtual computer networks over network 380 and optionally one or more external networks (not shown) without any special configuration of networking device 362 or other networking devices (not shown), and without encapsulation of communications.

It will be appreciated that computing systems 300, 350, 390, and 395, edge devices 365, and networking device 362, are merely illustrative and are not intended to limit the scope of the present invention. For example, computing systems 300 and/or 350 may be connected to other devices that are not illustrated, including through one or more networks external to the group 399, such as the Internet or via the World Wide Web ("Web"). More generally, a computing node or other computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules, such as if the functionality of a system manager module and one or more communication manager modules are instead combined into a single module. Similarly, in some embodiments the functionality of some of the illustrated modules may not be provided and/or other additional functionality may be available. Furthermore, in some embodiments alternative intermediate destinations of one or more types other than edge devices may be present and in use (e.g., one or more translation manager modules), whether as part of, instead of or in addition to the alternative edge devices 365.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk, a memory, network storage, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIG. 4 is a flowchart of an example embodiment of a CNS System Manager routine 400. The routine may be provided by, for example, execution of the system manager module 110 of FIGS. 1A and/or 1B, the system manager module 290 of FIGS. 2A-2F, and/or the system manager module 342 of CNS system 340 of FIG. 3, such as to assist in managing communications between multiple computing nodes across one or more intermediate networks, including to manage communications that involve external network nodes integrated into one or more virtual computer networks, as well as to perform other types of management operations in some situations. In at least some embodiments, the routine may be provided as part of a system that manages communications for multiple different entities across a common intermediate substrate network, with the communications configured so as to enable each computing node to transparently communicate with other associated computing nodes using a private virtual computer network that is specific to that entity. Furthermore, the routine may facilitate preventing unauthorized communications from being provided to destination computing nodes, such as by assisting Communication Manager modules with determinations of whether communications are authorized.

In the illustrated embodiment, the routine begins at block 405, where a request is received. The routine continues to block 410 to determine the type of request. If it is determined that the type of request is to associate one or more computing nodes and/or external network with a particular managed virtual computer network provided for an indicated entity, such as if those nodes are executing or are to execute one or more programs on behalf of that entity, or are otherwise designed or configured to provide one or more desired types of functionality for that entity, the routine continues to block 415 to associate those nodes with that indicated entity and virtual computer network. In some embodiments, the routine may further determine one or more computing nodes to be associated with the indicated entity and virtual computer network, such as based on information provided by the indicated entity, while in other embodiments the selection of such computing nodes and/or execution of appropriate programs on those computing nodes may be performed in other ways. In addition, as discussed in greater detail elsewhere, in some embodiments one or more of the computing nodes may each be a virtual machine that is hosted by one or more physical computing systems, and the external network nodes may have various forms in various embodiments and situations. In addition, in some embodiments the routine may obtain and store various types of configuration information for the virtual computer network, such as a range of virtual network addresses for use with the virtual computer network, a specified network topology for the virtual computer network, etc. The routine then continues to block 420 to store mapping information for the nodes and the managed virtual computer network, including any received configuration information. For example, in the illustrated embodiment, the routine stores for each node an indication of a substrate or external network address corresponding to the node, a virtual network address used by the entity for the node as part of the virtual computer network, optionally a virtual hardware address assigned to the computing node, an indication of the associated entity, optionally information about a logical location and/or function of the computing node in the specified network topology, etc. As discussed in greater detail elsewhere, the substrate network address or external network address corresponding to a node may in some embodiments be a network address specific to that single node, while in other embodiments may instead refer to a sub-network or other group of multiple nodes, such as may be managed by an associated Communication Manager module and/or Translation Manager module. After block 420, the routine continues to block 422 to optionally provide information about the node(s) and their configuration to one or more communication manager modules and/or one or more translation manager modules associated with those nodes, although in other embodiments instead provides such information upon request from the communication manager modules and/or translation manager modules.

If it is instead determined in block 410 that the type of received request is a request for address resolution for a virtual network address of a target node or other computer system of interest, such as from a communication manager module or translation manager module on behalf of a managed node, the routine continues instead to block 425, where it determines whether the request is authorized in one or more ways, such as based on whether the managed node on whose behalf the request is made is authorized to send communications to a target node whose virtual network address resolution is requested (e.g., based on the virtual computer network (s) to which the two nodes belong), based on whether the managed node on whose behalf the request is made is a valid node that is currently part of a configured virtual computer network, and/or based on whether the request is received from the communication manager module or translation manager module that actually manages the indicated node on whose behalf the request is made. If the request is determined to be authorized, the routine continues to block 430, where it obtains a network address of interest for a particular target node of interest, such as may be included with the request received in block 405, or previously stored and currently identifiable for the target based on other received information. The routine then continues to block 435 to retrieve stored information for the target that is associated with the network address, and in particular to retrieve information that associates that target network address to a substrate network address or external network address for a network location that corresponds to the target, such as may be previously stored with respect to block 420, and optionally to other information for the target network address (e.g., an associated virtual hardware address, an indication regarding whether the target network address corresponds to a physically implemented computing node with an actual substrate network address or instead to a logical networking device that does not have an actual substrate network address, information about a role or status of the device corresponding to the virtual network address with respect to configured network topology information, whether the target network address is external to a current location such that communications to the target will use one or more intermediate destination edge devices and/or translation manager modules, whether communications to the target network address will use one or more intermediate computing node destinations or other intermediate destinations that are not edge devices or translation manager modules, etc.). After block 435, the routine continues to 440 to provide an indication of the retrieved information to the requester. While not illustrated here, if the determination in block 425 determines that the request is not authorized, the routine may instead not perform blocks 430-440 for that request, such as by responding with an error message to the request received in block 405 or by not responding to that received request. In addition, in other embodiments the routine may perform one or more other tests to validate a received request before responding with the requested information, such as to verify that the node that initiated the request is authorized to receive that information. Furthermore, in the illustrated embodiment, communication manager modules perform operations to select particular intermediate destinations to use for particular communications, including in some situations a particular translation manager module when multiple such translation manager modules are available for use, such as in an individualized manner for each of at least some communications, although in other embodiments the routine 400 may instead perform some or all such actions (e.g., as part of block 435, and if a single alternative intermediate destination may be repeatedly used for multiple communications being a single source/final destination pair).

If it is instead determined in block 410 that the received request is of another type, the routine continues instead to block 485 to perform one or more other indicated operations as appropriate. For example, in some embodiments, the routine may receive requests to update stored information about particular nodes, such as if a particular node was previously associated with a particular entity and/or virtual computer network but that association ends (e.g., one or more programs being executed for that entity on that node are terminated, the node fails or otherwise becomes unavailable, an associated user or other client changes specified configuration information for the node, etc.). Similarly, in some embodiments, the routine may receive requests to update stored information about external network nodes or otherwise about specified network topology for a virtual computer network, including to add, remove or configure translation manager modules in some situations, and optionally to provide such updated information to one or more communication manager modules of the provided virtual network. The routine may also perform a variety of other actions related to managing a system of multiple nodes, as discussed in greater detail elsewhere, and may at times perform actions of other types, such as to perform occasional housekeeping operations to review and update stored information as appropriate (e.g., after predefined periods of time have expired). In addition, if possible validation problems are detected, such as with respect to received address resolution requests for virtual network addresses, the routine may take various actions to signal an error and/or perform other corresponding actions as appropriate.

After blocks 422, 440 or 485, the routine continues to block 495 to determine whether to continue, such as until an explicit indication to terminate is received. If it is determined to continue, the routine returns to block 405, and if not continues to block 499 and ends.

Figure 5A:
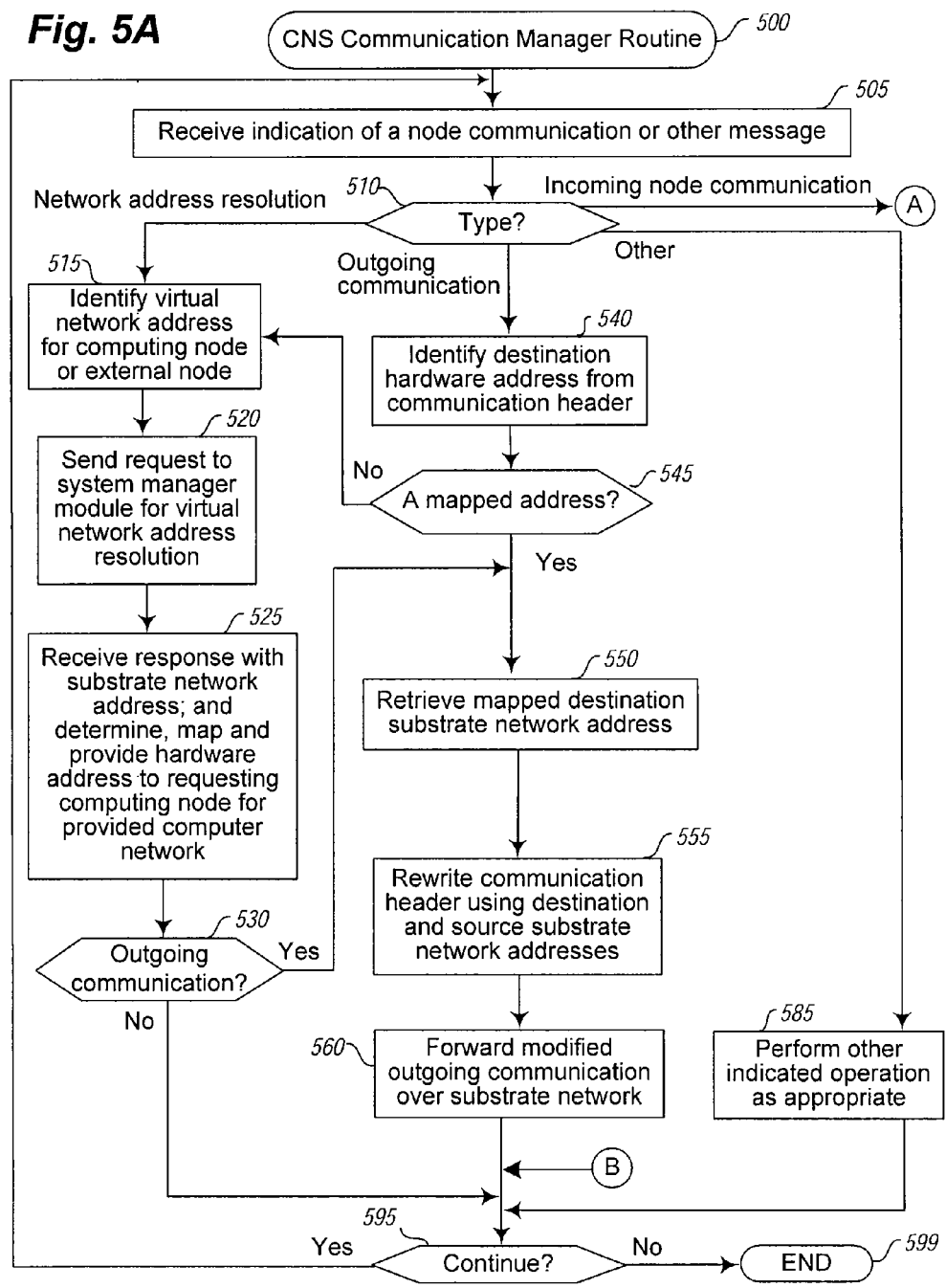
FIGS. 5A-5B illustrate a flow diagram of an example embodiment of a CNS Communication Manager routine.
Figure 5B:
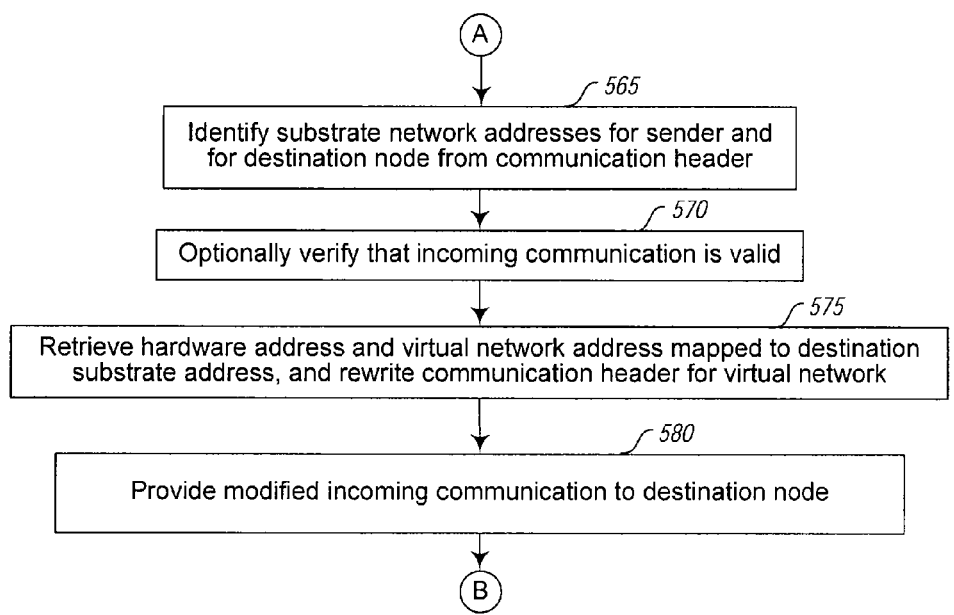

FIGS. 5A-5B are a flow diagram of an example embodiment of a CNS Communication Manager routine 500. The routine may be provided by, for example, execution of the Communication Manager modules 109a, 109b, 109c, 109d and/or 150 of FIG. 1B, the Communication Manager modules 210 and/or 260 of FIGS. 2A-2D, the Communication Manager modules 356 and/or 360 of FIG. 3, and/or a communication manager module (not shown) of the CNS service 105 of FIG. 1A, such as to manage communications to and from an associated group of one or more computing nodes in order to provide a private virtual computer network over one or more shared intermediate networks, including to determine whether to authorize communications to and/or from the managed computing nodes, and to support interactions with external network nodes for at least some communications to and/or from other computing nodes of one or more managed virtual computer networks.

The routine begins at block 505, where an indication is received of a node communication or other message. The routine continues to block 510 to determine the type of communication or other message and proceed accordingly. If it is determined in block 510 that the message is a request from an associated managed computing node for network address resolution, such as an ARP request, the routine continues to block 515 to identify the target network address of interest indicated in the request. The routine then continues to block 520 to send a request to a system manager module for network address resolution for the indicated target network address for the virtual computer network that is associated with the computing node that provided the request, such as discussed with respect to blocks 425-440 of FIG. 4. As discussed in greater detail elsewhere, the routine may in some embodiments track information about virtual computer networks and/or entities associated with each managed computing node, as well as one or more external network nodes that are each part of one or more virtual computer networks, while in other embodiments at least some such information may instead be provided to the routine by the computing nodes and/or by the system manager module, or instead the system manager module may track and store that information without it being provided to and tracked by the current routine. While not illustrated here, in other embodiments and situations such address resolution requests may be handled in other manners. For example, if a computing node being managed by a particular communication manager module provides an address resolution request for another computing node that is also managed by that communication manager module, the routine may instead respond to the request without interaction with the system manager module, such as based on locally stored information. In addition, while in the illustrated embodiment the received request is a request to provide a computing node's link-layer hardware address that corresponds to an indicated networking layer address, in other embodiments the address resolution request may have other forms, or computing nodes may request other types of information about computing nodes that have indicated target network addresses.

In the illustrated embodiment, the routine next continues to block 525 to receive a response from the system manager module that includes a substrate network address and/or other information corresponding to the identified virtual network address (e.g., an indication that the target address is an external address), and stores information locally that maps that substrate network address and/or other information to a unique hardware address for later use by the routine (e.g., based on a dummy virtual hardware address generated by the routine or provided in the response), along with other information about the target destination as discussed in greater detail elsewhere. The routine then provides the hardware address to the requesting computing node, which it may use as part of one or more later communications that it sends to the target destination with the indicated target network address. The routine then continues to block 530 to determine if blocks 515-525 were performed as part of the handling of an outgoing node communication, as discussed with respect to blocks 540-560, and if so, continues to block 550. While not illustrated here, in some embodiments the routine may instead receive an error response from the system manager module (e.g., based on the requesting computing node not being authorized to communicate with the indicated destination node) or no response, and if so may not send any response to the requesting computing node or may send a corresponding error message to that computing node.

If it is instead determined in block 510 that the type of communication or other message is an outgoing node communication from a computing node managed by the routine to another indicated non-local target destination that is not a computing node also managed by the routine, the routine continues to block 540 to identify the indicated hardware address for the indicated target final destination from the communication header. In block 545, the routine then determines whether that destination hardware address is a hardware address previously mapped to a substrate network address corresponding to the final destination, such as previously discussed with respect to block 525. If not, in some embodiments the routine continues to block 515 to perform blocks 515-525 to determine such a corresponding substrate network address for the outgoing node communication, while in other embodiments such actions are not performed (e.g., if the indicated hardware address is not a mapped address, the routine may cause the outgoing node communication to fail, such as with an error message back to the sending node; if the indicated hardware address is not mapped but the destination network address is an external address of an external computer system that is not part of the virtual computer network, to proceed to perform blocks 550-560 to send the communication to an edge device for forwarding to an external network; etc.).

If the indicated hardware address is a mapped address, or the check is not performed, the routine continues to block 550 to retrieve the physical substrate network address that is mapped to the hardware address. In block 555, the routine then rewrites the communication header in accordance with a networking address protocol for one or more intermediate substrate networks between the sending computing node and destination using the substrate network address retrieved in block 550. The header rewriting may further include changing other information in the new header, including changing a virtual network address for the sending computing node to be a corresponding substrate network address, and in at least some embodiments includes modifying the received communication without encapsulation as part of an overlay of the virtual computer network over the one or more intermediate substrate networks. Furthermore, for a communication whose destination hardware address does correspond to a logical networking device, the routine in block 555 may further perform other modifications that correspond to providing logical networking functionality to emulate the actions and functionality that would be performed by the one or more logical networking devices that would be used to forward the communication to the destination in accordance with the configured network topology for the virtual computer network. In block 560, the routine then facilitates providing of the modified outgoing communication to the destination, such as by initiating forwarding of the modified outgoing communication over the substrate intermediate network(s) toward the destination. While not illustrated here, in other embodiments various additional types of processing may be performed for outgoing node communications, such as to verify that the communications are valid or otherwise authorized in various ways (e.g., to verify that the sending computing node is authorized to send communications to the destination, such as based on being associated with the same entity or part of the same virtual computer network, based on the sending computing node and destination being associated with different entities that are authorized to inter-communicate, based on the type of communication or other information specific to the communication, etc.). In some embodiments, there may be multiple alternative intermediate destinations for use in forwarding a communication to a final destination, such as multiple translation manager modules for use in exchanging communications between multiple computing nodes and one or more external network nodes. In the illustrated embodiment, in such situations, the system manager module selects a particular such alternative intermediate destination to use, such as may be identified by the current routine with respect to information received in block 525. Maintaining the use of a single such alternative intermediate destination between a pair of sending/destination nodes may provide various benefits, including to enable continuity for a particular flow of communications or other group of multiple communications back and forth between two nodes. In other embodiments, the selection of such a particular intermediate destination to use for a particular communication may be made in other manners, including by the routine 500 (e.g., with respect to block 550), and optionally in a dynamic manner for some or all such communications. For example, the routine 500 may instead receive in block 525 a list or other indication of multiple substrate network addresses corresponding to some or all of the multiple alternative intermediate destinations, and may then use that information as part of selecting a particular intermediate destination to use in a particular situation, as discussed in greater detail elsewhere.

If it is instead determined in block 510 that the received message is an incoming node communication for one of the managed computing nodes from a non-local node managed by a different communication manager module or by a translation manager module, the routine continues instead to block 565 to identify the substrate network addresses for the sender and for the destination computing node from the communication header. After block 565, the routine continues to block 570 to optionally verify that the incoming communication is valid in one or more ways. For example, the routine may determine whether the substrate network address for the sender is actually mapped to a node that corresponds to the location from where the communication entered the substrate network, such as based on interactions with a system manager module and/or based on other information previously obtained and stored by the routine. In addition, the routine may determine whether the substrate network address for the destination computing node corresponds to an actual managed computing node. While not illustrated here, if an incoming communication is determined to not be valid, the routine may take various actions not shown, such as to generate one or more errors and perform associated processing and/or drop the incoming communication without forwarding it to the indicated destination node. For example, if the incoming communication indicates a destination network address that does not correspond to a current managed computing node, the routine may drop the incoming communication and/or initiate an error message, although in some embodiments such error messages are not sent to the sending computing node.

In the illustrated embodiment, after block 570, the routine continues to block 575 to retrieve the hardware address and the virtual network address that are mapped to the destination substrate network address, and to rewrite the communication header for the virtual computer network so that it appears to be sent to a computing node with that virtual network address and hardware address. For example, in some embodiments the destination virtual network address may be obtained from the destination substrate network address itself, such as from a subset of the bits of the destination substrate network address. In addition, the destination hardware address may have previously been mapped to the destination substrate network address, such as previously discussed with respect to block 525. In situations in which such prior mapping has not occurred, the routine may instead perform blocks 515-525 to obtain such information, although such actions are not illustrated in this example. The routine may similarly rewrite the communication header for the virtual computer network so that it appears to be sent from a node with a source virtual network address corresponding to the sender. Furthermore, in at least some embodiments, the routine in block 575 may further perform other modifications to the incoming communication that correspond to providing logical networking functionality to emulate the actions and functionality that would be performed by one or more logical networking devices that would have been used to forward the communication to the destination computing node in accordance with the configured network topology for the virtual computer network. After block 575, the routine continues to block 580 to facilitate providing of the modified incoming communication to the destination computing node, such as by initiating forwarding of the modified incoming communication to the destination computing node.

If it is instead determined in block 510 that a message of another type is received, the routine continues to block 585 to perform one or more other indicated operations as appropriate, such as to store information about entities associated with particular computing nodes, store configuration information about translation manager modules or other intermediate destinations, store current or recent tracking information about intermediate destinations (e.g., current load information for particular intermediate destinations or other information about current characteristics of particular intermediate destinations), store information about external network nodes and other configured network topologies for particular virtual computer networks, respond to requests and other messages from computing nodes in a manner to provide logical networking functionality corresponding to configured network topologies for virtual computer networks (e.g., by emulating actions and other functionalities that would be performed by specified logical networking devices if they were physically implemented), update previously mapped or stored information to reflect changes with respect to computing nodes that are being managed or to non-local nodes, perform operations to forward communications between multiple managed computing nodes of the communication manager module without forwarding such communications over the substrate network, etc. The storing and/or updating of stored information may be initiated in various manners, such as by receiving information in response to previous requests, periodically requesting such information, receiving information that is proactively pushed to the routine without a corresponding request, etc.

After blocks 560, 580, or 585, or if it is instead determined in block 530 that the processing is not being performed with respect to an outgoing communication, the routine continues to block 595 to determine whether to continue, such as until an explicit indication to terminate is received. If it is determined to continue, the routine returns to block 505, and if not continues to block 599 and ends.

Figure 6B:
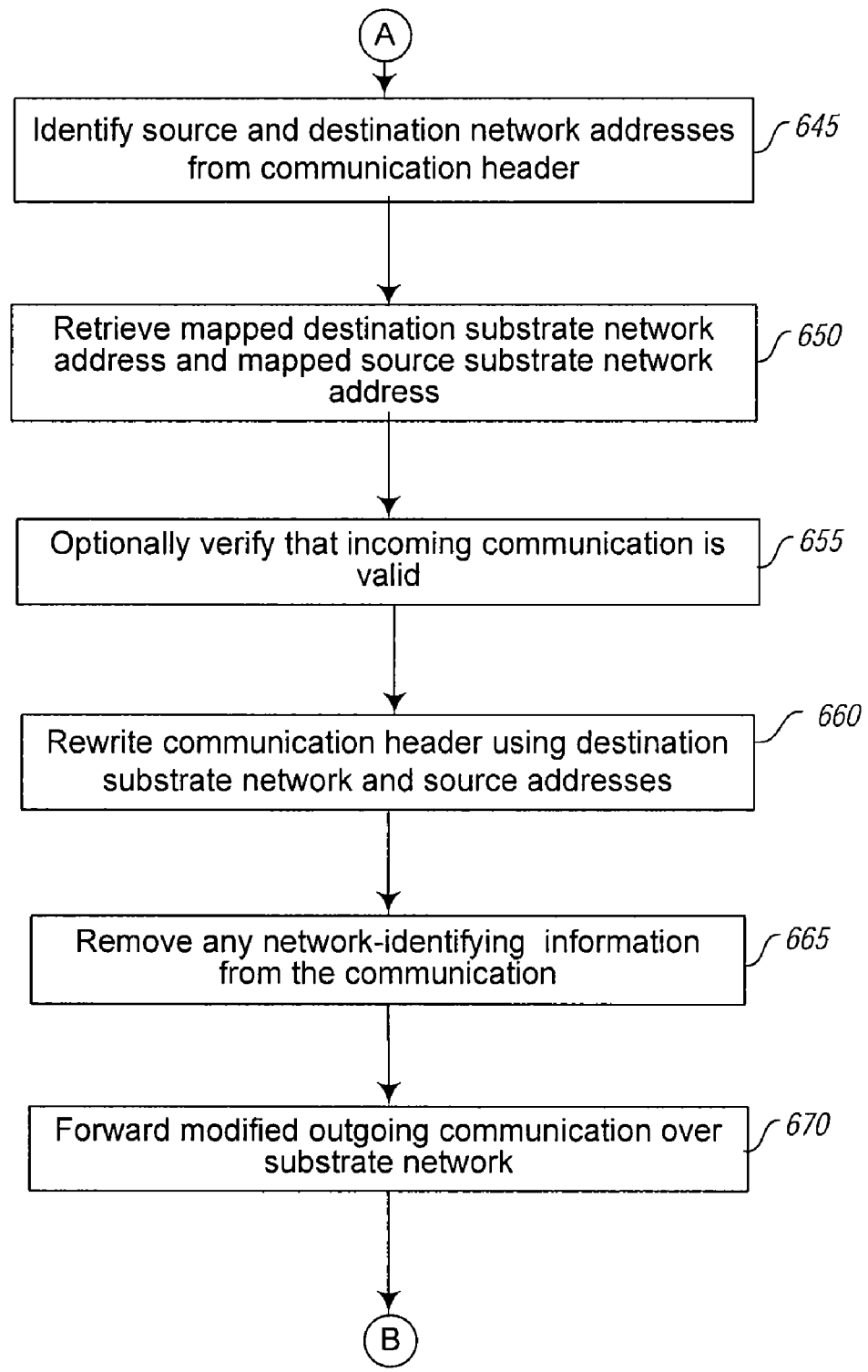

FIGS. 6A-6B are a flow diagram of an example embodiment of a CNS Translation Manager Module routine 600. The routine may be provided by, for example, execution of the Translation Manager Module N 275a of FIG. 2D, the edge devices 108 of FIG. 1B, the edge devices 365 of FIG. 3, and/or one or more translation manager modules (not shown) of the CNS service 105 of FIG. 1A, such as to manage communications to and from an associated group of one or more network nodes external to the substrate network in order to integrate those external network nodes as part of one or more virtual computer networks overlaid on the substrate network.

The routine begins at block 605, where an indication is received of a node communication or other message. The routine continues to block 610 to determine the type of communication or other message, and to proceed accordingly.

If it is determined in block 610 that the type of communication or other message is an node communication from the substrate network that is directed to an external network node, the routine continues to block 615 to identify from the communication the indicated virtual network address for the sender and the virtual network address for the intended final destination external network node. The routine then continues to block 620 to retrieve information mapped to the destination virtual network address that indicates how to encode communications sent to that destination virtual network address over an external connection. In block 625, the routine then rewrites the communication header in accordance with the retrieved information (e.g., based on a networking address protocol for the external connection, based on an external network address for the external network node, etc.), including optionally changing other information in the new header (e.g., changing the source network address to another network address and/or port used to represent the sending computing node to external computer systems, such as if the routine performs NAT/PAT functionality for computing nodes of the virtual computer network, adding network-identifying information for the managed virtual computer network, etc.), and in at least some embodiments includes modifying the received communication without encapsulation as part of an overlay of the virtual computer network over the one or more external networks. In block 635, the routine then facilitates providing of the modified outgoing communication to the destination external network node, such as by initiating forwarding of the modified outgoing communication to the external network(s) for forwarding to the destination network node. While not illustrated here, the routine may further take actions in some embodiments to perform operations related to metering a quantity of communications that are forwarded by the routine to one or more external network nodes, related to filtering particular communications sent to one or more external network nodes, related to determining and/or enforcing limits on rates or quantities or other thresholds of use for communications to one or more external nodes, etc.

If it is instead determined in block 610 that the received message is an incoming communication from a network external to the substrate network for a computing node of a virtual computer network overlaid on the substrate network, the routine continues to block 645 to identify the source and destination network addresses from the communication header, as well as to optionally identify a particular virtual computer network to which the destination computing node belongs based on network-identifying information (e.g., a VLAN identifier) included with the communication. After block 645, the routine continues to block 650 to retrieve the mapped destination substrate network address for the destination network address, as well as a source substrate network address for the translation manager module. After block 650, the routine continues to block 655 to optionally verify that the incoming communication is valid in one or more ways, such as based on interactions with a system manager module and/or based on other information previously obtained and stored by the routine regarding the sending node and/or destination node. While not illustrated here, if an incoming communication is determined to not be valid, the routine may take various actions not shown, such as to generate one or more errors and perform associated processing and/or drop the incoming communication without forwarding it to the indicated destination node. In the illustrated embodiment, after block 655, the routine continues to block 660 to encode the communication for the substrate network by rewriting the communication header using the destination and source substrate network addresses. In block 665, the routine removes any network-identifying information for the virtual computer network to the communication (e.g., identifiers for a particular entity; a tag or label for the virtual computer network, such as a VLAN identifier for a particular VLAN associated with the destination virtual computer network; etc.). In block 670, the routine then facilitates providing of the modified outgoing communication to the destination computing node, such as by initiating forwarding of the modified communication to the substrate network for further forwarding to the destination computing node. While not illustrated here, the routine may further take actions in some embodiments to perform operations related to metering a quantity of communications that are forwarded by the routine from one or more external network nodes, related to filtering particular communications sent by one or more external network nodes, related to determining and/or enforcing limits on rates or quantities or other thresholds of use for communications from one or more external nodes, etc.

If it is instead determined in block 610 that a message of another type is received, the routine continues to block 685 to perform one or more other indicated operations as appropriate, such as to store information about entities associated with particular external network nodes, store information about external network nodes and other configured network topologies for particular virtual computer networks, update previously mapped or stored information to reflect changes with respect to external network nodes that are being managed or to other computing nodes, forward communications between computing nodes and external computer systems that are not part of any virtual computer networks, perform configuration or reporting related to actions taken to meter a quantity of communications that are forwarded by the routine to one or more external network nodes or taken to filter particular communications or taken to determine and/or store information about a threshold of use of particular external nodes, etc. The storing and/or updating of stored information may be initiated in various manners, such as by receiving information in response to previous requests, periodically requesting such information, receiving information that is proactively pushed to the routine without a corresponding request, etc.

After blocks 635, 670 or 685, the routine continues to block 695 to determine whether to continue, such as until an explicit indication to terminate is received. If it is determined to continue, the routine returns to block 605, and if not continues to block 699 and ends.

In addition, various embodiments may provide mechanisms for customer users and other entities to interact with an embodiment of the system manager module for the purpose of configuring computing nodes and external network nodes. For example, some embodiments may provide an interactive console (e.g. a client application program providing an interactive user interface, a Web browser-based interface, etc.) from which users can manage the creation or deletion of virtual computer networks, the configuration of specified VLANs for virtual computer networks, the configuration of network topology information for virtual computer networks, and the specification of virtual network membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In some embodiments, some or all of the functionality of an embodiment of the CNS system may be provided in exchange for fees from users or other entities acting as customers or other clients of the CNS system, and if so the mechanisms for such clients to interact with an embodiment of the system manager module may include mechanisms for users and other entities to provide payment and payment-related information, as well as to monitor corresponding payment information. In addition, some embodiments may provide an API that allows other computing systems and programs to programmatically invoke at least some of the described functionality, such as APIs provided by libraries or class interfaces (e.g., to be invoked by programs written in C, C++, or Java) or otherwise, and/or using network service protocols such as via Web services. Additional details related to the operation of example embodiments of a program execution service with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" U.S. application Ser. No. 11/692,038, filed Mar. 27, 2007 and entitled "Configuring Intercommunications Between Computing Nodes;" and U.S. application Ser. No. 12/332,214, filed Dec. 10, 2008 and entitled "Providing Access To Configurable Private Computer Networks;" each of which is incorporated herein by reference in its entirety. In addition, additional details related to the management of provided virtual networks that may be used by at least some embodiments of a CNS system, such as in conjunction with an Overlay Network Manager module of such a CNS system, are available in U.S. application Ser. No. 12/060,074, filed Mar. 31, 2008 and entitled "Configuring Communications Between Computing Nodes;" and in U.S. application Ser. No. 12/414,260, filed Mar. 30, 2009 and entitled "Providing Virtual Networking Functionality For Managed Computer Networks;" each of which is also incorporated herein by reference in its entirety.

It will also be appreciated that, although in some embodiments the described techniques are employed in the context of a data center housing multiple physical machines hosting virtual machines, other implementation scenarios are also possible. For example, the described techniques may be employed in the context an organization-wide network or networks operated by a business or other institution (e.g. university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-piece application (e.g., a multi-tiered business application) may in some embodiments use the described techniques to provide functional decomposition and/or isolation for the various types of interacting pieces (e.g., Web front-ends, database servers, business rules engines, etc.). More generally, the described techniques may be used to virtualize physical networks to reflect almost any situation that would conventionally necessitate physical partitioning of distinct computing systems and/or networks.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
    receiving configuration information indicating a specified network topology for a first virtual computer network and indicating multiple virtual network addresses for use with multiple computing nodes of the first virtual computer network, wherein the multiple virtual network addresses include an indicated range of virtual network addresses that are a subset of the multiple virtual network addresses and that are for use with an external location having a first external device of the first virtual computer network, wherein the multiple computing nodes are connected to a substrate network, and wherein the external location of the first external device is separated from the substrate network via one or more external connections that are not part of the substrate network; and
    providing, by one or more programmed computing systems, the first virtual computer network in accordance with the received configuration information by overlaying the first virtual computer network on the substrate network without physically implementing the specified network topology for the first virtual computer network, the providing of the first virtual computer network including:
        for a first communication that is sent by one of the multiple computing nodes to a destination that is another of the multiple computing nodes, encoding the first communication in a manner specific to the substrate network, and forwarding the encoded first communication over the substrate network to the destination another computing node;
        after receiving an indication of a second communication that a source one of the multiple computing nodes specifies to be sent to a first virtual network address in the indicated range that is associated with the first external device, encoding the second communication in a manner specific to the substrate network, and forwarding the encoded second communication over the substrate network from the source one computing node to a translation manager module associated with the first external device; and
        under control of the translation manager module,
            decoding the forwarded encoded second communication to remove information specific to the substrate network; and
            further forwarding the decoded second communication from the substrate network to the first external device over the one or more external connections.

2. The method of claim 1 wherein the encoding of the first communication in the manner specific to the substrate network includes adding information to the encoded first communication that is specific to the substrate network, and wherein the providing of the first virtual computer network further includes:

receiving the forwarded encoded first communication after the forwarding over the substrate network to the destination another computing node;

decoding the received encoded first communication to remove the added information specific to the substrate network;

further encoding the decoded first communication to include information specific to the first virtual computer network; and providing the further encoded first communication to the destination another computing node.

3. The method of claim 1 wherein the overlaying of the first virtual computer network on the substrate network further includes configuring the translation manager module to manage communications between the first external device and the multiple computing nodes, and wherein the translation manager module is configured to, before performing the further forwarding of the decoded second communication, modify the decoded second communication to be directed to the external location and to include information specific to the first virtual computer network, and wherein the decoded second communication that is further forwarded is the modified decoded second communication.

4. The method of claim 3 wherein the information specific to the first virtual computer network that is included in the modified decoded second communication is a virtual local area network ("VLAN") identifier specific to the first virtual computer network.

5. The method of claim 1 wherein the one or more external connections include one or more intervening networks between the substrate network and the first external device, and wherein the translation manager module is part of an edge device that inter-connects the substrate network and at least one of the one or more intervening networks.

6. The method of claim 1 wherein the one or more programmed computing systems are part of a configurable network service that provides virtual computer networks to clients, wherein the multiple computing nodes and the translation manager module are operated under control of the configurable network service, and wherein the first external device is operated under control of an entity distinct from an operator of the configurable network service.

7. The method of claim 6 wherein the first virtual computer network is provided to a first client by the configurable network service, wherein the first external device is operated under control of the first client, and wherein the first external device is part of a private computer network of the first client.

8. The method of claim 6 wherein the multiple computing nodes and the translation manager module and the substrate network are part of a first data center, wherein the first external device is located at a co-location facility for the first data center, and wherein the one or more external connections include one or more connections between the first data center and the co-location facility.

9. The method of claim 1 wherein the specified network topology indicates a group of multiple external network nodes that are part of the first virtual computer network, the first external device being one of the multiple external devices, and wherein the method further comprises, under control of the translation manager module:

receiving multiple third additional communications that are sent from the multiple computing nodes to the multiple external network nodes, the multiple third additional communications each being encoded for the substrate network and forwarded to the translation manager module over the substrate network, and for each of the third additional communications, decoding the received encoded third additional communication to remove information specific to the substrate network and further forwarding the decoded third additional communication to an external network address associated with one of the multiple external network nodes to which the third additional communication is directed; and receiving multiple fourth additional communications that are sent from the multiple external network nodes to the multiple computing nodes, the multiple fourth additional communications each being forwarded to the translation manager module over the one or more external connections, and for each of the fourth additional communications, encoding the received fourth additional communication to include information specific to the substrate network and further forwarding the encoded fourth additional communication to a substrate network address associated with one of the multiple computing nodes to which the fourth additional communication is directed.

10. The method of claim 1 wherein the one or more programmed computing systems are part of a configurable network service that provides virtual computer networks to clients, wherein the first virtual computer network is provided to a first client by the configurable network service, and wherein the first external device is configured to provide a type of functionality that is not available from the configurable network service or a type of functionality specified by the first client for handling communications as an intermediate destination that are sent between two or more of the multiple computing nodes.

11. The method of claim 1 wherein the one or more programmed computing systems are part of a configurable network service that provides the first virtual computer network to a first client and that provides multiple other virtual computer networks to multiple other clients, wherein the multiple computing nodes of the first virtual computer network each has an associated virtual network address for the first virtual computer network and has a distinct substrate network address that indicates a location of the computing node in the substrate network, and wherein communications sent between the multiple computing nodes of the first virtual computer network are transmitted on the substrate network in an encoded form that uses information specific to the substrate network and that uses a specified destination substrate network address for forwarding over the substrate network.

12. A non-transitory computer-readable storage medium whose stored contents configure a computing system to perform a method, the method comprising:

obtaining configuration information specified by a client for a first virtual computer network having multiple computing nodes within a substrate network and having one or more external network nodes at an external location outside of the substrate network, the configuration information indicating a plurality of virtual network addresses for the first virtual computer network, the plurality of virtual network addresses having an indicated range of one or more virtual network addresses that are a subset of the plurality of virtual network addresses and are associated with the external network nodes at the external location;

under control of the configured computing system, managing a first communication sent to a destination virtual network address that is associated with a destination computing node of the multiple computing nodes, wherein the destination virtual network address is one of the plurality of virtual network addresses that is not in the indicated range, the managing of the first communication including forwarding the first communication over the substrate network to a location in the substrate network of the destination computing node; and under control of the configured computing system, managing a second communication sent to a destination virtual network address from the indicated range that is associated with one of the external network nodes by:

determining that a translation manager module in the substrate network is configured to manage communications for the one external network node, the translation manager module having an associated substrate network address that corresponds to a location of the translation manager module in the substrate network; and forwarding the second communication over the substrate network to the location in the substrate network of the translation manager module to enable the translation manager module to further forward the second communication externally to the substrate network to the one external network node, the forwarding of the second communication to the translation manager module including using the substrate network address associated with the translation manager module.

13. The computer-readable storage medium of claim 12 wherein the one or more external network nodes are each an external device that is separated from the substrate network via one or more intervening networks, wherein the first communication is encoded in a manner specific to the substrate network before the forwarding of the first communication and is decoded after the forwarding of the first communication before the decoded first communication is provided to the destination computing node, and wherein the forwarded second communication is encoded in a manner specific to the substrate network before the forwarding of the second communication and is decoded by the translation manager module after the forwarding of the second communication before the decoded second communication is further forwarded over the one or more intervening networks to the one external network node.

14. The computer-readable storage medium of claim 12 wherein the method further comprises, under control of the translation manager module, and for the forwarded second communication:

receiving the forwarded second communication, the received forwarded second communication being encoded to include information specific to the substrate network;

decoding the received encoded second communication to remove the information specific to the substrate network; and further forwarding the decoded second communication from the substrate network to the external network node using an external network address that is associated with that external network node.

15. The non-transitory computer-readable storage medium of claim 12 wherein the virtual network addresses of the indicated range are associated with one or more translation manager modules that are configured to forward communications to any of the virtual network addresses of the indicated range to the external location, the one or more translation manager modules including the determined translation manager module.

16. The non-transitory computer-readable storage medium of claim 15 wherein the one or more external network nodes include multiple external network nodes, wherein the one or more virtual network addresses of the indicated range include multiple virtual network addresses, and wherein the multiple external network nodes each have a distinct associated first virtual network address that is one of the virtual network addresses of the indicated range.

17. The non-transitory computer-readable storage medium of claim 15 wherein the one or more external network nodes include a single external network node having an associated virtual network address from the indicated range, wherein one or more other of the virtual network addresses of the indicated range are not associated with any external network nodes at a first time, and wherein the method further comprises managing one or more additional communications that each include a destination network address that is one of the other virtual network addresses of the indicated range, the managing of each of the one or more additional communications including forwarding the additional communication over the substrate network to a location in the substrate network of one of the one or more translation manager modules to enable the one translation manager module to further forward the communication from the substrate network to the external location.

18. The non-transitory computer-readable storage medium of claim 12 wherein the method further comprises, under control of the translation manager module, receiving the forwarded second communication and determining not to perform further forwarding of the received forwarded second communication to the one external network node.

19. The non-transitory computer-readable storage medium of claim 12 wherein the method further comprises metering a quantity of communications that are forwarded to at least one of the external network nodes.

20. The non-transitory computer-readable storage medium of claim 12 wherein the obtained configuration information includes information about a threshold of use of the one external network node, and wherein the method further comprises, under control of the translation manager module, performing further forwarding of the forwarded second communication to the one external network node only if it is determined that the further forwarding satisfies the threshold of use of the one external network node.

21. The non-transitory computer-readable storage medium of claim 12 wherein the one external network node has a threshold of use based at least in part on a capacity of the one external network node for handling forwarded communications, and wherein the method further comprises, under control of the translation manager module, performing further forwarding of the forwarded second communication to the one external network node only if it is determined that the further forwarding satisfies the threshold of use of the one external network node.

22. The non-transitory computer-readable storage medium of claim 12 wherein the managing of the second communication is performed by a communication manager module of a configurable network service, and wherein the method further comprises determining that the one external network node is not currently available and inhibiting future forwarding of communications to the one external network node.

23. The computer-readable storage medium of claim 12 wherein the obtained configuration information includes a specified network topology for the first virtual computer network, wherein the first virtual computer network is overlaid on the substrate network without physically implementing the specified network topology for the first virtual computer network, and wherein the stored contents are instructions that, when executed, program the computing system to perform the method.

24. A computing system, comprising:

one or more hardware processors and memory; and a communication manager module associated with one or more of multiple computing nodes of a first virtual computer network that is overlaid on one or more distinct second networks used as a substrate and that has multiple associated virtual network addresses, the one or more second networks interconnecting the multiple computing nodes, the communication manager module being configured to, when executed by at least one of the one or more hardware processors, manage multiple communications sent by the one or more computing nodes, the managing of the multiple communications by the communication manager module including:

for a first of the multiple communications that is directed to a destination first virtual network address of the first virtual computer network, the destination first virtual network address being from an indicated range of virtual network addresses that are a subset of the multiple virtual network addresses and being associated with a first external network node of the first virtual computer network that is at an external location separate from the one or more second networks:

determining to use a translation manager module connected to the one or more second networks to manage forwarding of the first communication to the first external network node;

encoding the first communication in a manner specific to the one or more second networks; and sending the encoded first communication to the one or more second networks for forwarding to the translation manager module, to enable the translation manager module to decode the encoded first communication and further forward the decoded first communication to the first external network node at the external location; and for a second communication of the multiple communications that is directed to a destination second virtual network address of the first virtual computer network, the destination second virtual network address being one of the multiple virtual network addresses outside of the indicated range and being associated with one of the multiple computing nodes of the first virtual computer network, encoding the second communication in a manner specific to the one or more second networks, and sending the encoded second communication to the one or more second networks for forwarding to the one computing node associated with the destination virtual network address without being provided to the translation manager module.

25. The computing system of claim 24 wherein each of the multiple computing nodes is associated with one of the multiple virtual network addresses outside of the indicated range and has a distinct associated substrate network address for the substrate one or more second networks, wherein the sending of the encoded first communication to the one or more second networks for forwarding to the translation manager module includes sending the encoded first communication to a substrate network address of the translation manager module that corresponds to a location of the translation manager module in the substrate one or more second networks, and wherein the sending of the encoded second communication to the one or more second networks for forwarding to the one computing node associated with the destination second virtual network address includes sending the second communication to the substrate network address associated with that one computing node.

26. The computing system of claim 24 further comprising the translation manager module to which the encoded first communication is forwarded, the translation manager module being associated with one or more external network nodes for the first virtual computer network and being configured to manage communications between the associated one or more external network nodes and the multiple computing nodes, the managing of the communications by the translation manager module including:

receiving the forwarded encoded first communication from the substrate one or more second networks;

decoding the received encoded first communication to remove information specific to the substrate one or more second networks; and further forwarding the decoded first communication outside the substrate one or more second networks to the first external network node.

27. The computing system of claim 26 wherein the communication manager module is further configured to manage incoming communications sent to the one or more computing nodes of the first virtual computer network with which the communication manager module is associated, the managing of the incoming communications including:

receiving one of the forwarded encoded second communications from the substrate one or more second networks;

decoding the received encoded second communication to remove information specific to the substrate one or more second networks;

further encoding the decoded second communication in a manner specific to the first virtual computer network; and providing the further encoded second communication to one of the one or more computing nodes with which the communication manager module is associated, the one computing node being associated with the destination second virtual network address to which the further encoded second communication was directed before the encoding and forwarding of the second communication over the substrate one or more second networks.

28. The computing system of claim 27 further comprising a system manager module configured to:

obtain configuration information specified by a user on whose behalf the first virtual computer network is provided, the configuration information including a specified network topology for the first virtual computer network and indicating the first external network node for the first virtual computer network; and before the managing of the multiple communications by the communication manager module, configure the translation manager module to manage communications between the multiple computing nodes and the first external network node.

29. The computing system of claim 24 wherein the communication manager module includes software instructions for execution by the at least one hardware processors of the computing system.

* * * * *